July 11, 1939.  W. W. LASKER ET AL  2,165,556

ACCOUNTING SYSTEM AND MACHINE

Filed Sept. 28, 1932    49 Sheets-Sheet 3

INVENTORS
William W. Lasker
Walter F. Kelley
by Robert H. Streeter
ATTORNEY

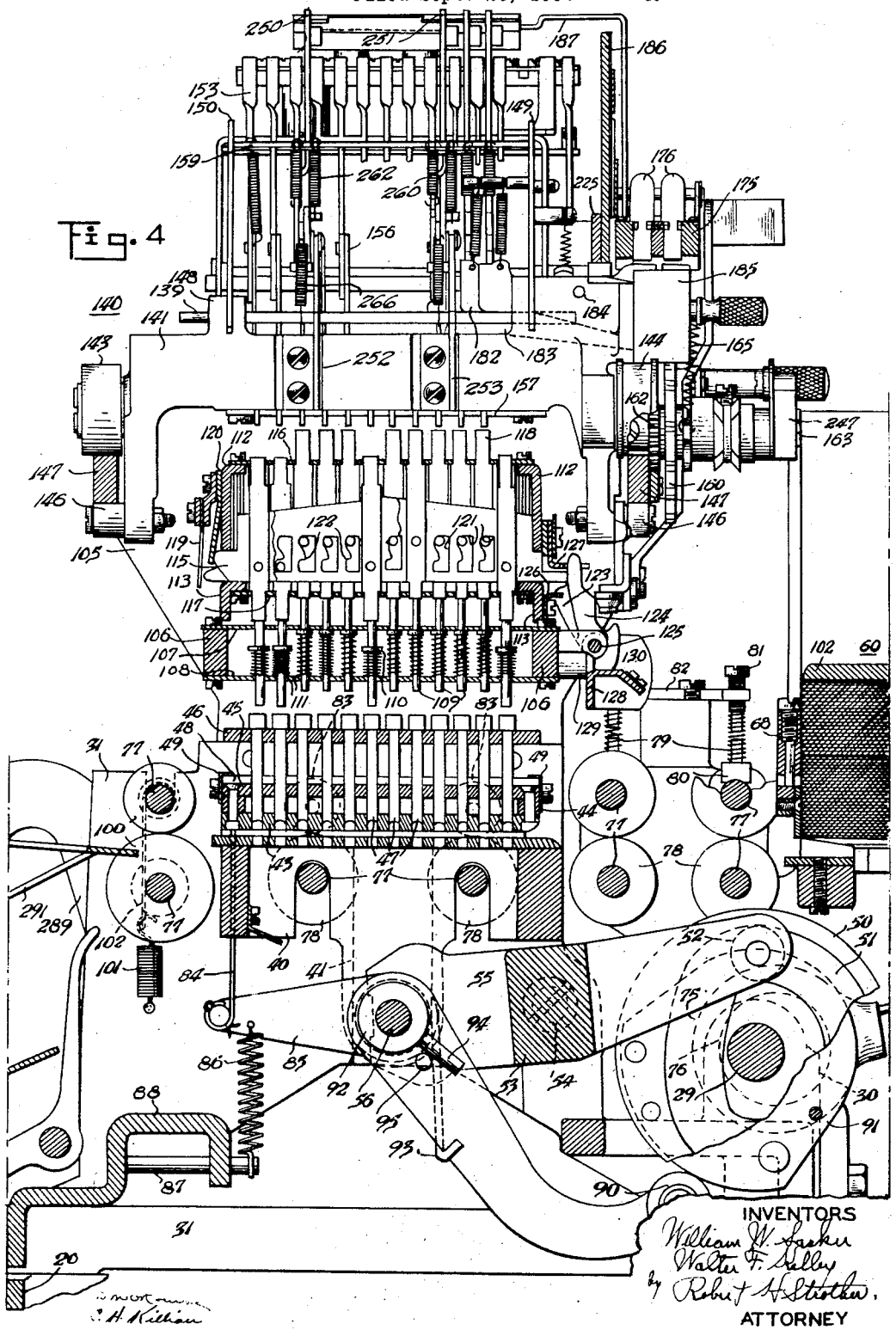

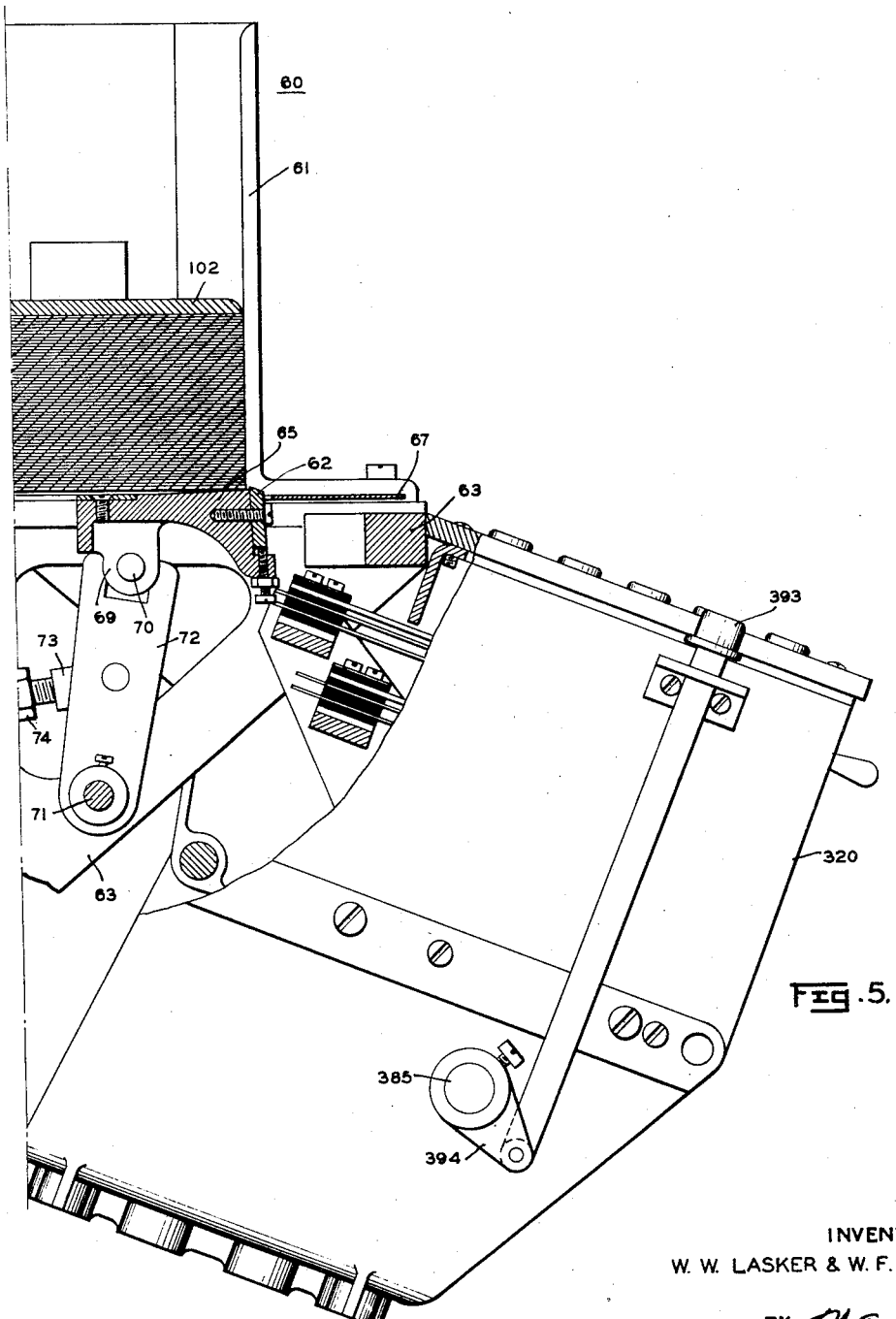

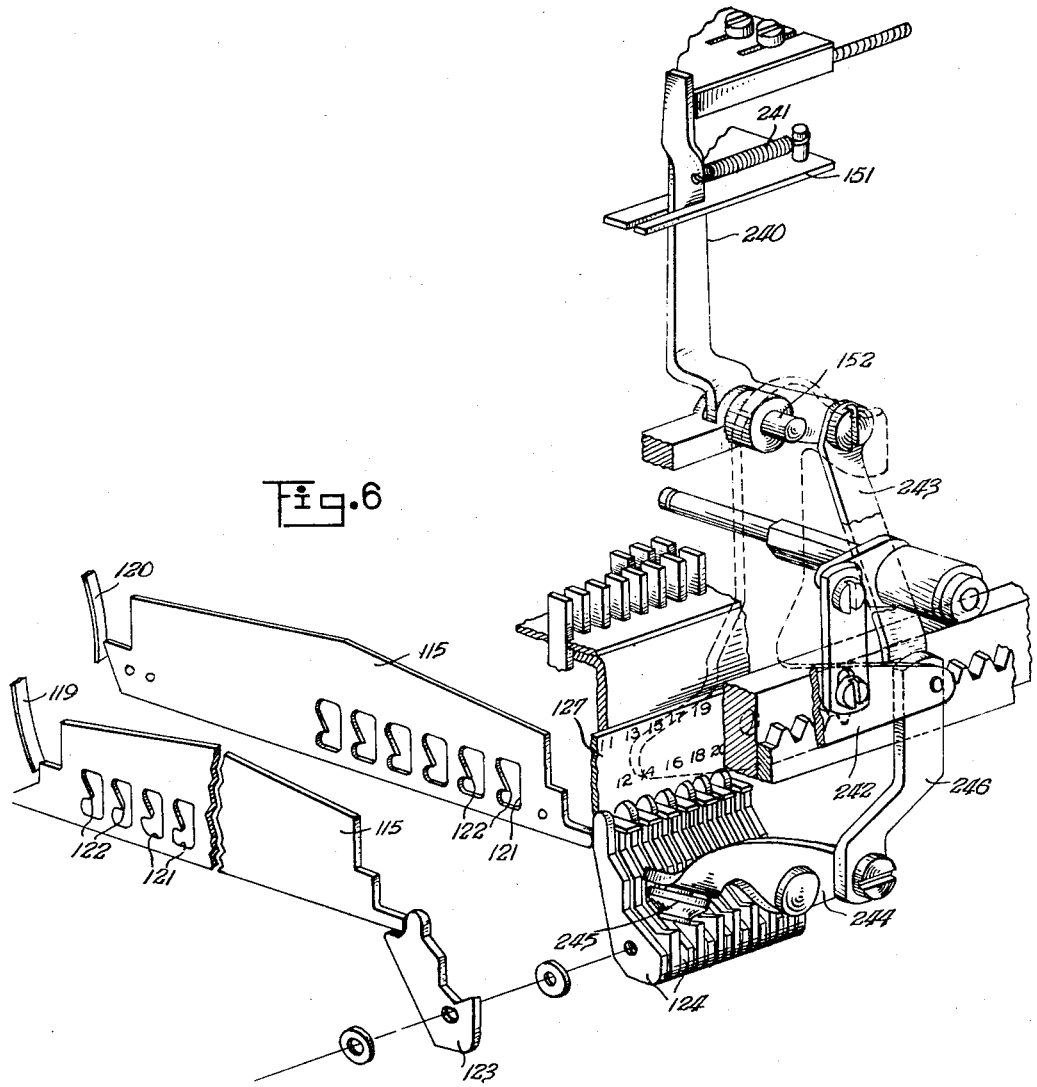

July 11, 1939.  W. W. LASKER ET AL  2,165,556
ACCOUNTING SYSTEM AND MACHINE
Filed Sept. 28, 1932   49 Sheets-Sheet 7
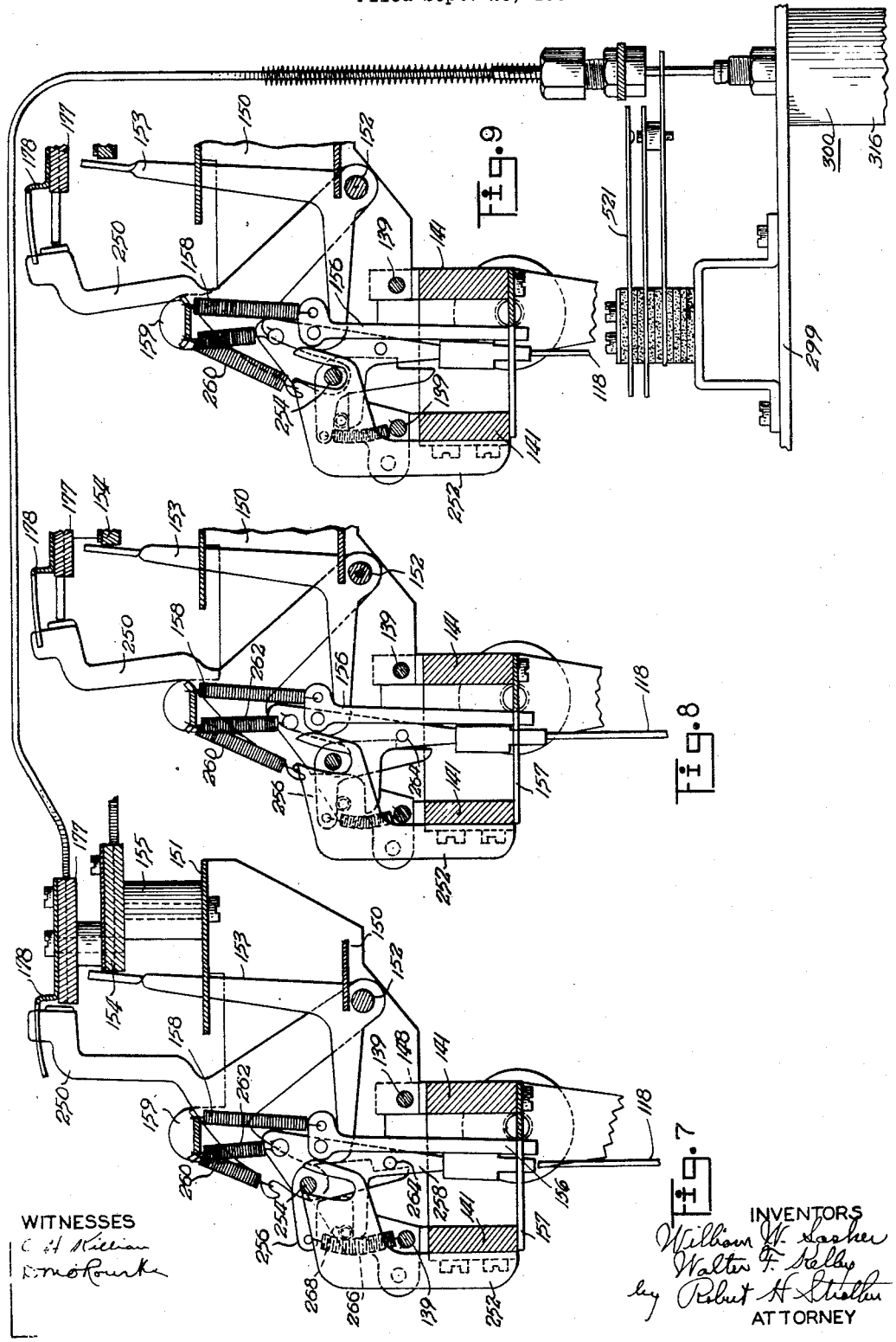

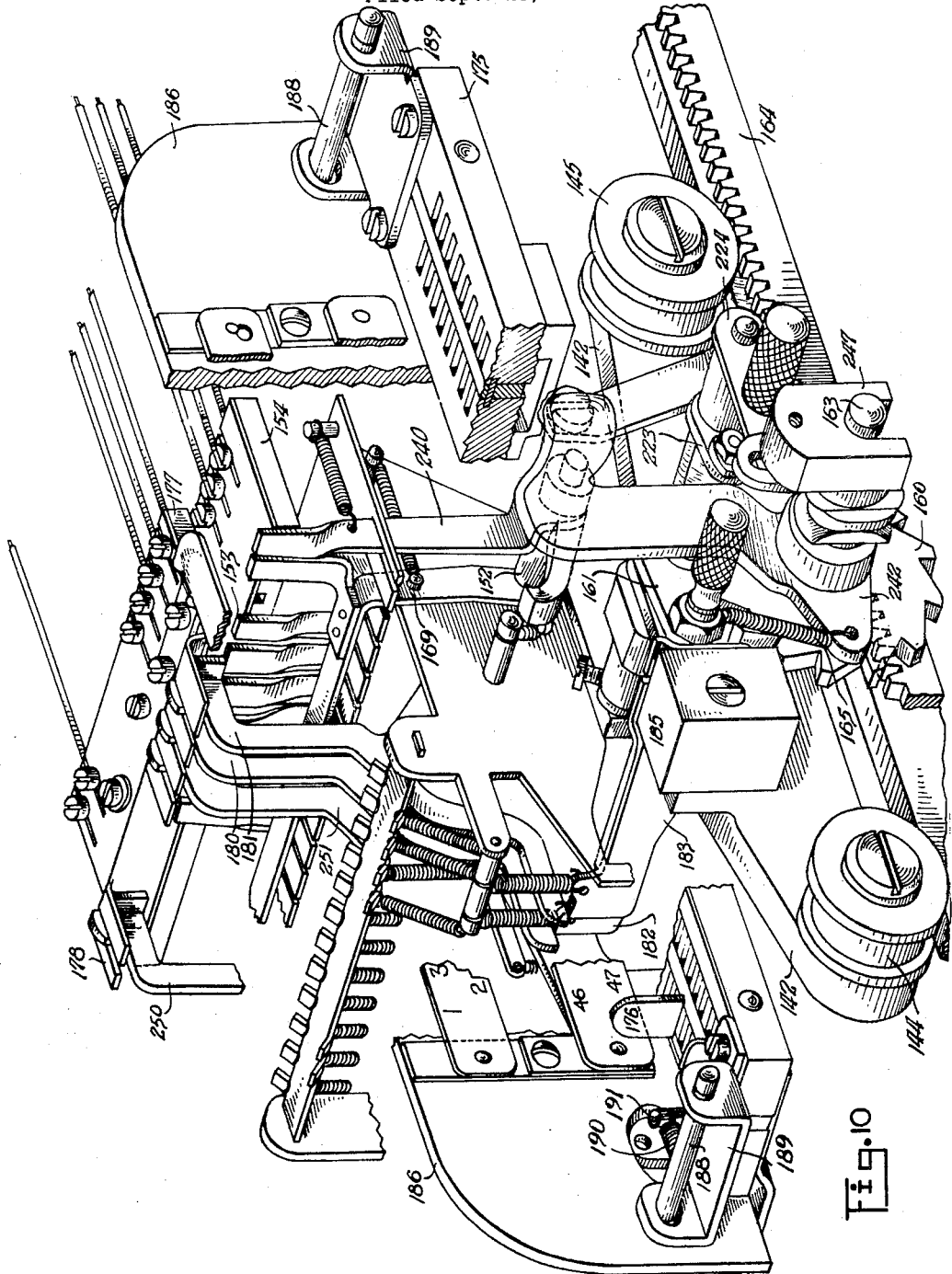

July 11, 1939. W. W. LASKER ET AL 2,165,556
ACCOUNTING SYSTEM AND MACHINE
Filed Sept. 28, 1932   49 Sheets-Sheet 9

INVENTORS
William W. Lasker
Walter F. Gilley
by Robert H. Strother
ATTORNEY

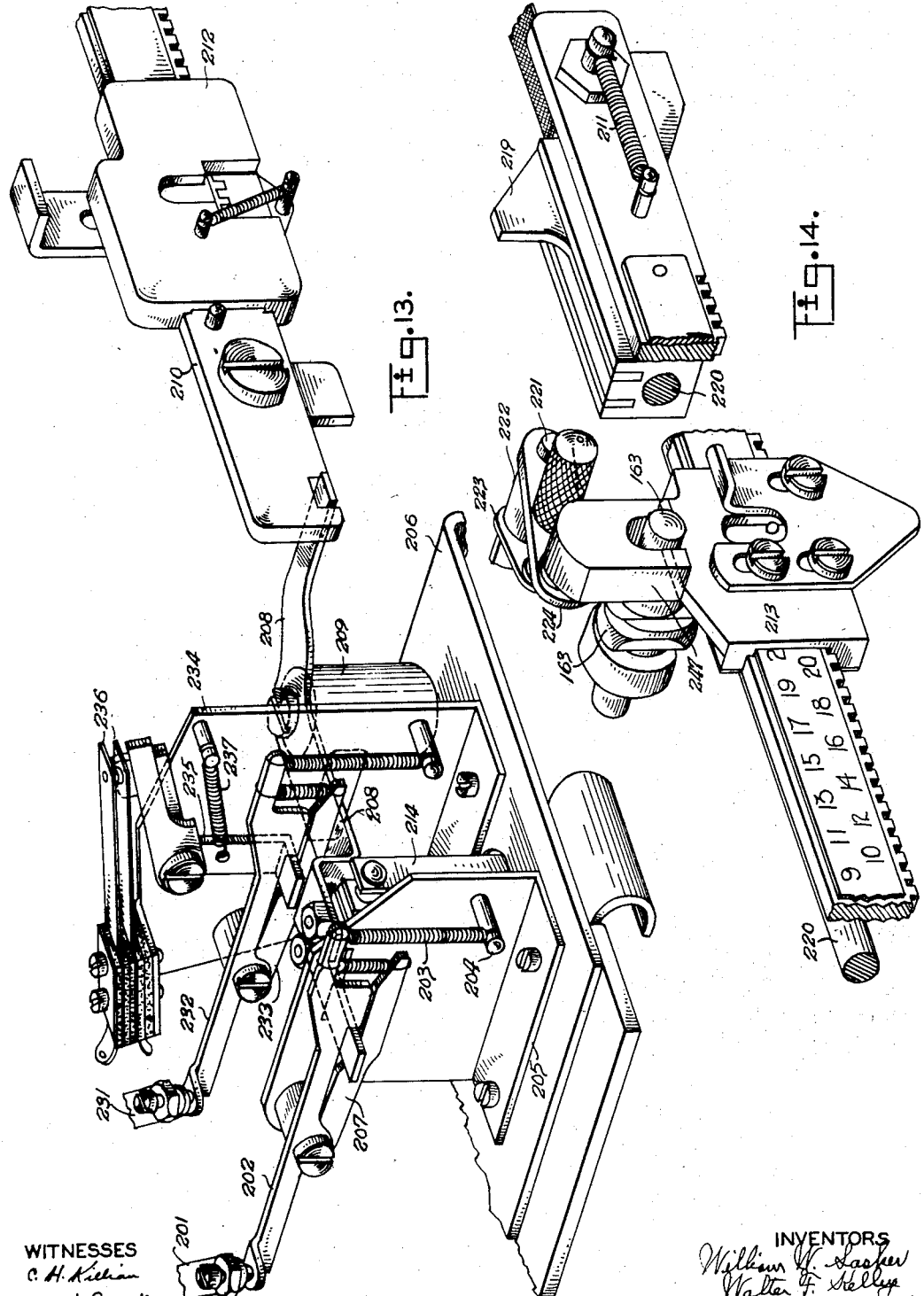
July 11, 1939.  W. W. LASKER ET AL  2,165,556
ACCOUNTING SYSTEM AND MACHINE
Filed Sept. 28, 1932   49 Sheets-Sheet 10

July 11, 1939.　　W. W. LASKER ET AL　　2,165,556
ACCOUNTING SYSTEM AND MACHINE
Filed Sept. 28, 1932　　49 Sheets-Sheet 11
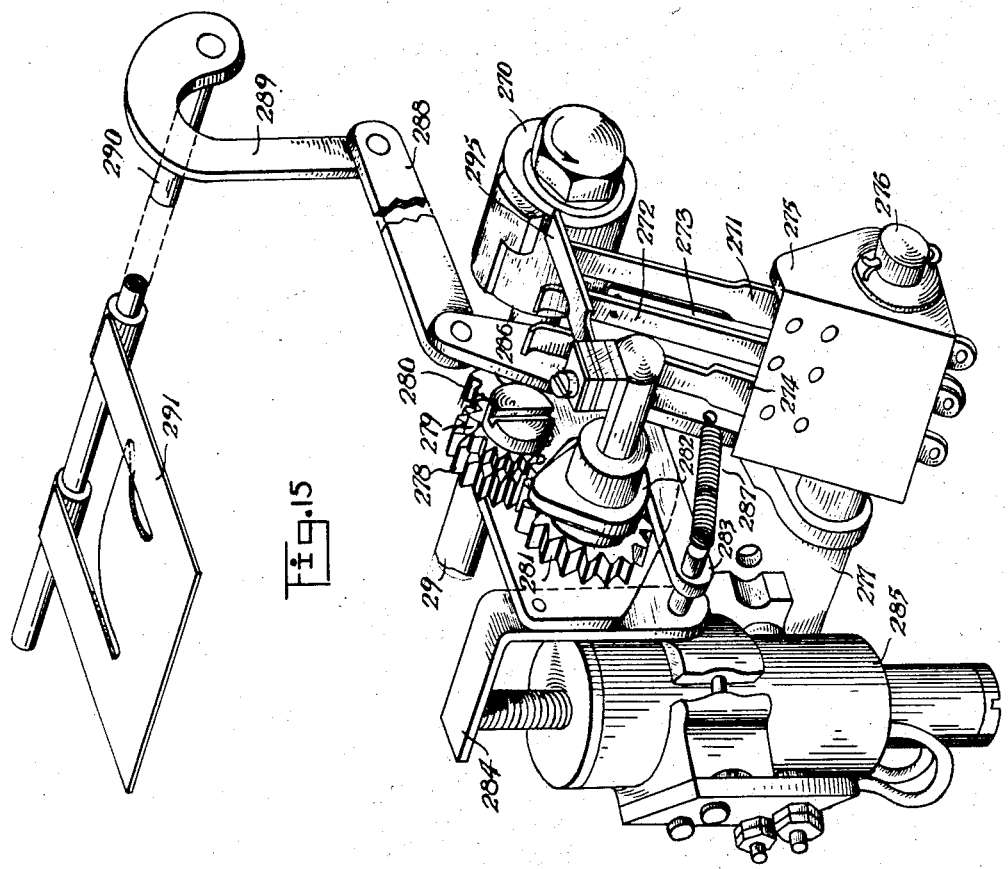
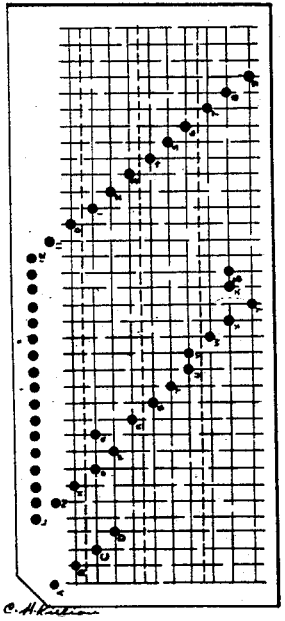
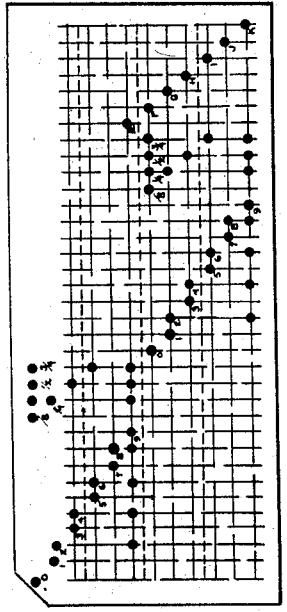
INVENTORS
William W. Lasker
Walter F. Holley
by Robert H. Strother
ATTORNEY

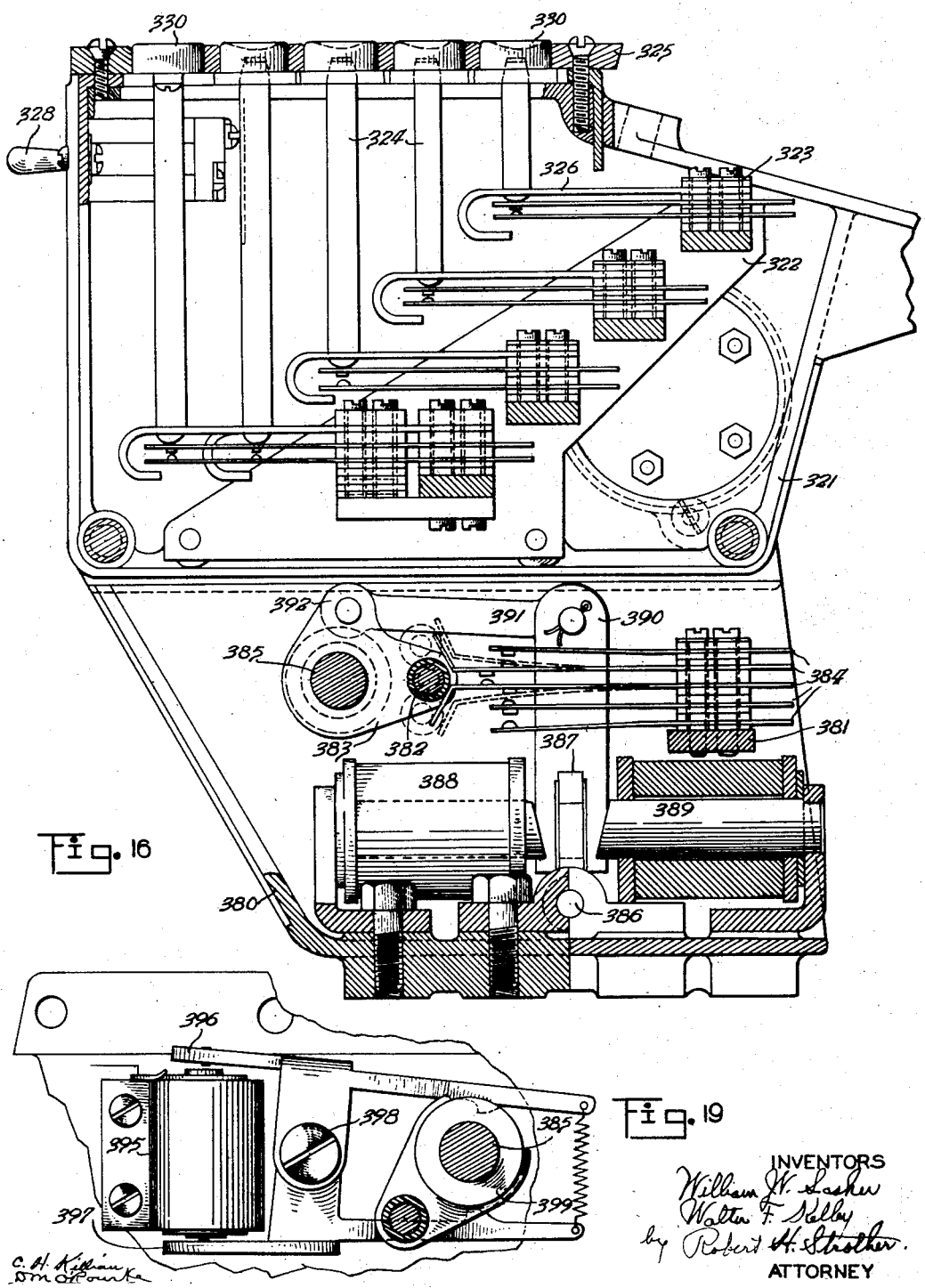

July 11, 1939.  W. W. LASKER ET AL  2,165,556
ACCOUNTING SYSTEM AND MACHINE
Filed Sept. 28, 1932   49 Sheets-Sheet 13
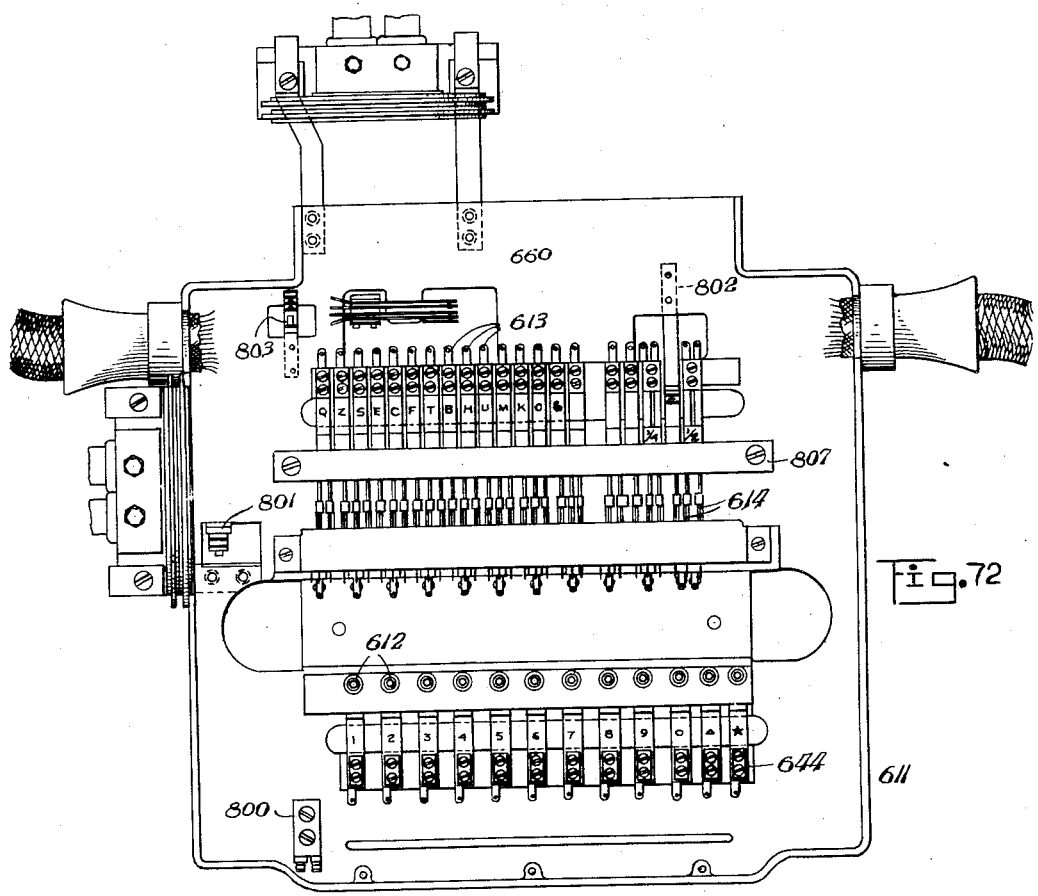
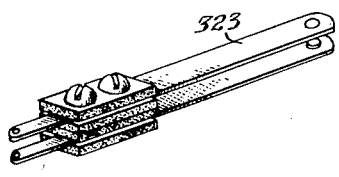
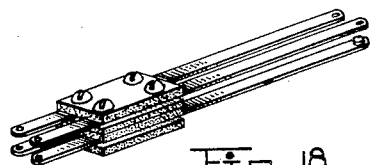

July 11, 1939.  W. W. LASKER ET AL  2,165,556
ACCOUNTING SYSTEM AND MACHINE
Filed Sept. 28, 1932  49 Sheets-Sheet 14
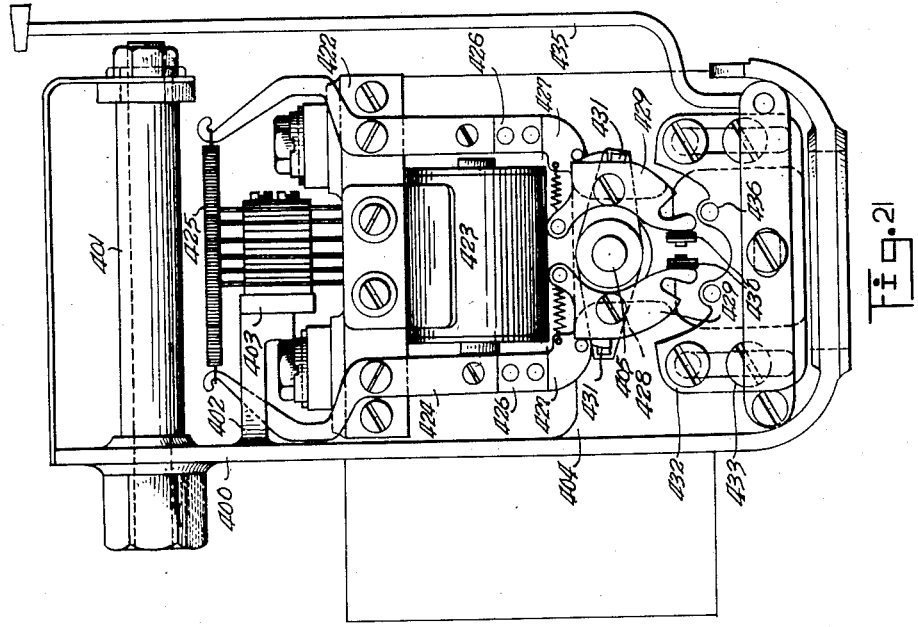
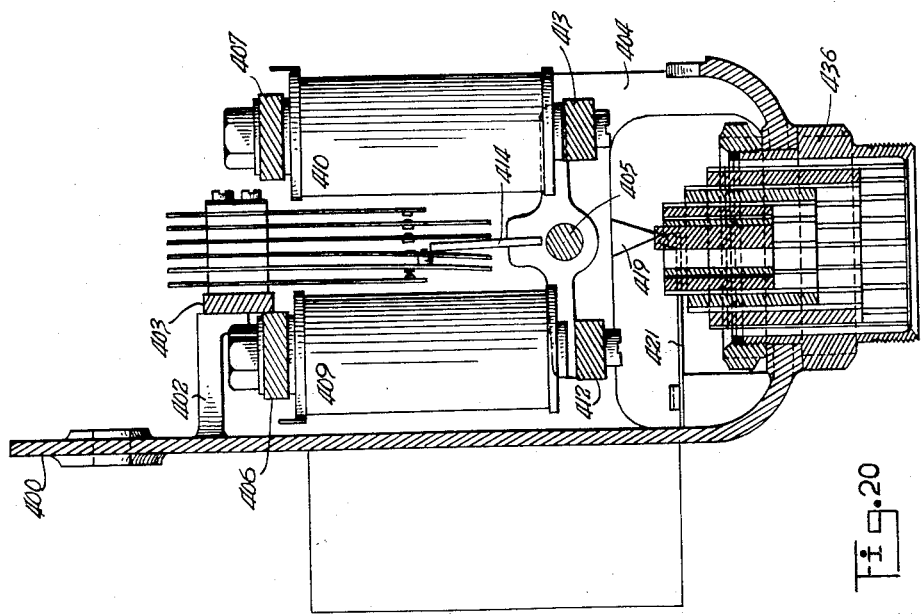

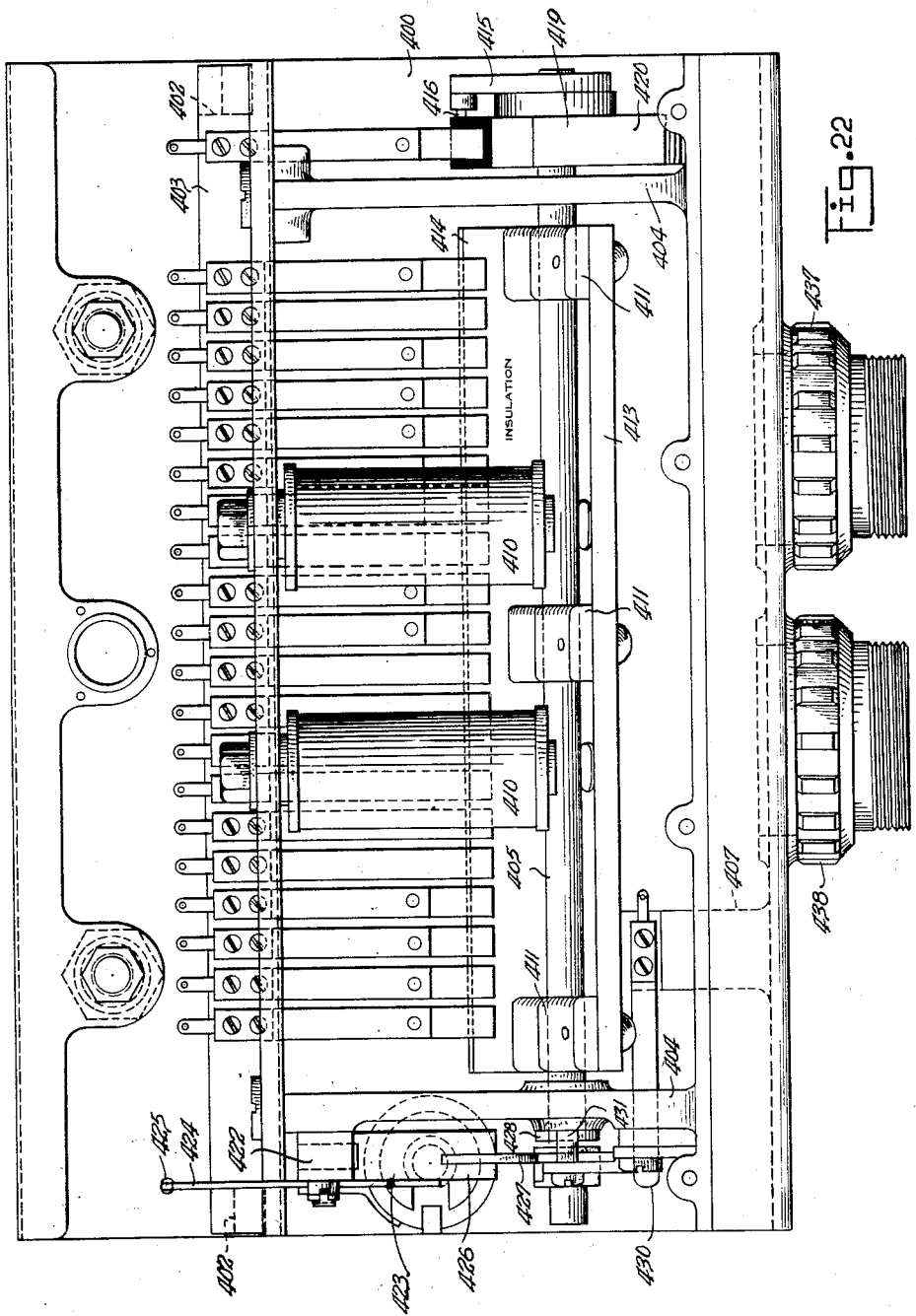

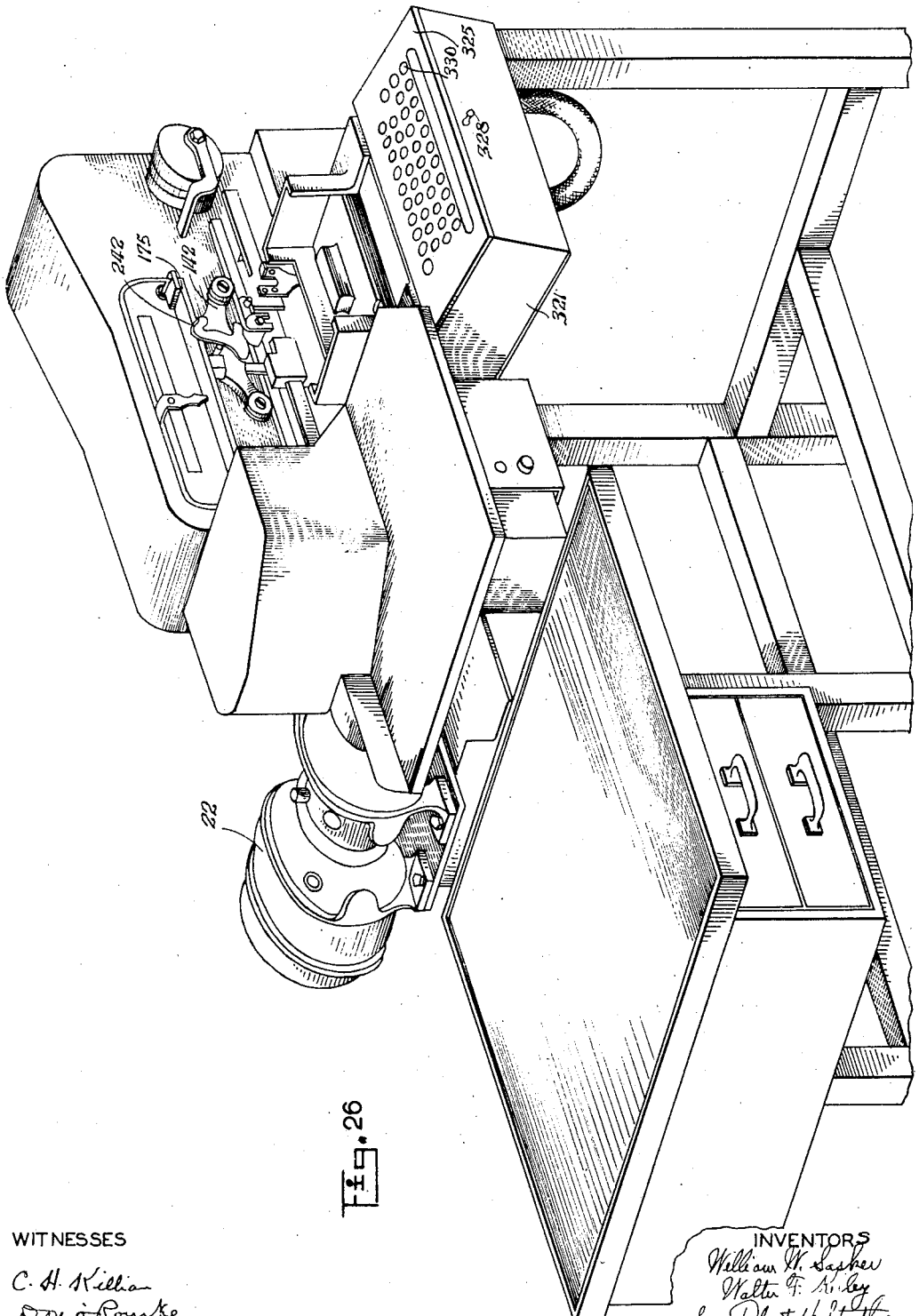

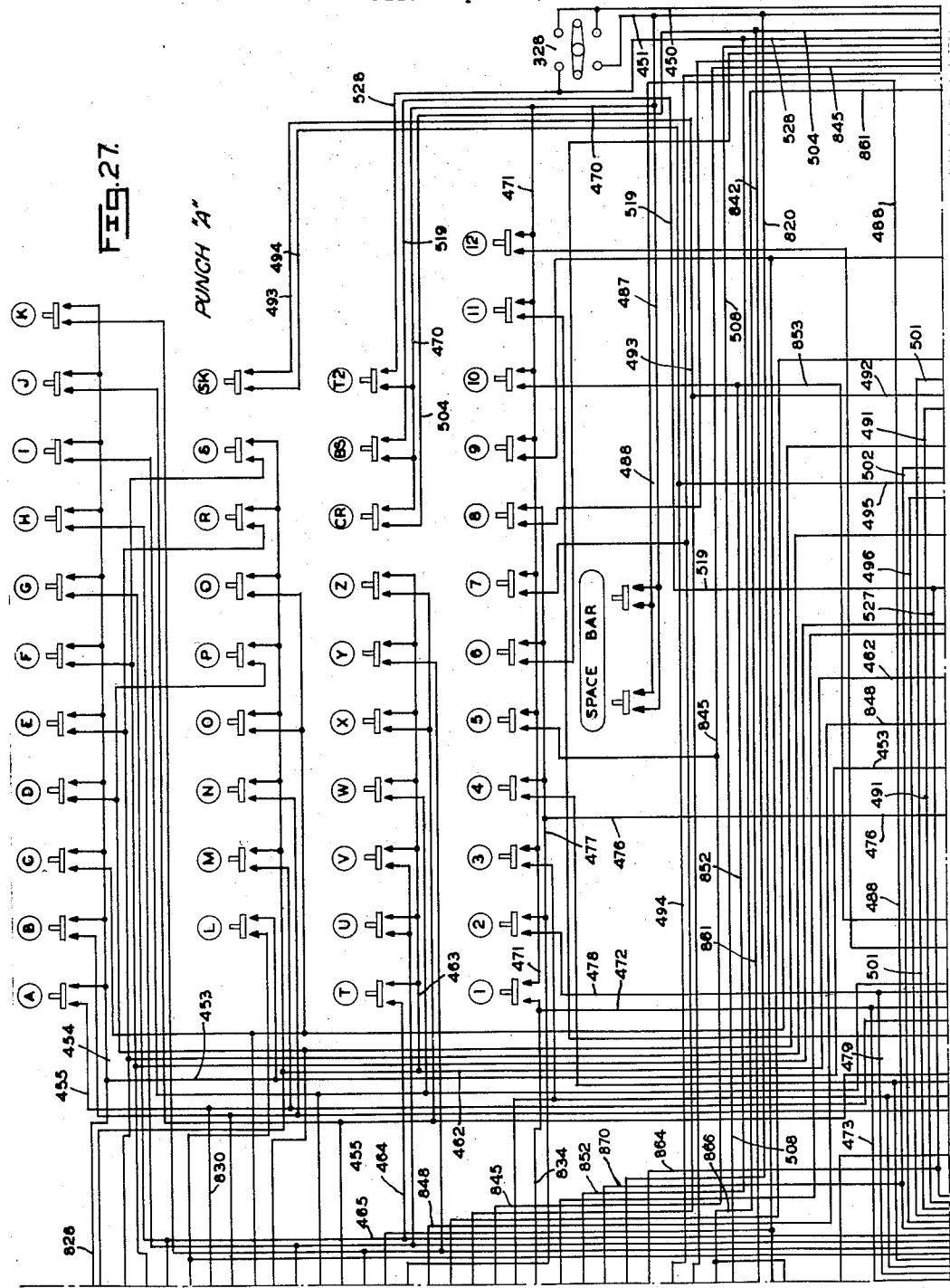

July 11, 1939.  W. W. LASKER ET AL  2,165,556
ACCOUNTING SYSTEM AND MACHINE
Filed Sept. 28, 1932    49 Sheets-Sheet 18

INVENTORS
W. W. LASKER & W. F. KELLEY
BY W. A. Spark
ATTORNEY

July 11, 1939. W. W. LASKER ET AL 2,165,556
ACCOUNTING SYSTEM AND MACHINE
Filed Sept. 28, 1932 49 Sheets-Sheet 21

INVENTORS
W. W. LASKER & W. F. KELLEY
BY W. A. Sparks
ATTORNEY

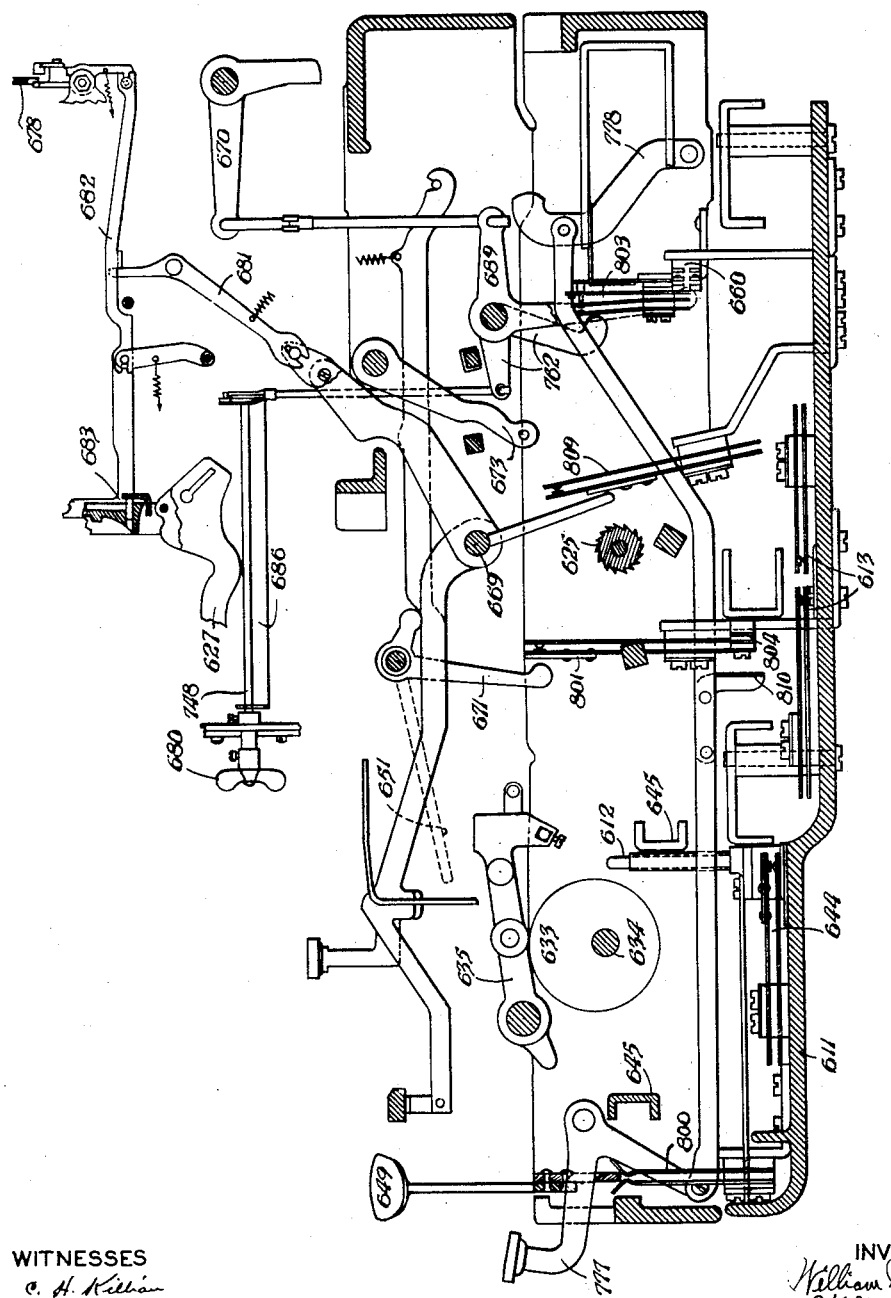

July 11, 1939.   W. W. LASKER ET AL   2,165,556
ACCOUNTING SYSTEM AND MACHINE
Filed Sept. 28, 1932   49 Sheets-Sheet 28
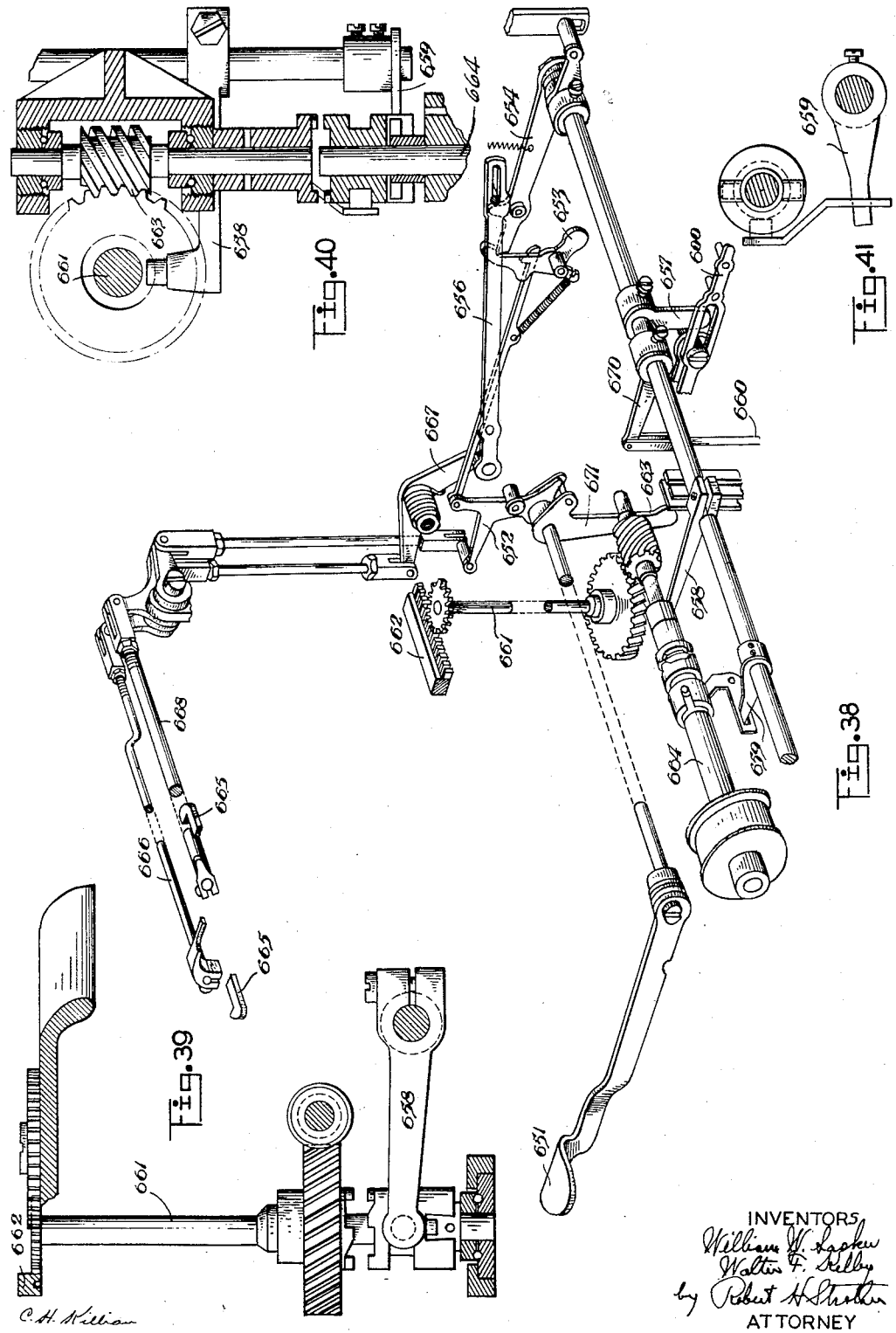

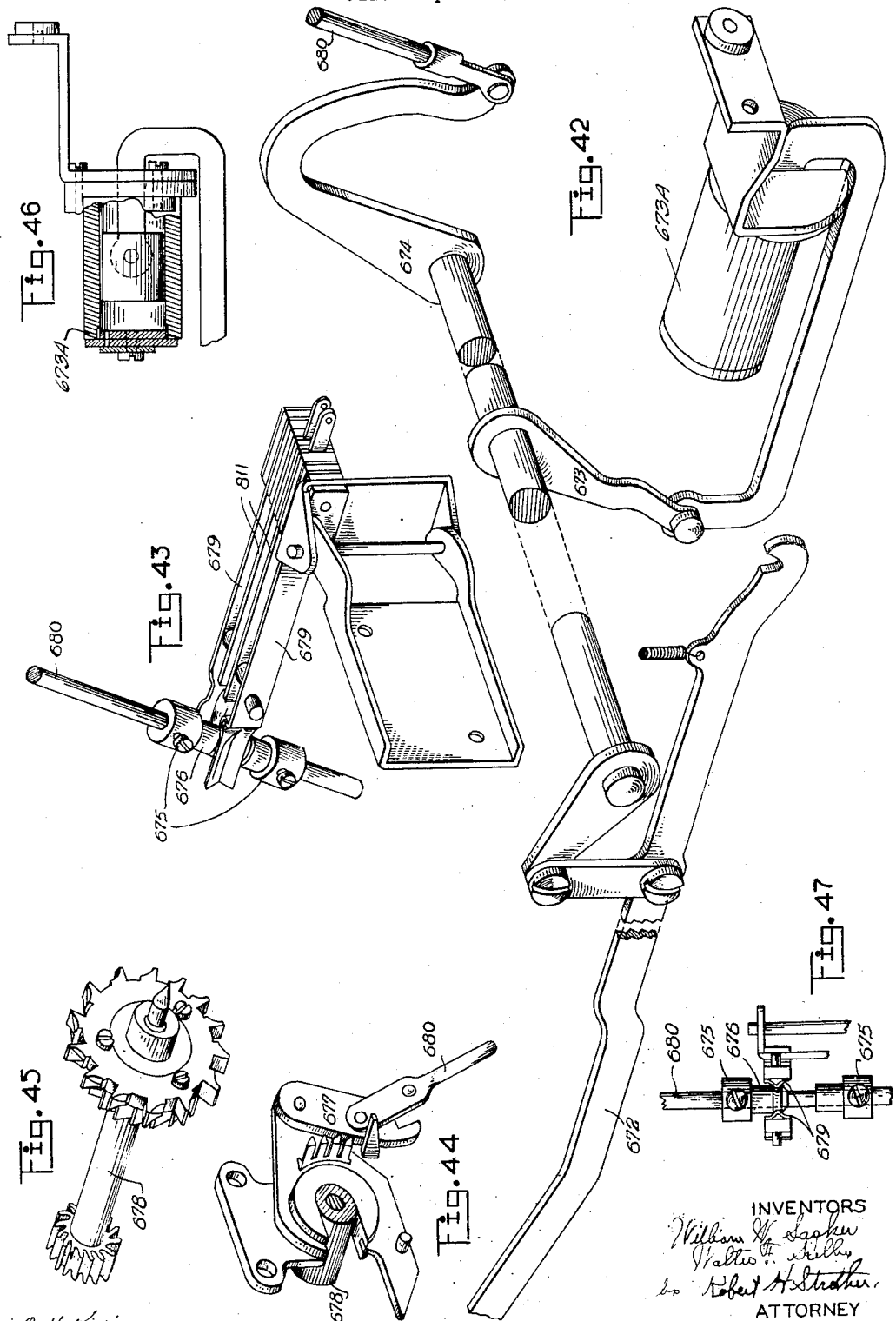

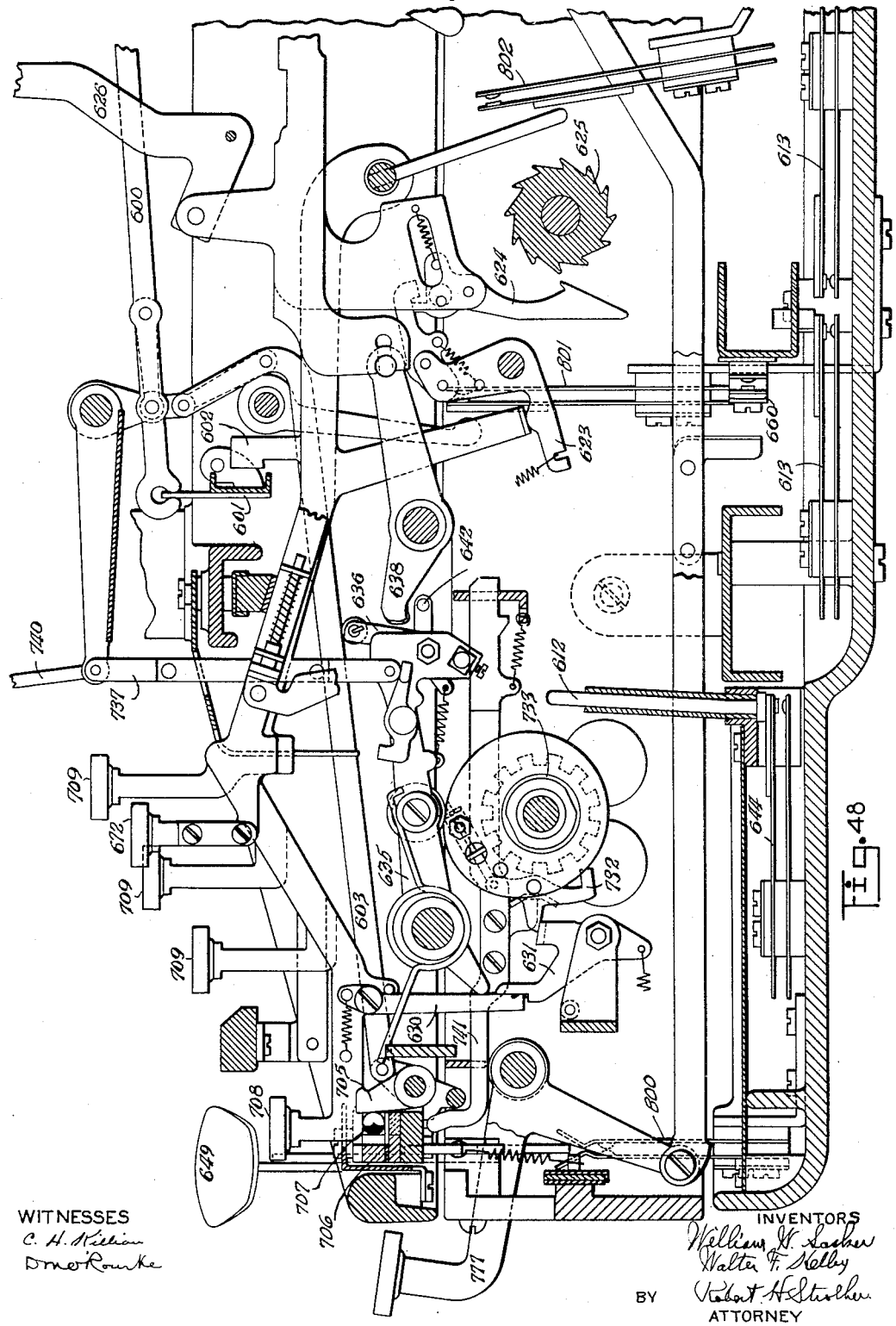

July 11, 1939.  W. W. LASKER ET AL  2,165,556
ACCOUNTING SYSTEM AND MACHINE
Filed Sept. 28, 1932   49 Sheets-Sheet 31
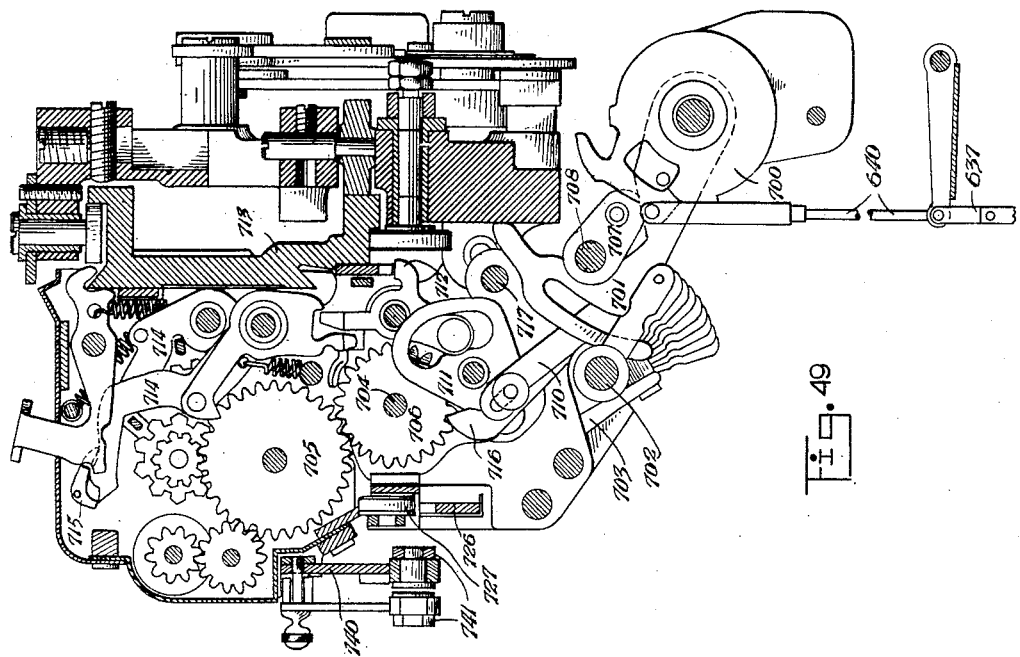
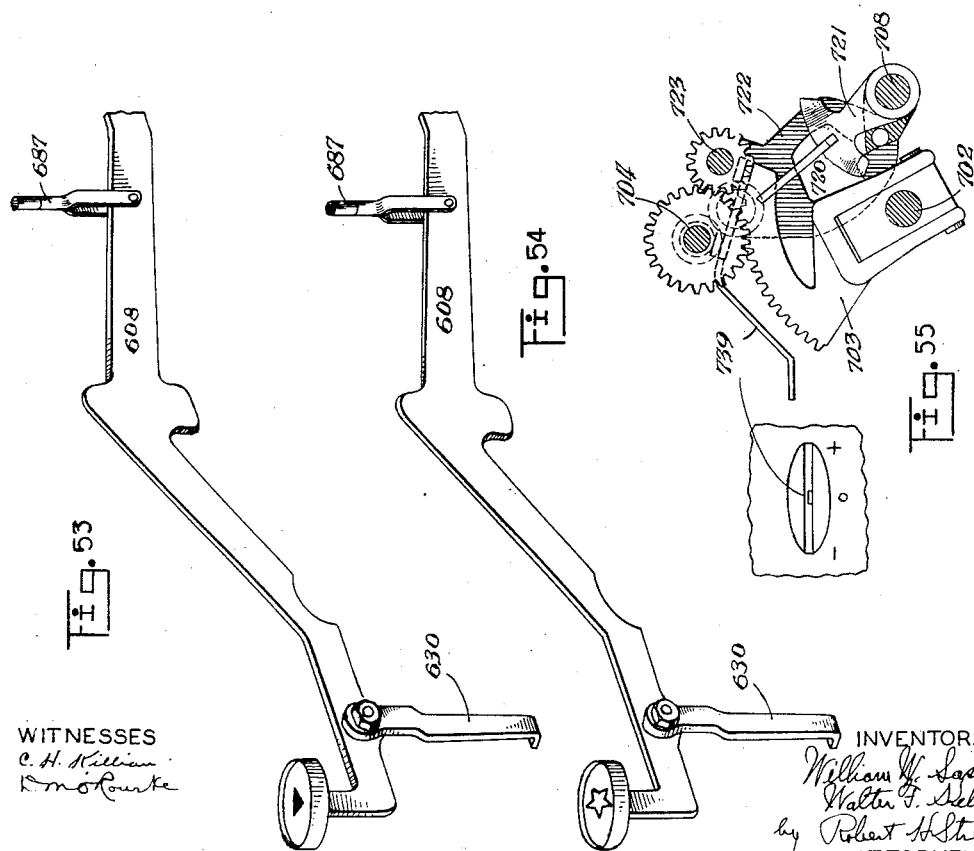
WITNESSES
INVENTORS
William W. Lasker
Walter F. Selby
by Robert H. Strother
ATTORNEY

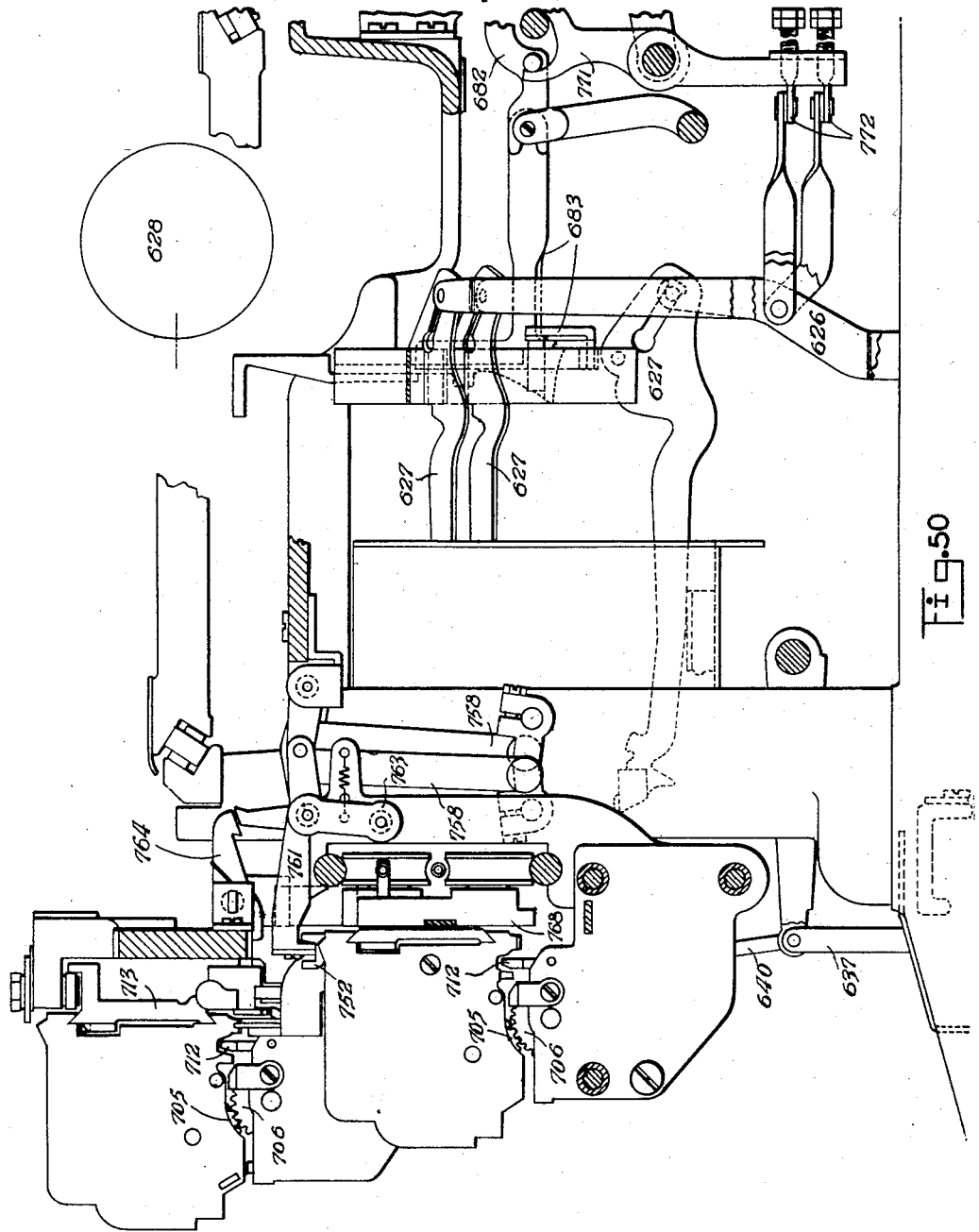

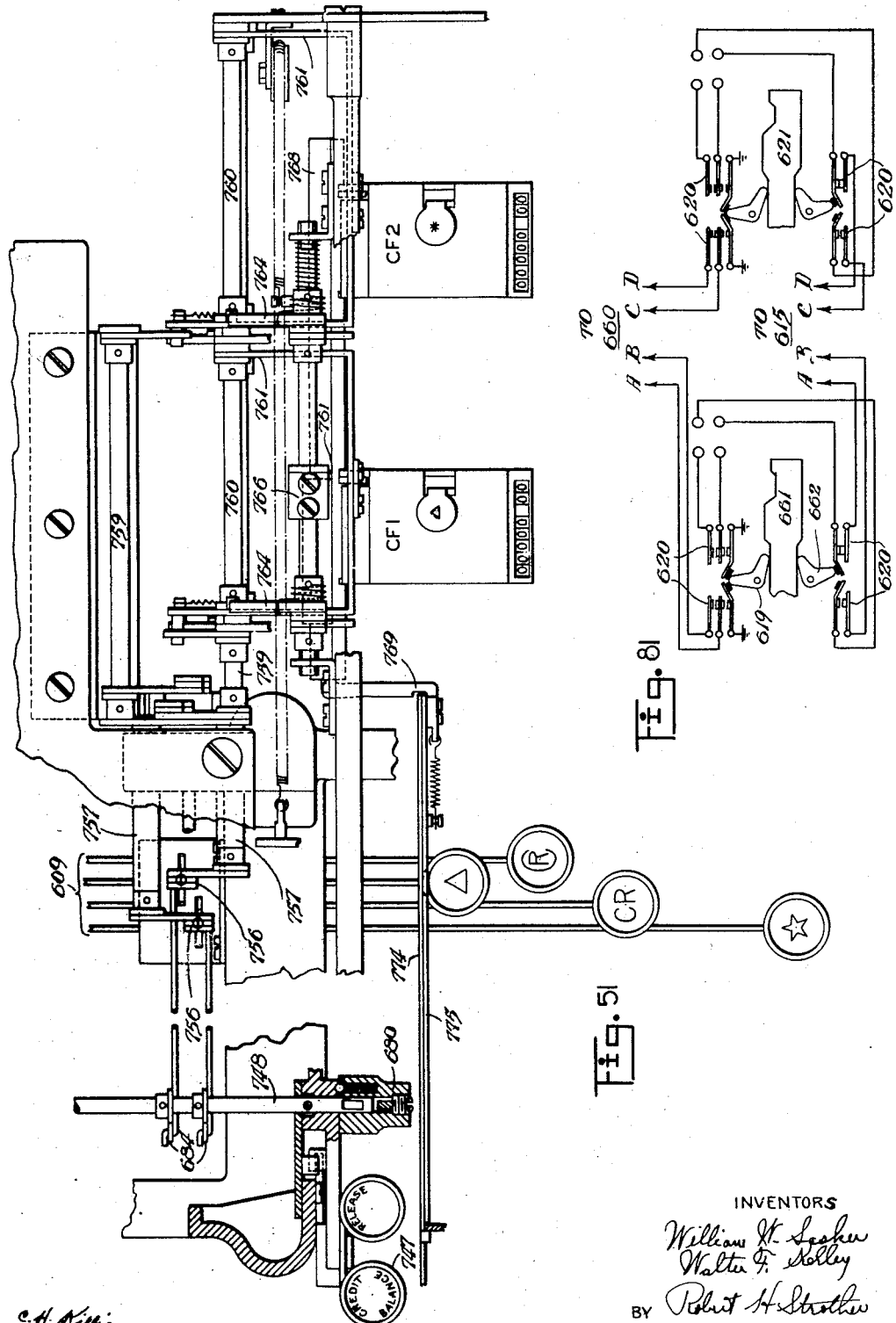

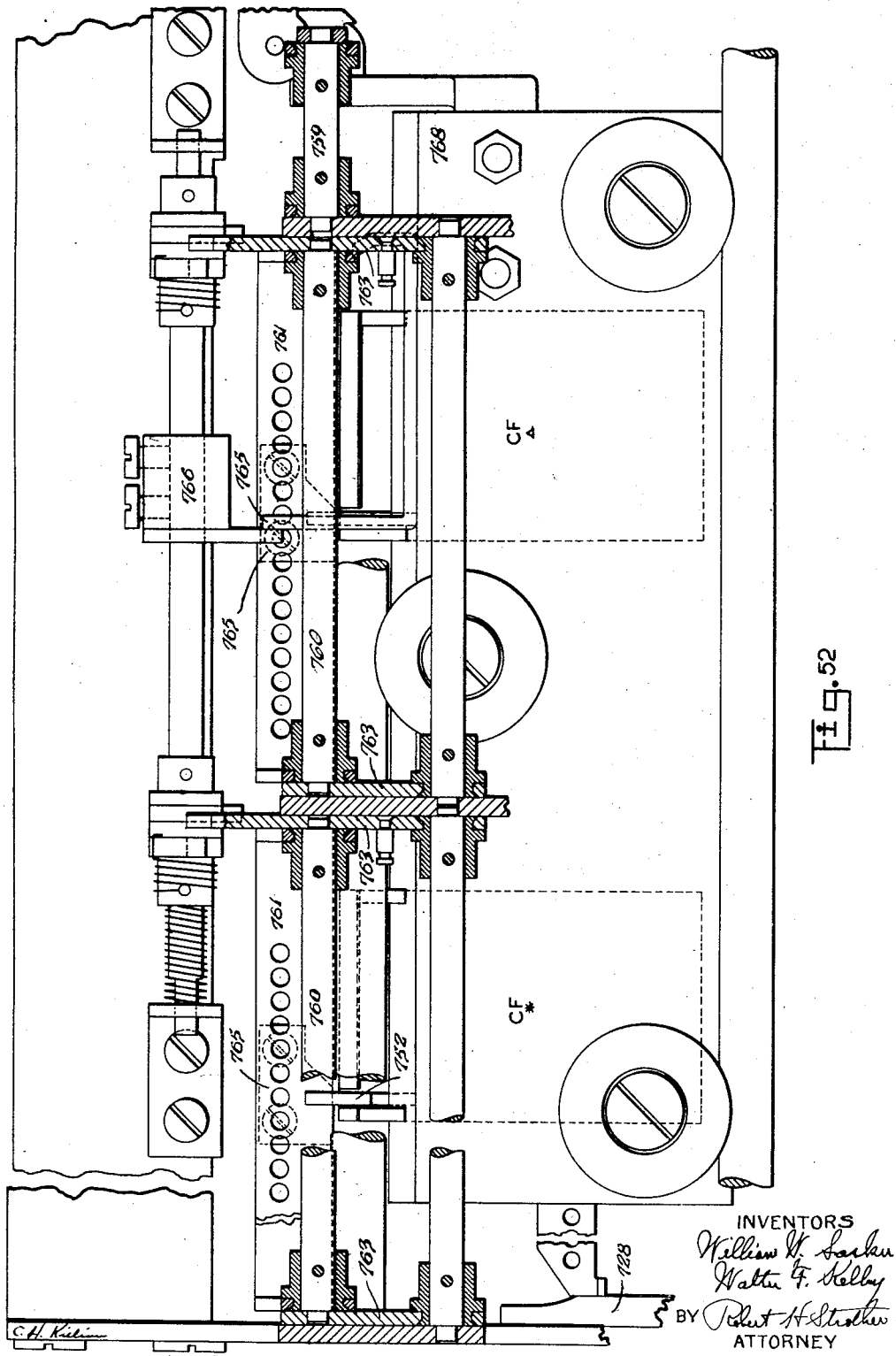

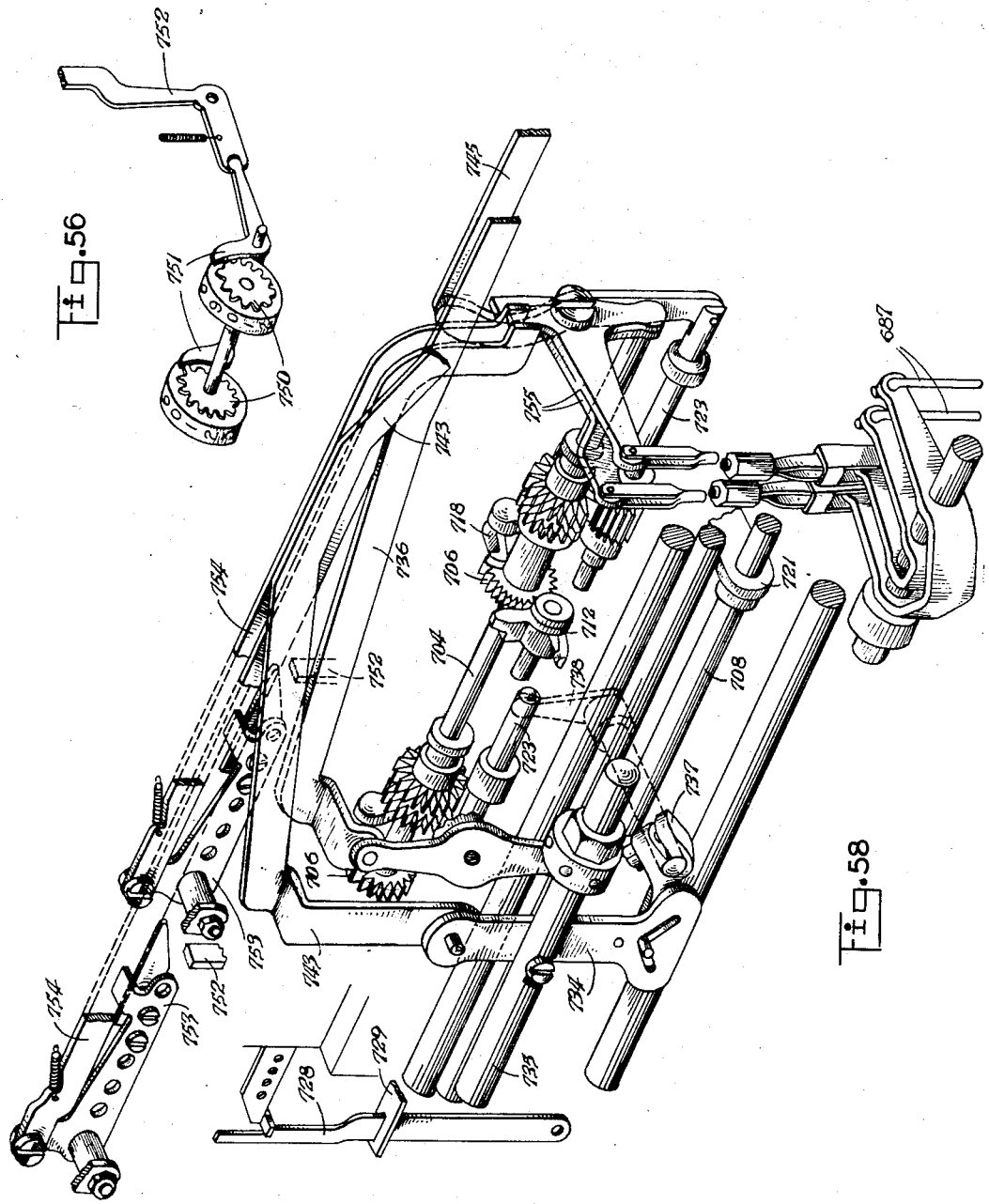

July 11, 1939.　　W. W. LASKER ET AL　　2,165,556
ACCOUNTING SYSTEM AND MACHINE
Filed Sept. 28, 1932　　49 Sheets-Sheet 36
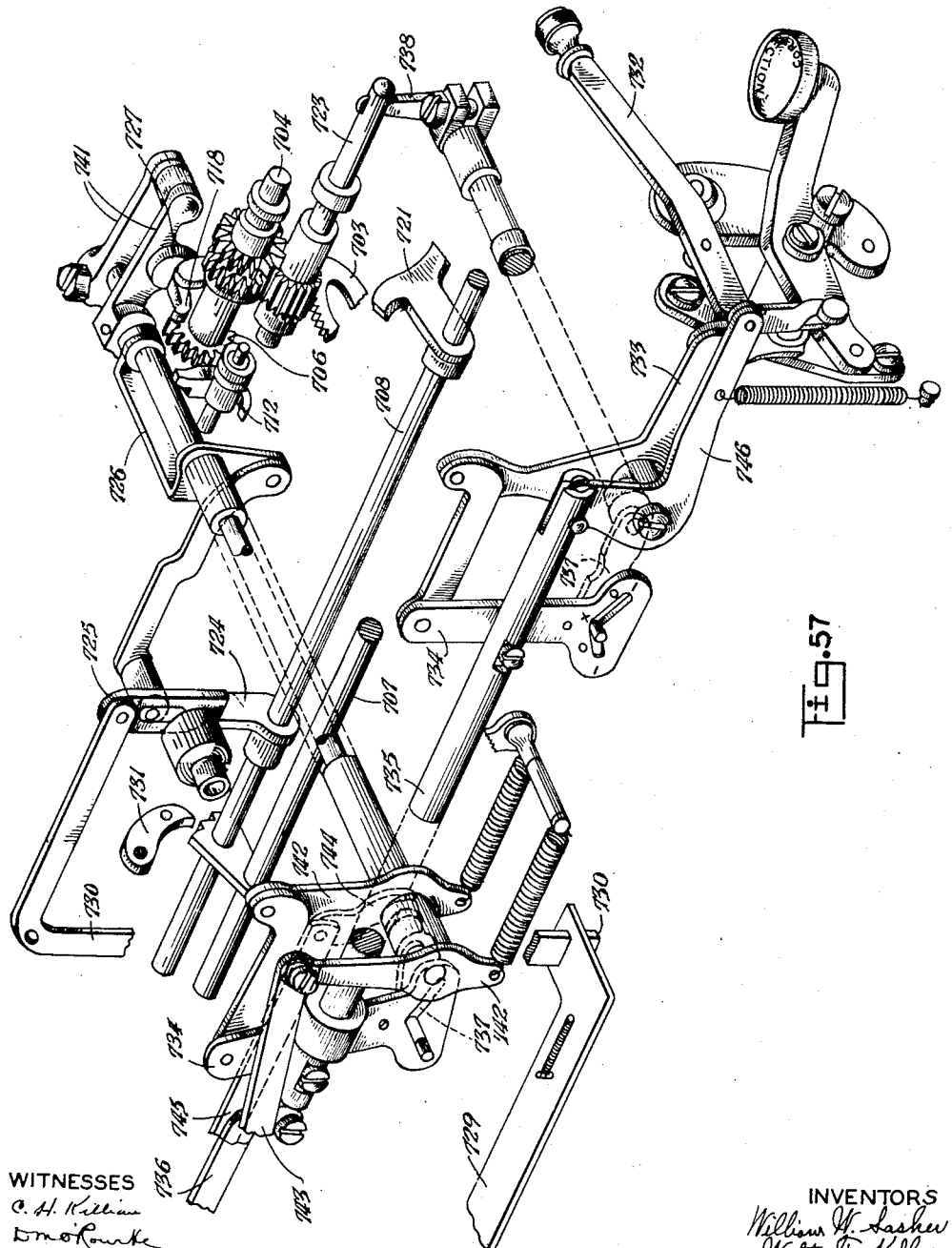

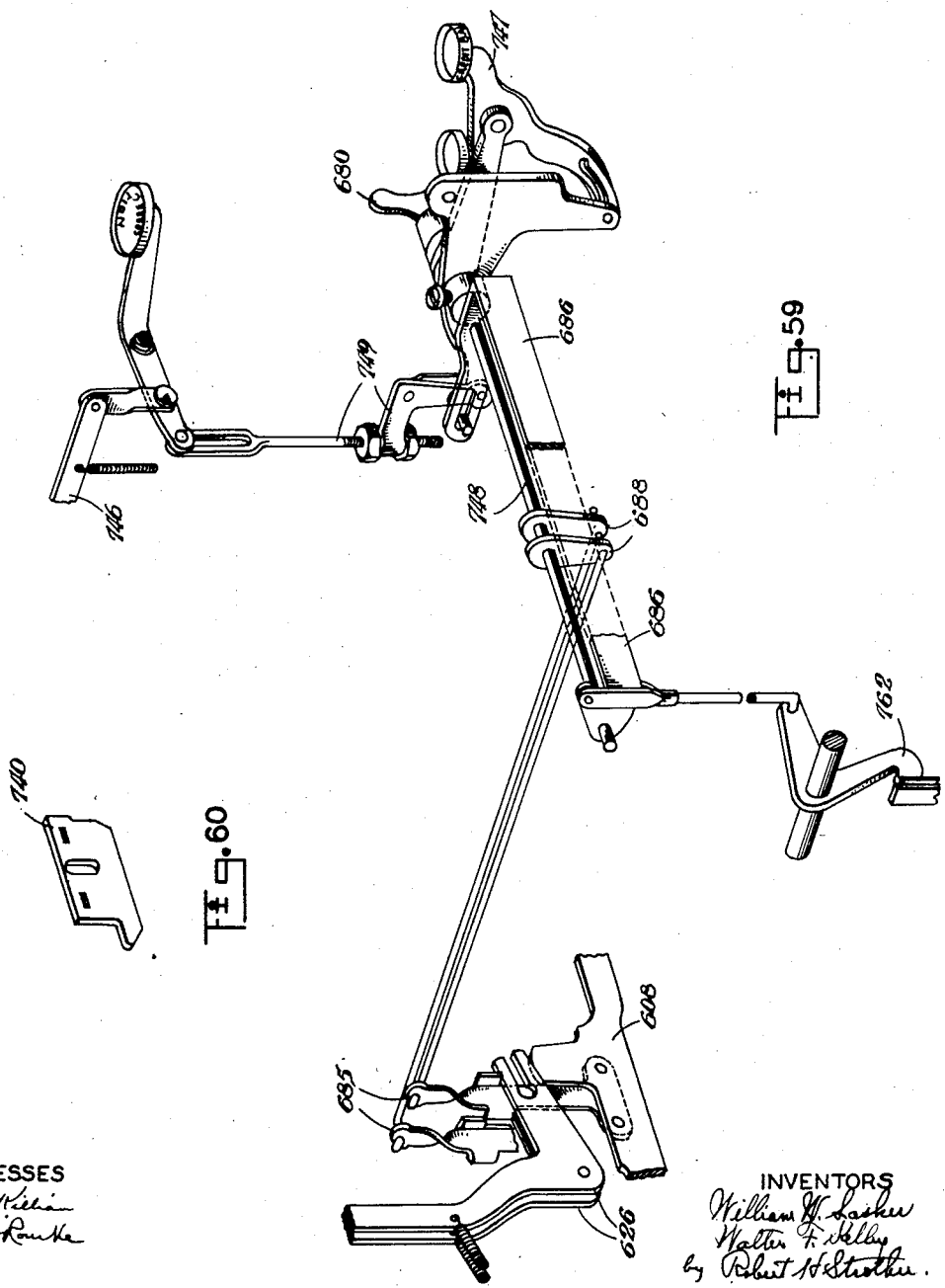

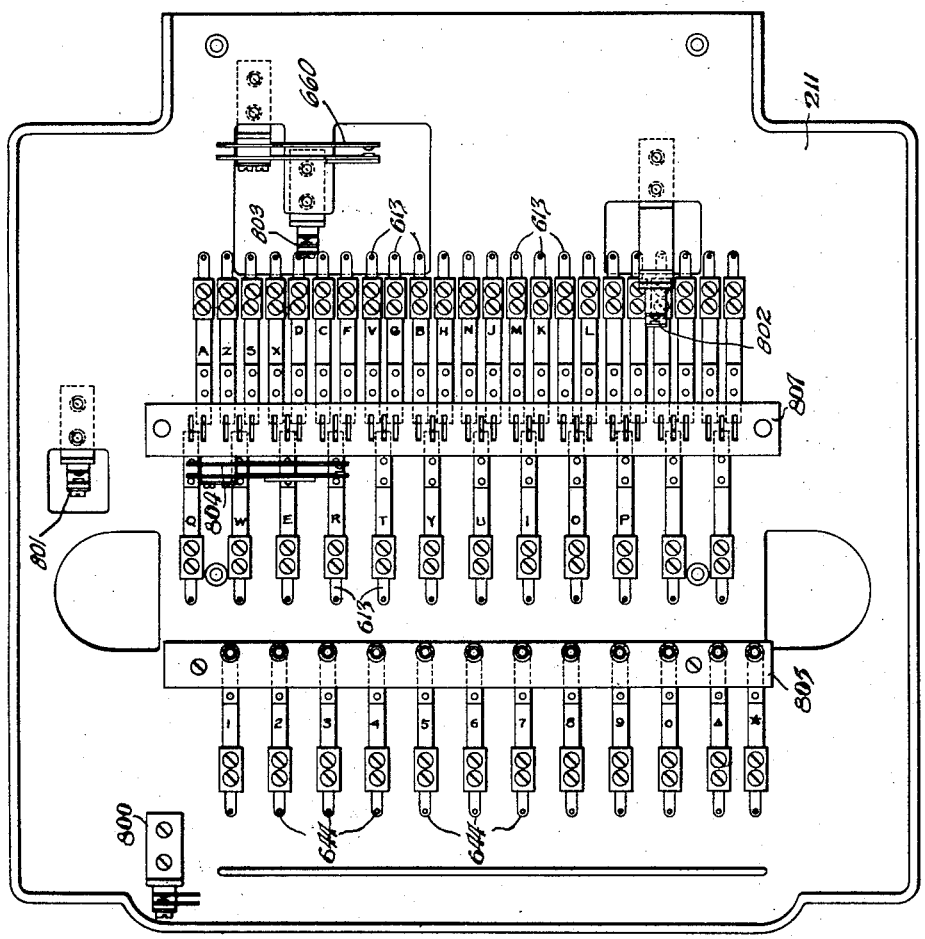

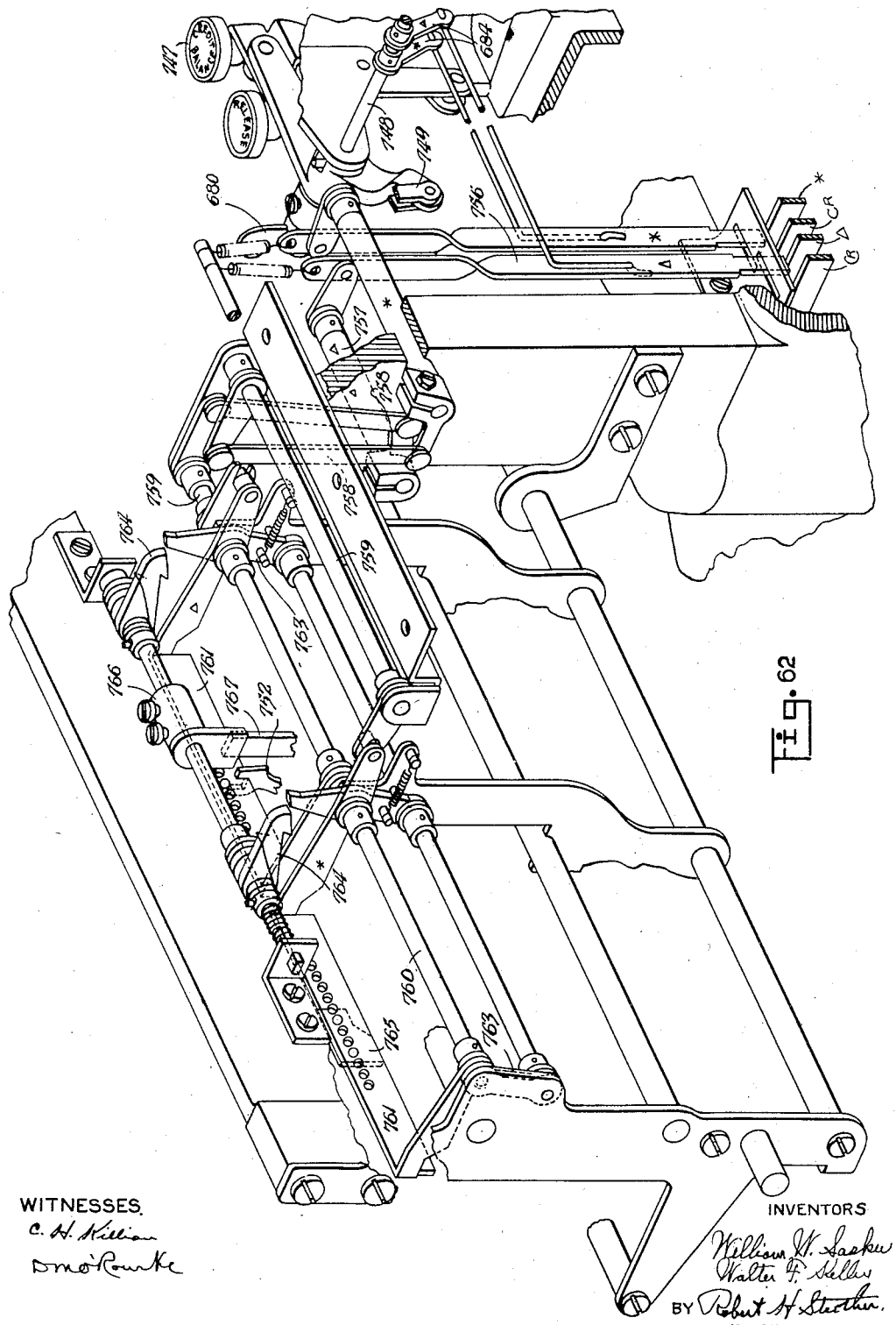

July 11, 1939.   W. W. LASKER ET AL   2,165,556
ACCOUNTING SYSTEM AND MACHINE
Filed Sept. 28, 1932   49 Sheets-Sheet 40
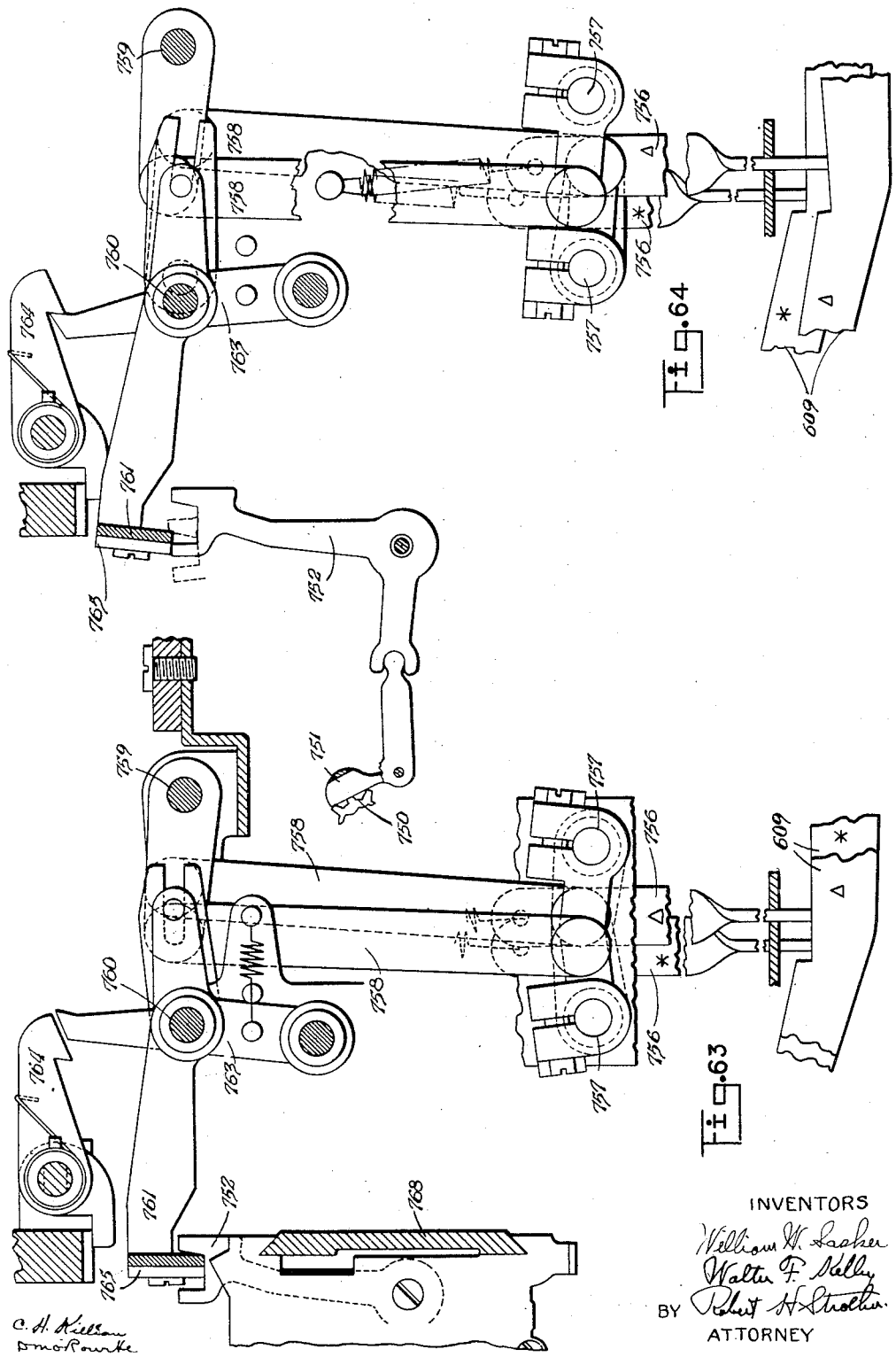

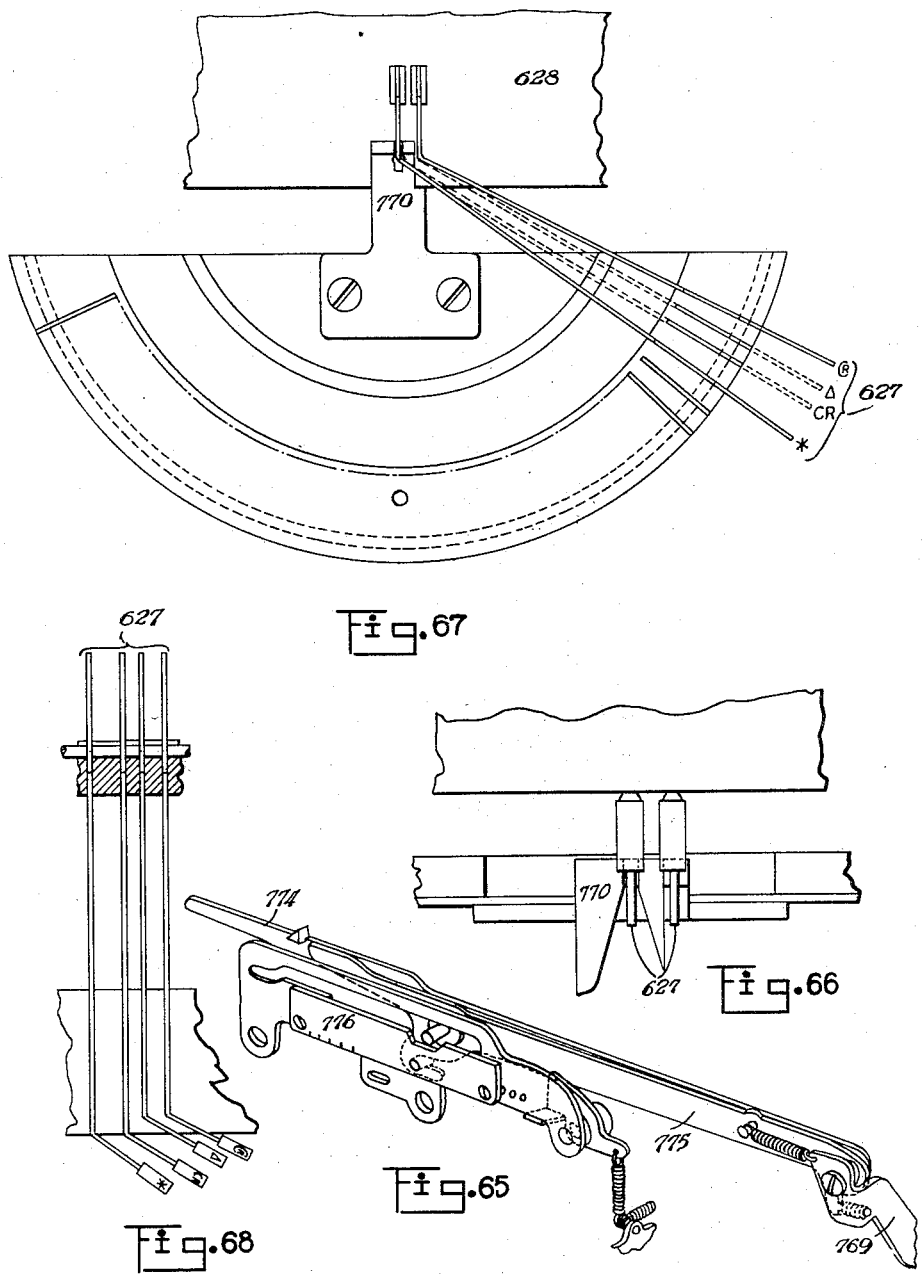

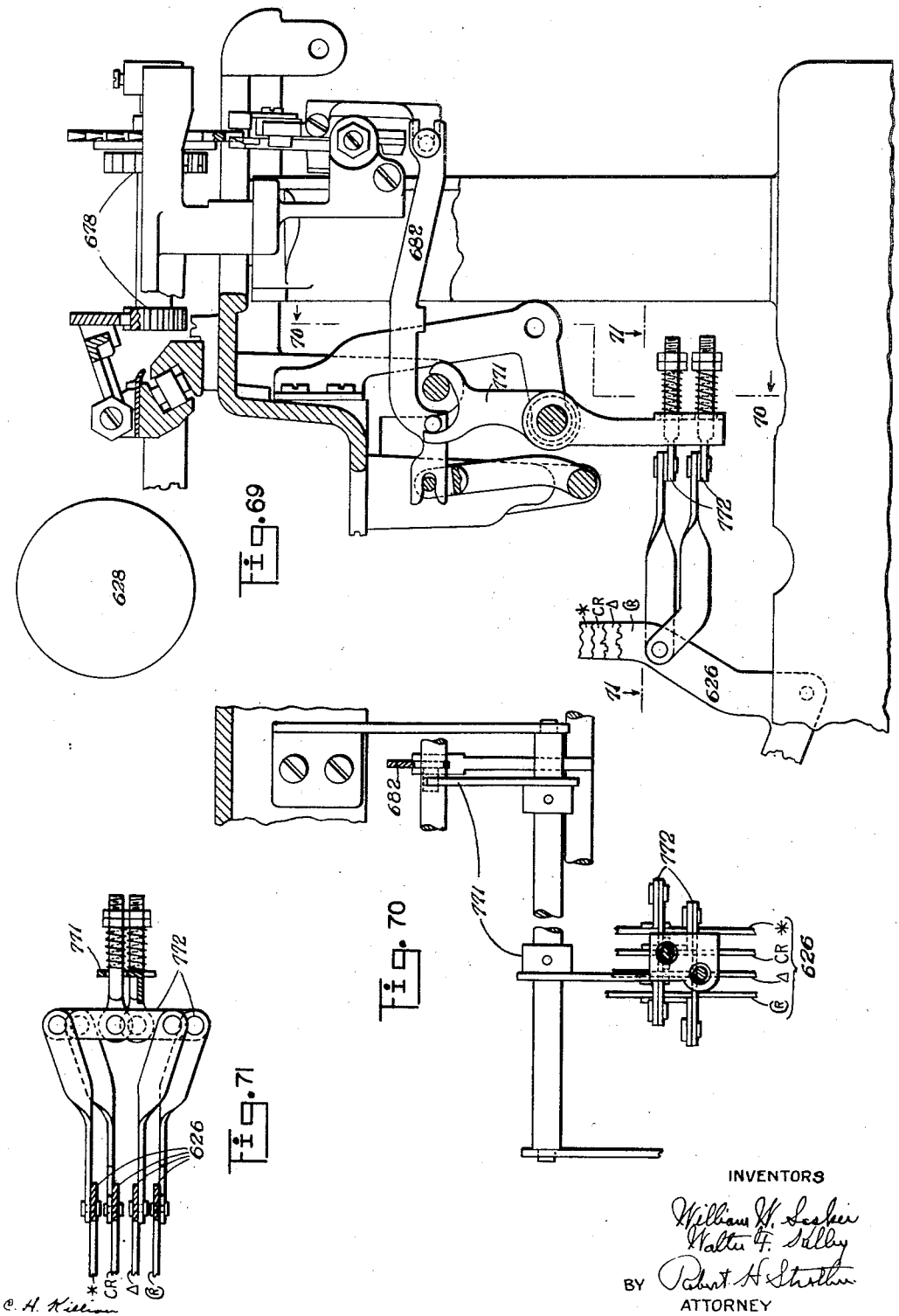

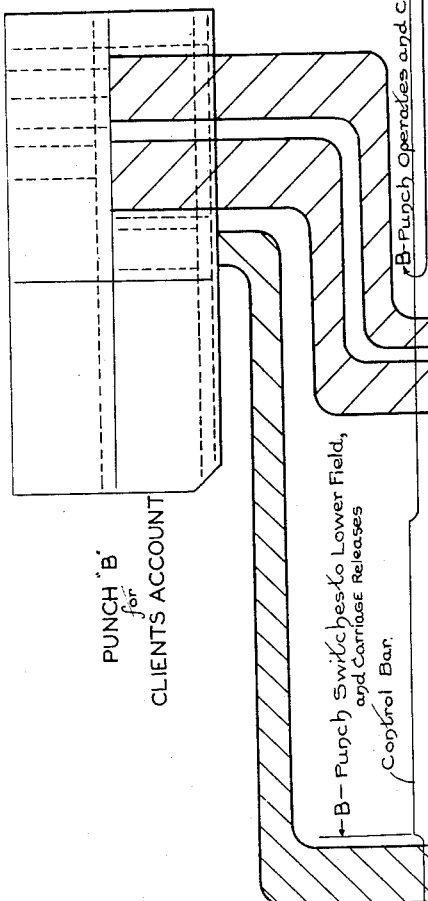

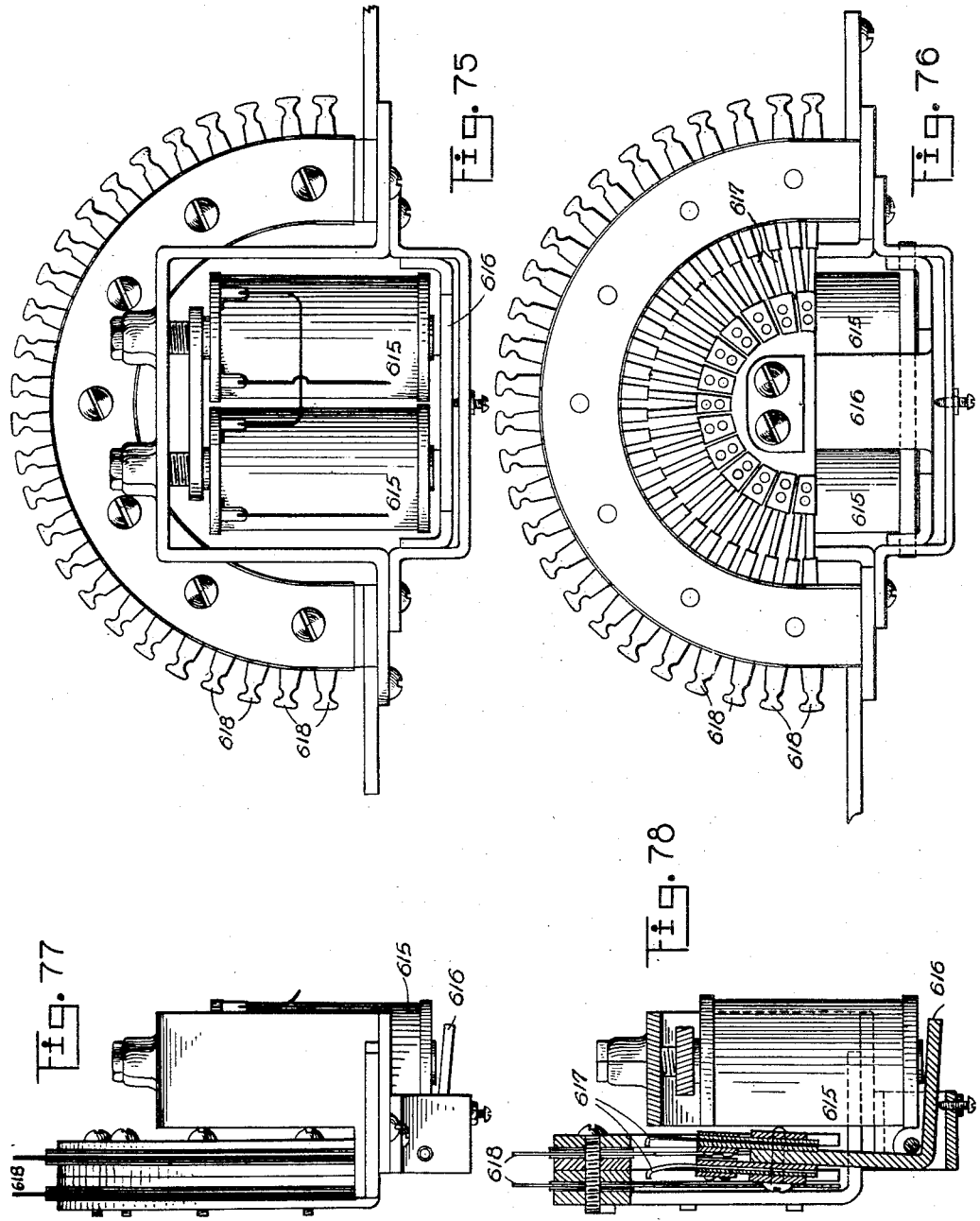

July 11, 1939.  W. W. LASKER ET AL  2,165,556
ACCOUNTING SYSTEM AND MACHINE
Filed Sept. 28, 1932   49 Sheets-Sheet 45

WITNESSES
C. H. Killian
Dm O'Rourke

INVENTORS
William W. Lasker
Walter F. Selley
by Robert H. Strothers
ATTORNEY

July 11, 1939.   W. W. LASKER ET AL   2,165,556
ACCOUNTING SYSTEM AND MACHINE
Filed Sept. 28, 1932   49 Sheets—Sheet 49

Fig.85

Patented July 11, 1939

2,165,556

UNITED STATES PATENT OFFICE 2,165,556

ACCOUNTING SYSTEM AND MACHINE

William W. Lasker, Brooklyn, and Walter F. Kelley, Whitestone, N. Y., assignors to Remington Rand Inc., Buffalo, N. Y., a corporation of Delaware Application September 28, 1932, Serial No 635,186

5 Claims. (Cl. 235—58)

The present invention relates to accounting systems and machines and, particularly, to combined bookkeeping and perforating mechanisms utilized in producing a written record and a plurality of punched card records simultaneously. The invention comprehends a new punch of the Powers type, adapted to be controlled through the medium of a common form of typewriter bookkeeping machine, such as the well known Remington or Remington-Wahl machine.

In the solution of many accounting problems, it is desirable to produce a number of sets of records, one of which will be the original, as a journal sheet, and others of which will be subsequently used to construct secondary records, as, for example, ledger sheets.

As is well known, the Remington bookkeeping machine is frequently utilized to construct journal sheets, the vertical totalizers being so arranged on the truck, and the cross-footing totalizers controlled in such manner that automatic verification of the balances inserted on the journal sheet is provided. With the present combination of machines any or all of the data on the journal sheet may be transmitted to one of a plurality of punches, and, since the balance inserted on the journal sheet must be correct before the totalizers of the bookkeeping machine can be cleared, there is a check on the correctness of the items inserted into the punching mechanism.

One object of the invention is to provide a new punching mechanism, adapted to produce cards having greater capacity than those now in use, with a single punching operation.

Another object of the invention is to provide a punch with a single keyboard, which controls the setting of punching members to operate upon either one or both of two zones of a card of increased capacity.

Another object of the invention is to automatically verify the correctness of punching of all cards at the time of punching.

Another object of the invention is to provide mechanism for computing balances and verifying the correctness of such balances prior to the punching thereof on record cards.

Another object of the invention is to provide automatic mechanism to indicate by a sign adjacent the result of a computation the fact that that result is not the expected one, and at the same time to punch a card with a similar indication.

A still further object of the invention is to provide suitable switching mechanism for determining which of a plurality of punching mechanisms shall be connected to the bookkeeping machine to be controlled by it.

Other objects of the invention, as well as the construction and arrangement of the mechanisms will be apparent from consideration of the following specification, taken in connection with the annexed drawings, in which.

Figure 2:
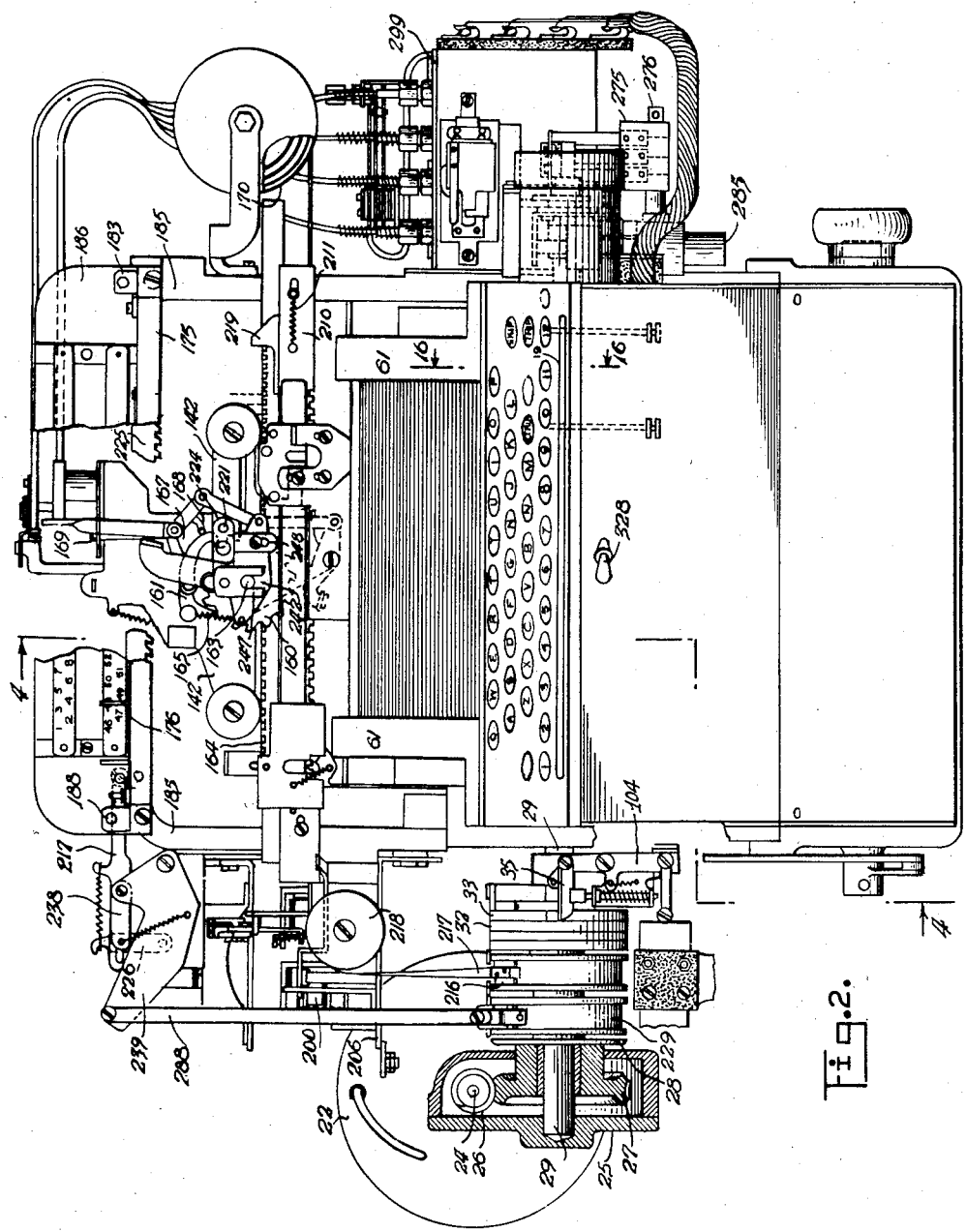
Fig. 2 is a front elevation of the modified punching mechanism used in this new combination.
Figures 3, 23:
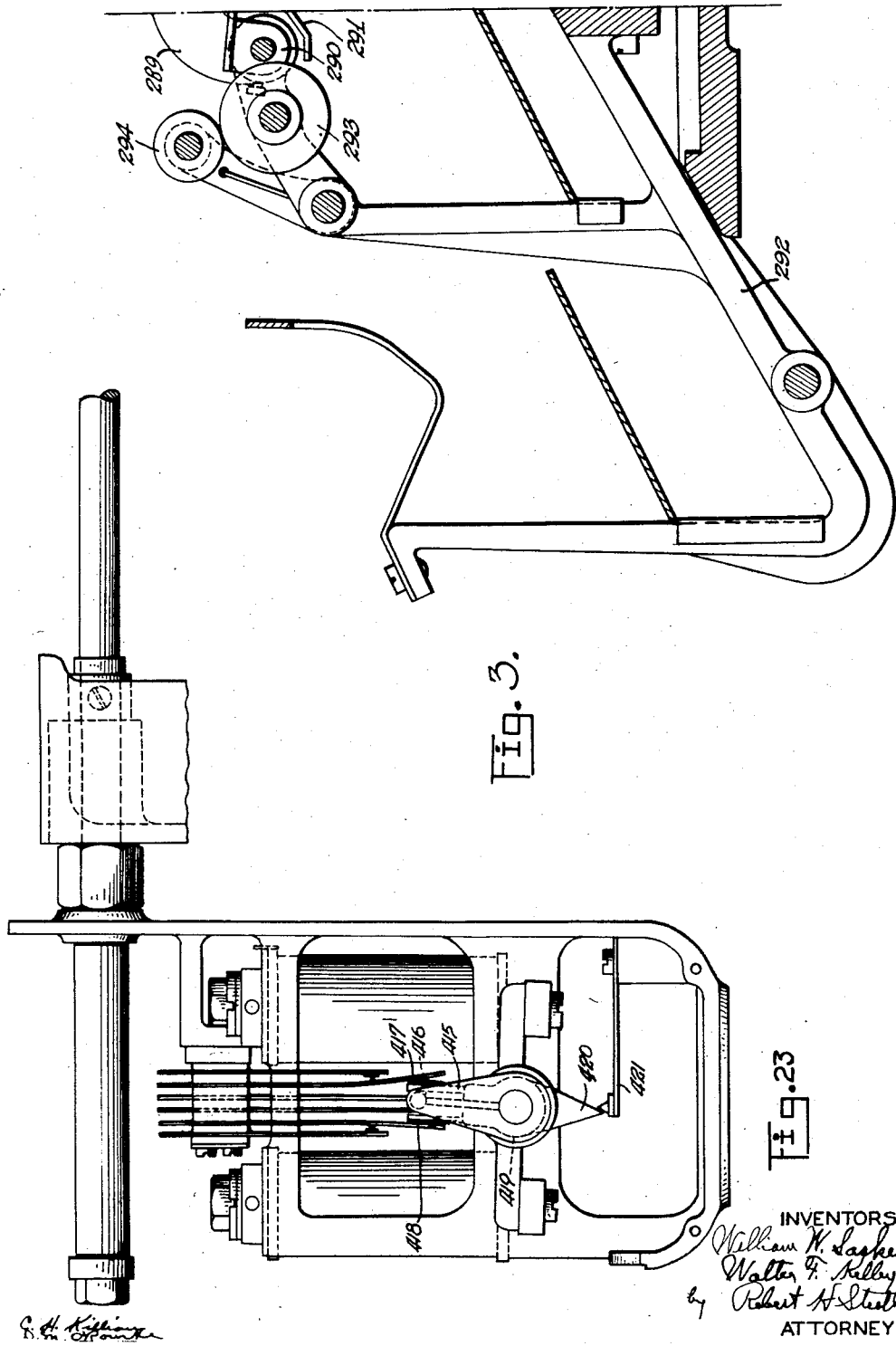

Figs. 3, 4 and 5, taken together, form a sectional view of the punching mechanism, taken along the line 4—4 of Fig. 2. This sectional view is to a larger scale than Fig. 2.

Fig. 6 is an isometric view of the retract mechanism of the punch.

Fig. 7 is a fragmentary cross section of the punch carriage, showing the construction of an improved back-spacing mechanism. In this view, the parts are shown in their normal position.

Fig. 8 is similar to Fig. 7 except that it shows the parts in position for releasing the punch set-up.

Fig. 9 is similar to Figs. 7 and 8, showing the parts in their extreme position subsequent to the completion of the back-space operation.

Fig. 10 is an isometric view of a punch carriage showing the improvements in the backspace, skip and cancelling mechanism.

Figure 11:
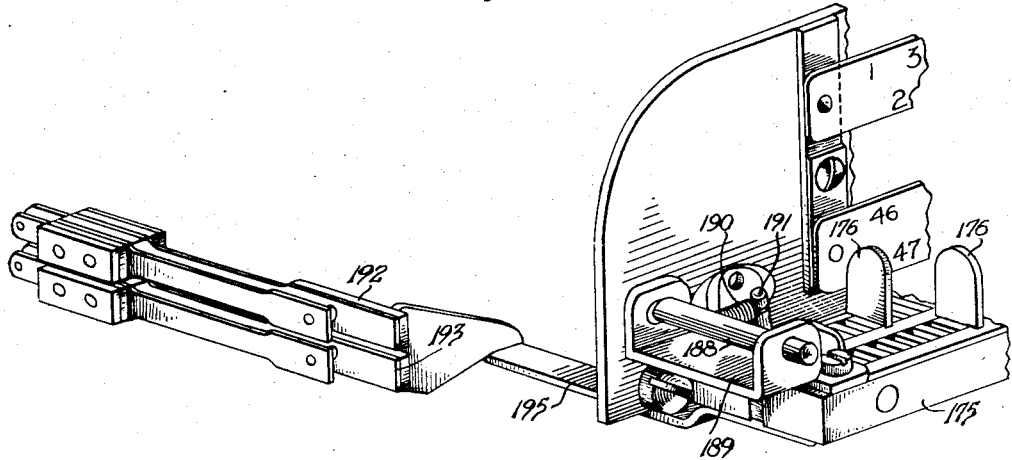

Fig. 11 is an isometric view of the skip bar and contacts controlled thereby to govern the operation of the skip mechanism of the punch.

Figure 12:
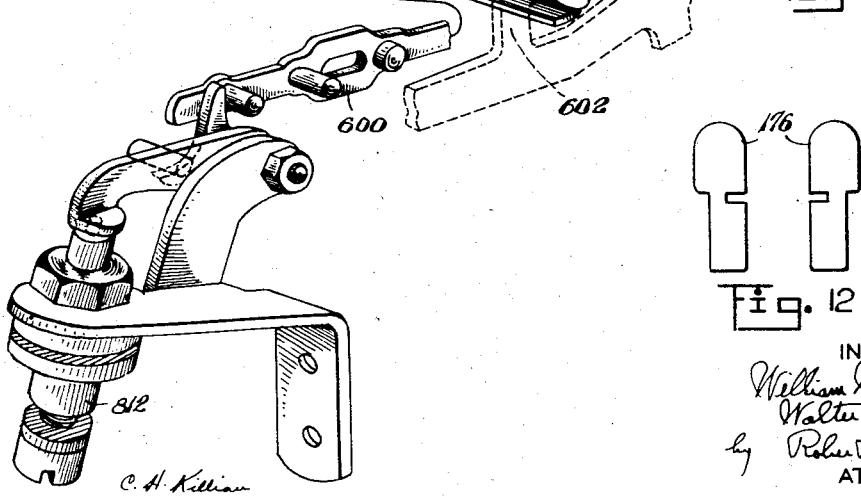

Fig. 12 shows details of the skip stops of the punch.

Fig. 13 is an isometric view of the control relays and latches which govern the carriage return and backspace functions, and which are themselves governed by the carriage return and backspace keys.

Fig. 14 is an isometric view showing the mechanism for causing the punch carriage to return to an intermediate position.

Fig. 15 is an isometric view of a mechanism for causing duplicate cards to be punched and ejected into separate receptacles.

Fig. 16 is a cross sectional view of the keyboard of a punch, taken along the line 16—16 of Fig. 2.

Fig. 17 is a view showing the detail of a single contact such as is used in the sub-base of the bookkeeping machine and the keyboard of the punch.

Fig. 18 is a view showing the detail of a double or two-circuit contact, which is utilized in connection with the fraction keys of the bookkeeping machine.

Fig. 19 is a diagram of locking mechanism for the form of a transfer switch shown in section in Fig. 16.

Fig. 20 is a cross-sectional view of a modified transfer switch.

Fig. 21 is an end elevation of the locking mechanism of the modified transfer switch.

Fig. 22 is a front elevation of the modified transfer switch.

Fig. 23 is an end elevation of the same form of transfer switch taken from the opposite direction from that of Fig. 21.

Fig. 24 is a view of a record card illustrating the code employed for 45-column punching, both numeric and alphabetic.

Fig. 25 is a view of a record card showing the code employed for 90-column perforations in both upper and lower 90-column zones. This figure illustrates both digital and fractional 90-column code perforations and alphabetic 45-column perforations as well as perforations for representing certain fractions.

Figure 1:
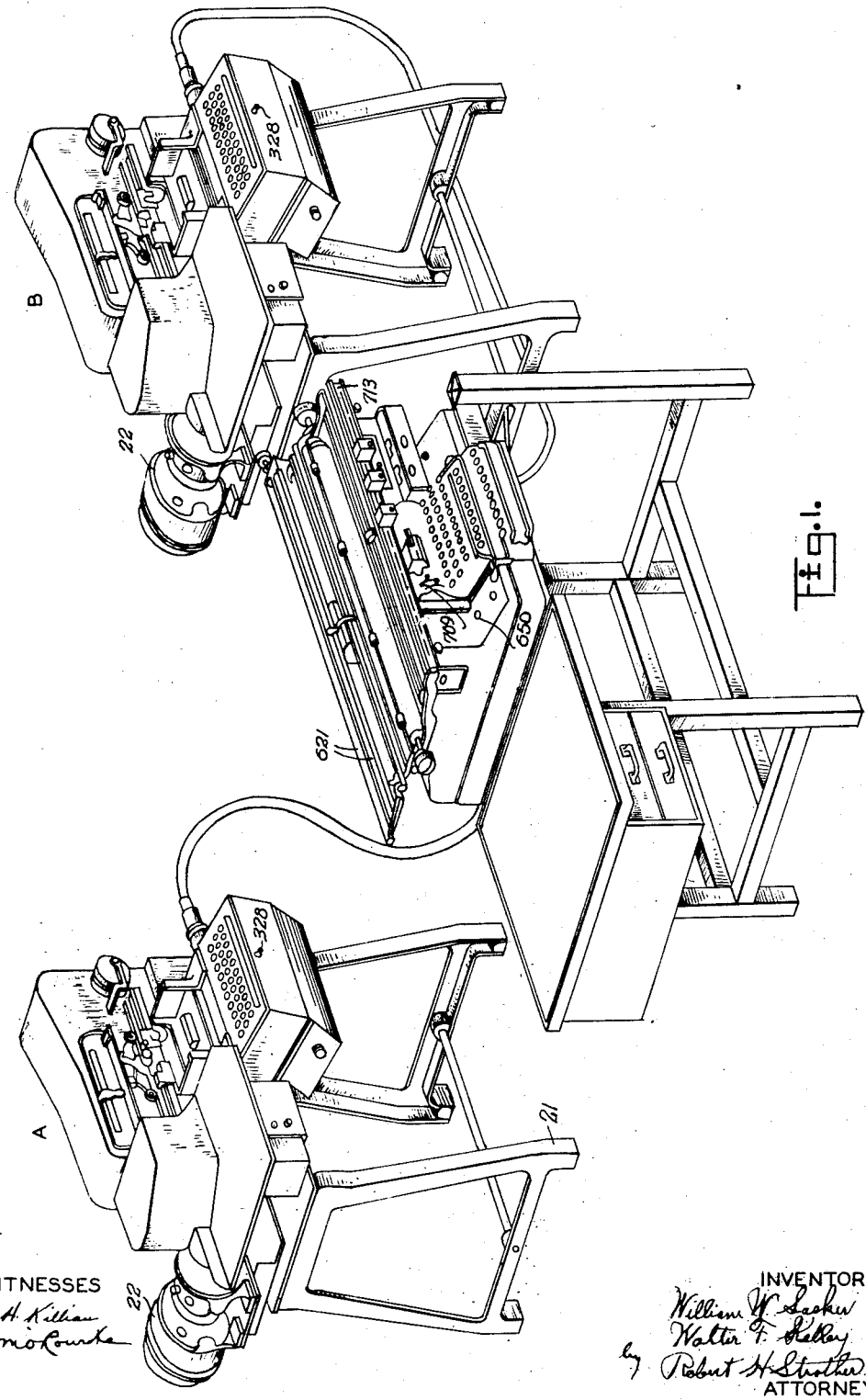
Fig. 1 is an isometric view showing a bookkeeping machine connected by cables with two punching mechanisms.

Fig. 26 is an isometric view of a punch similar to those shown in Fig. 1, but mounted upon a typewriter table rather than upon the usual base.

Figure 28:
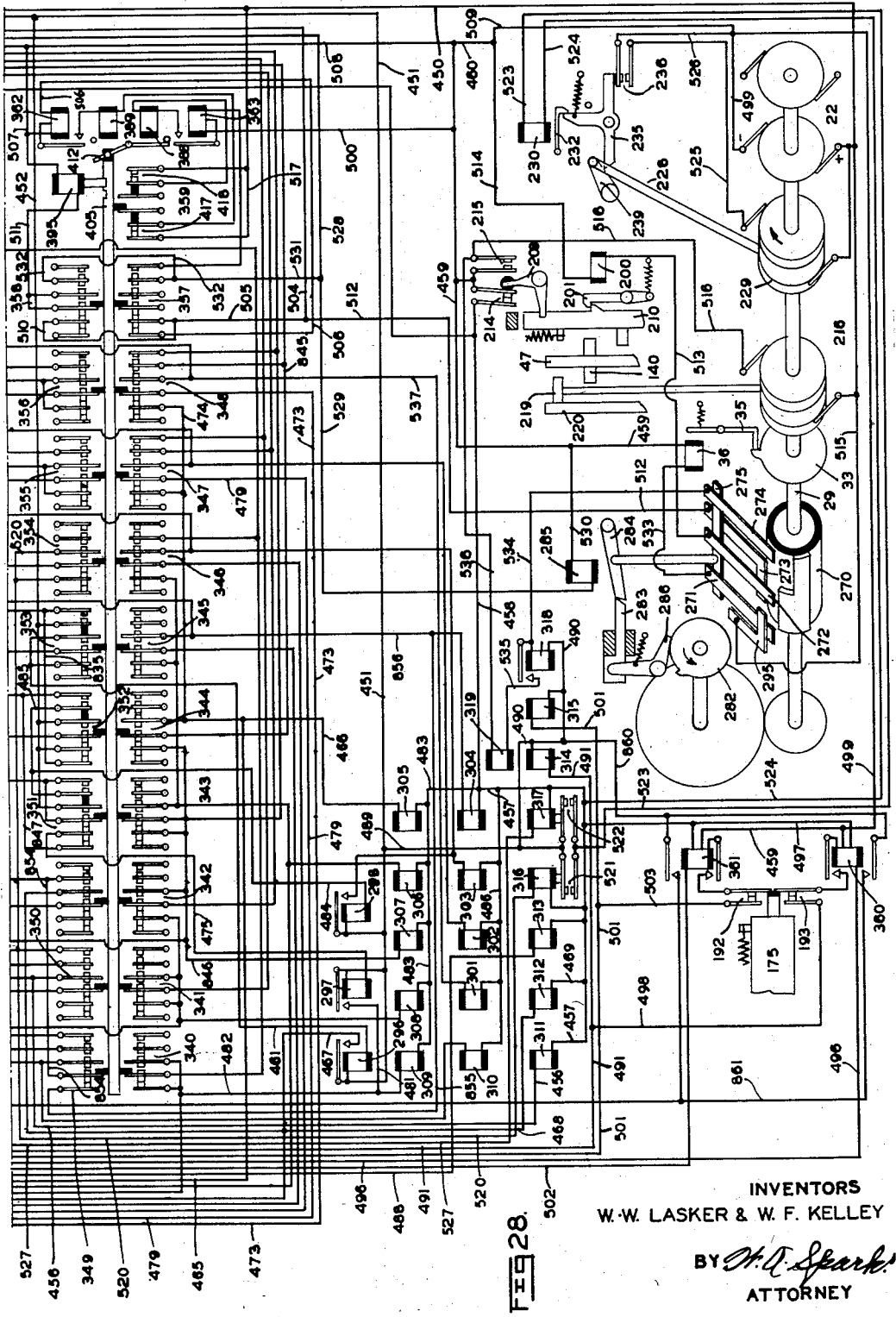

Figs. 27 and 28 together are a circuit diagram of one of the punches (punch "A").

Figure 29:
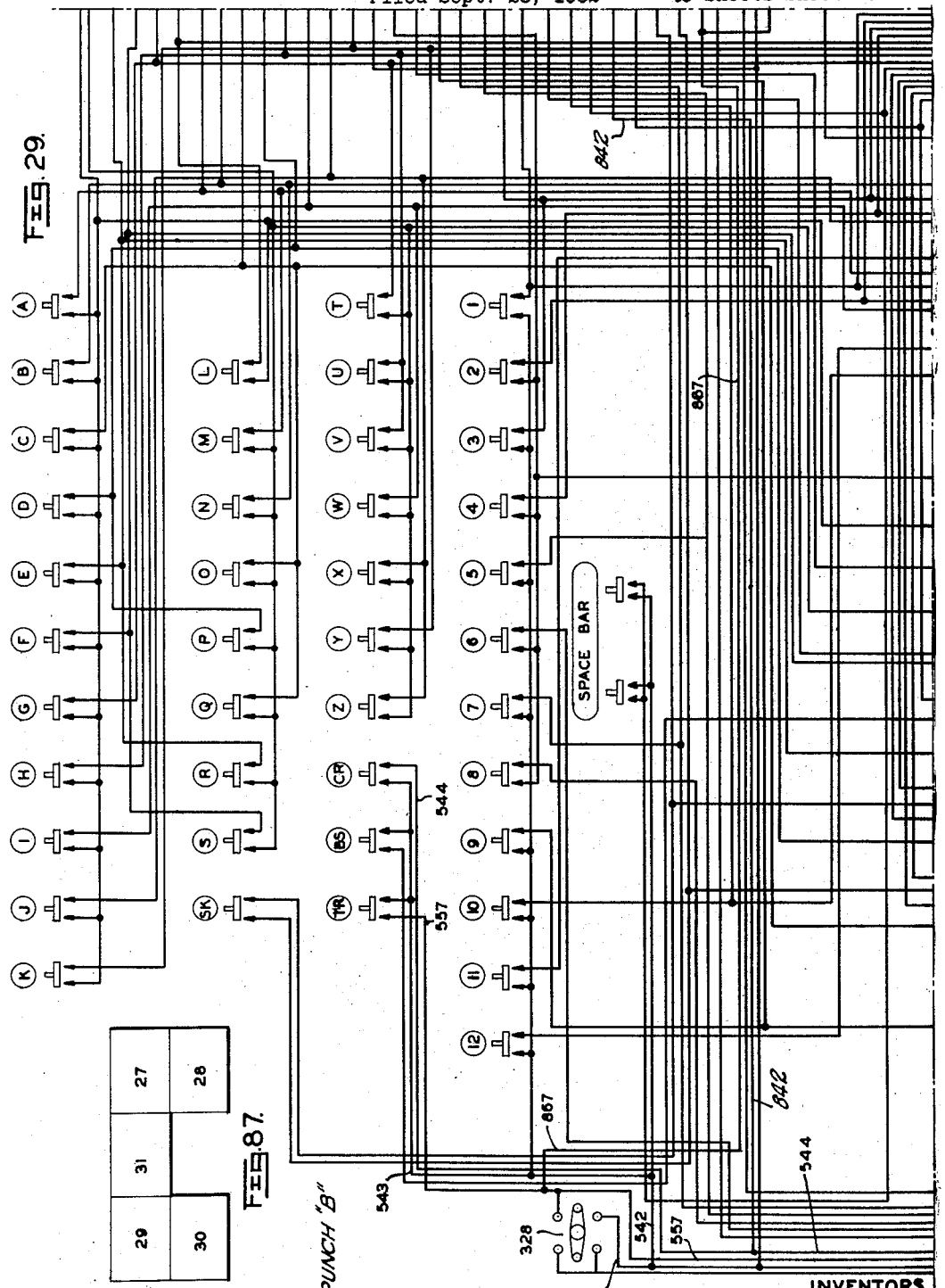
Figure 30:
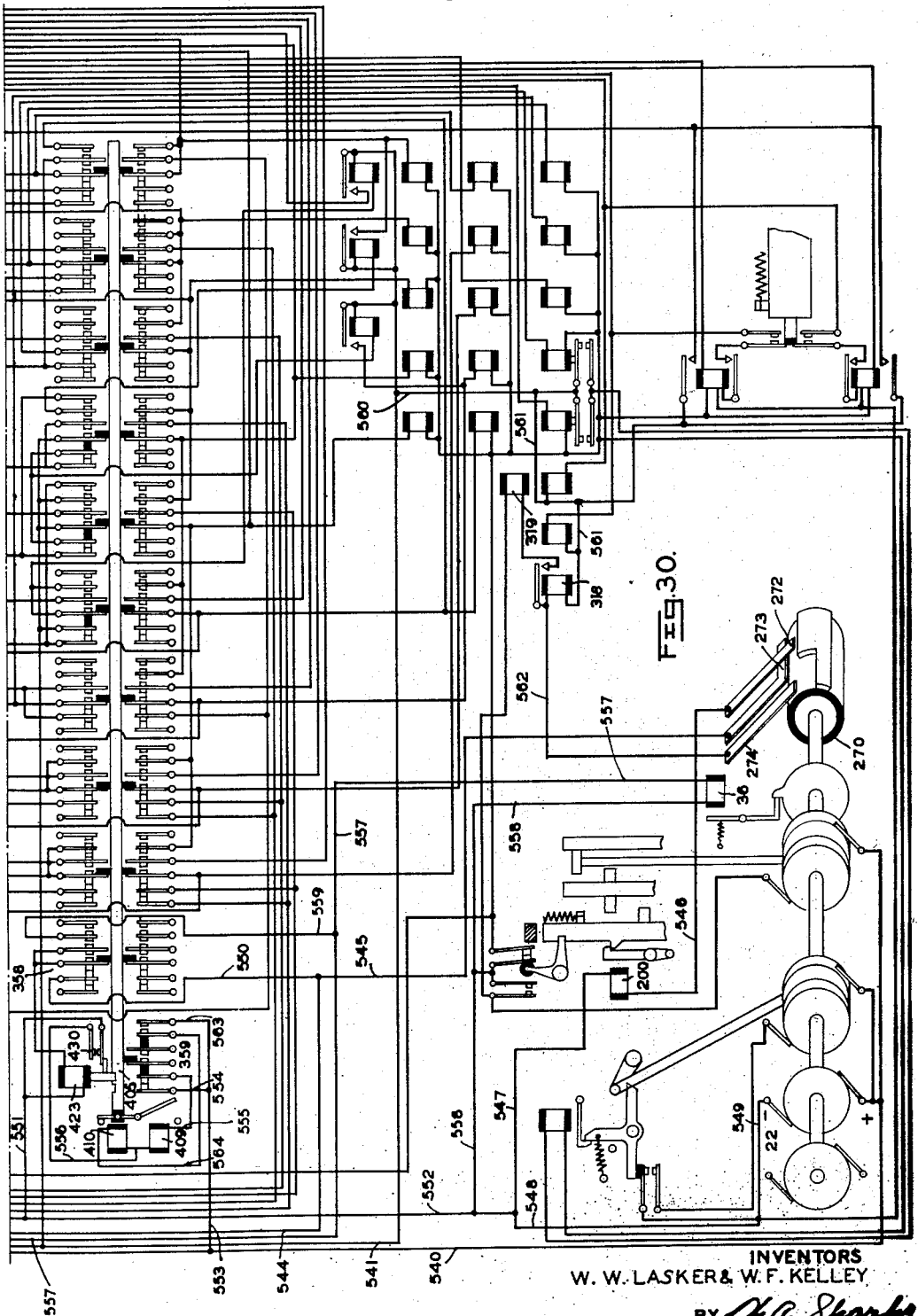

Figs. 29 and 30 are diagrams of another punch (punch "B"). This diagram is similar to that of Figs. 27 and 28 and differs from them chiefly in that the modified transfer switch and its connections are shown.

Figure 31:
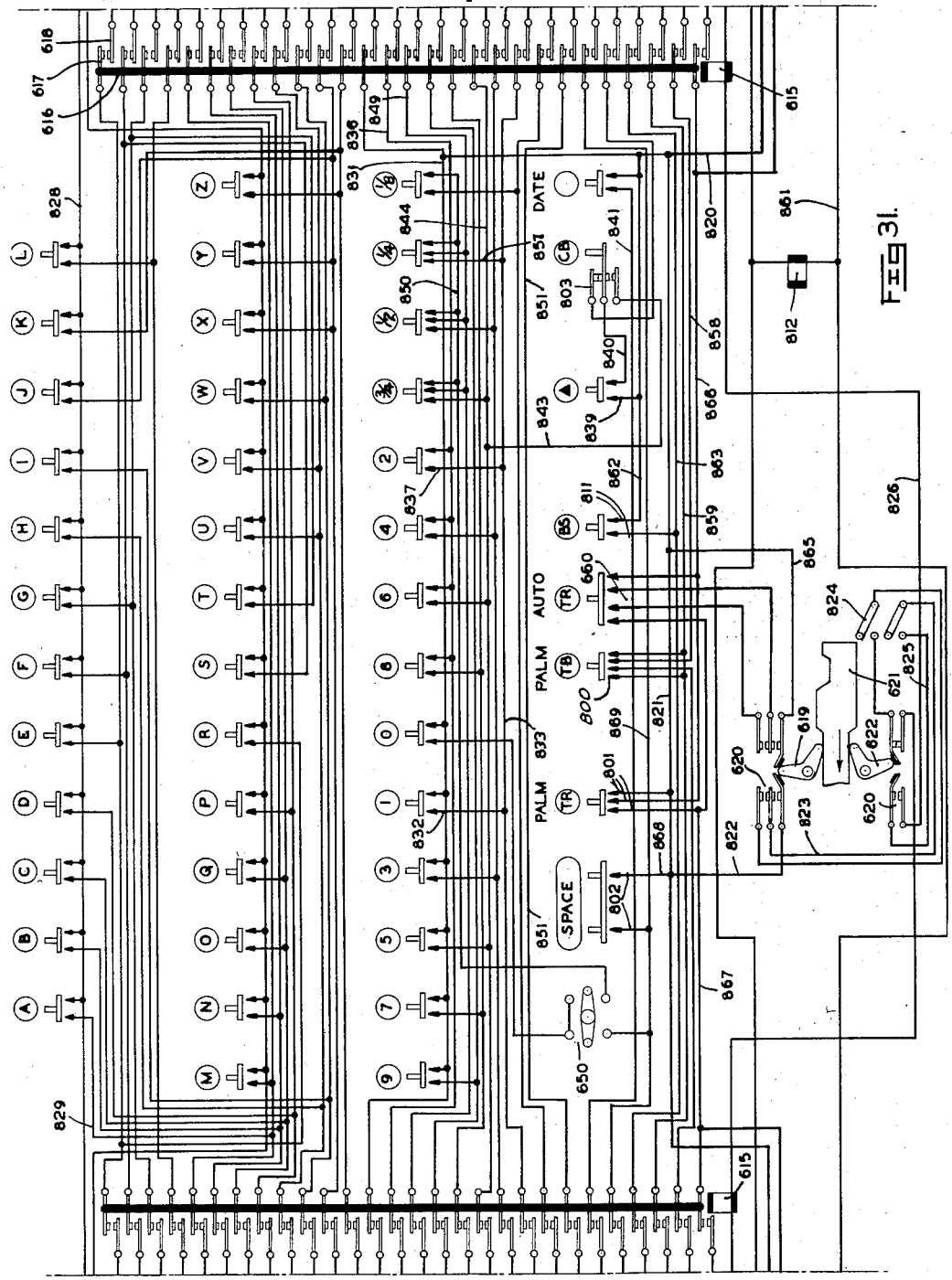

Fig. 31 is a circuit diagram of the contact mechanism of the bookkeeping machine. It is to be noted that the complete circuit of the entire machine combination is shown, therefore, in Figs. 27 through 31.

Figure 32:
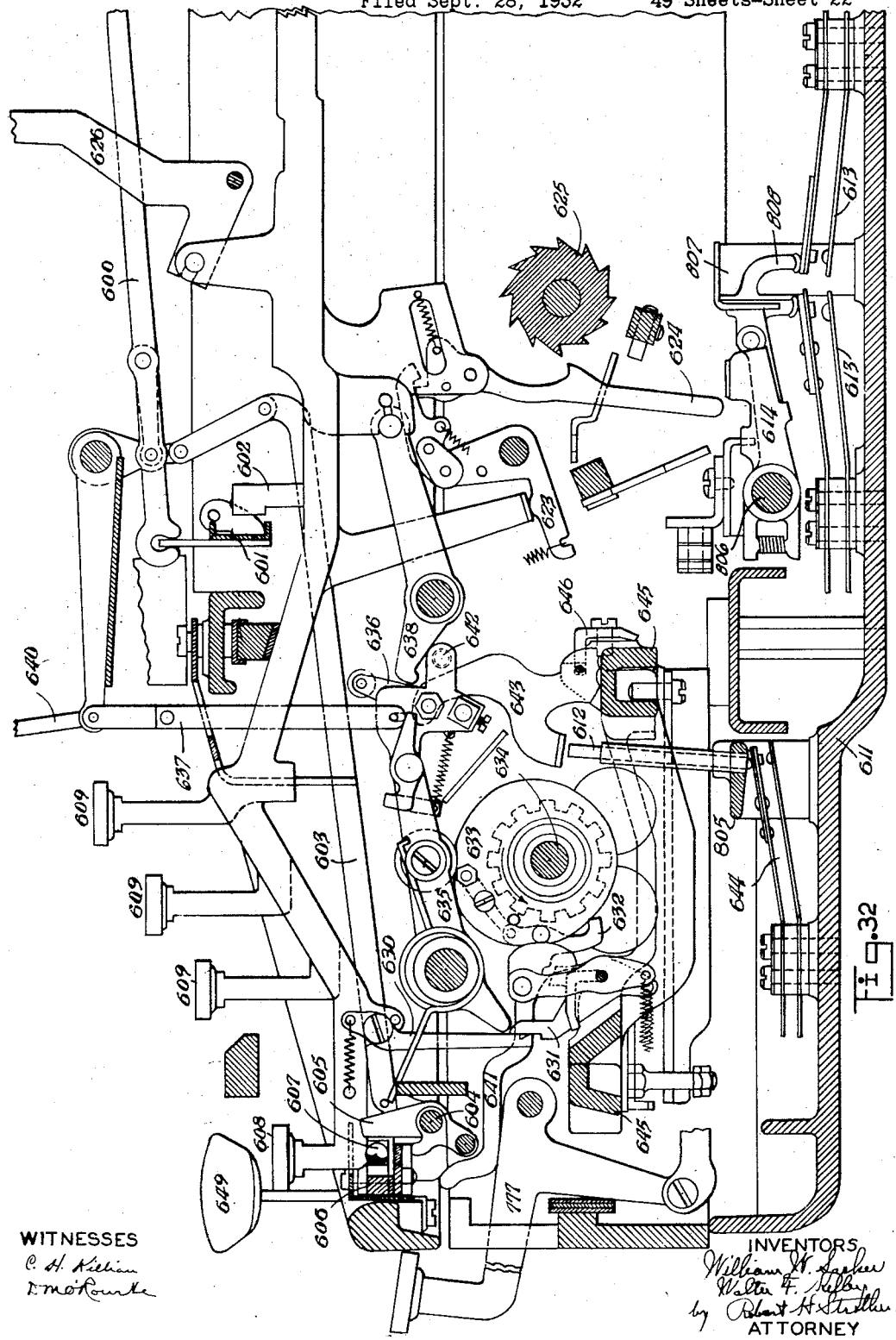

Fig. 32 is a sectional view of the keyboard of the bookkeeping machine showing the mechanism associated with the various key levers.

Figure 33:
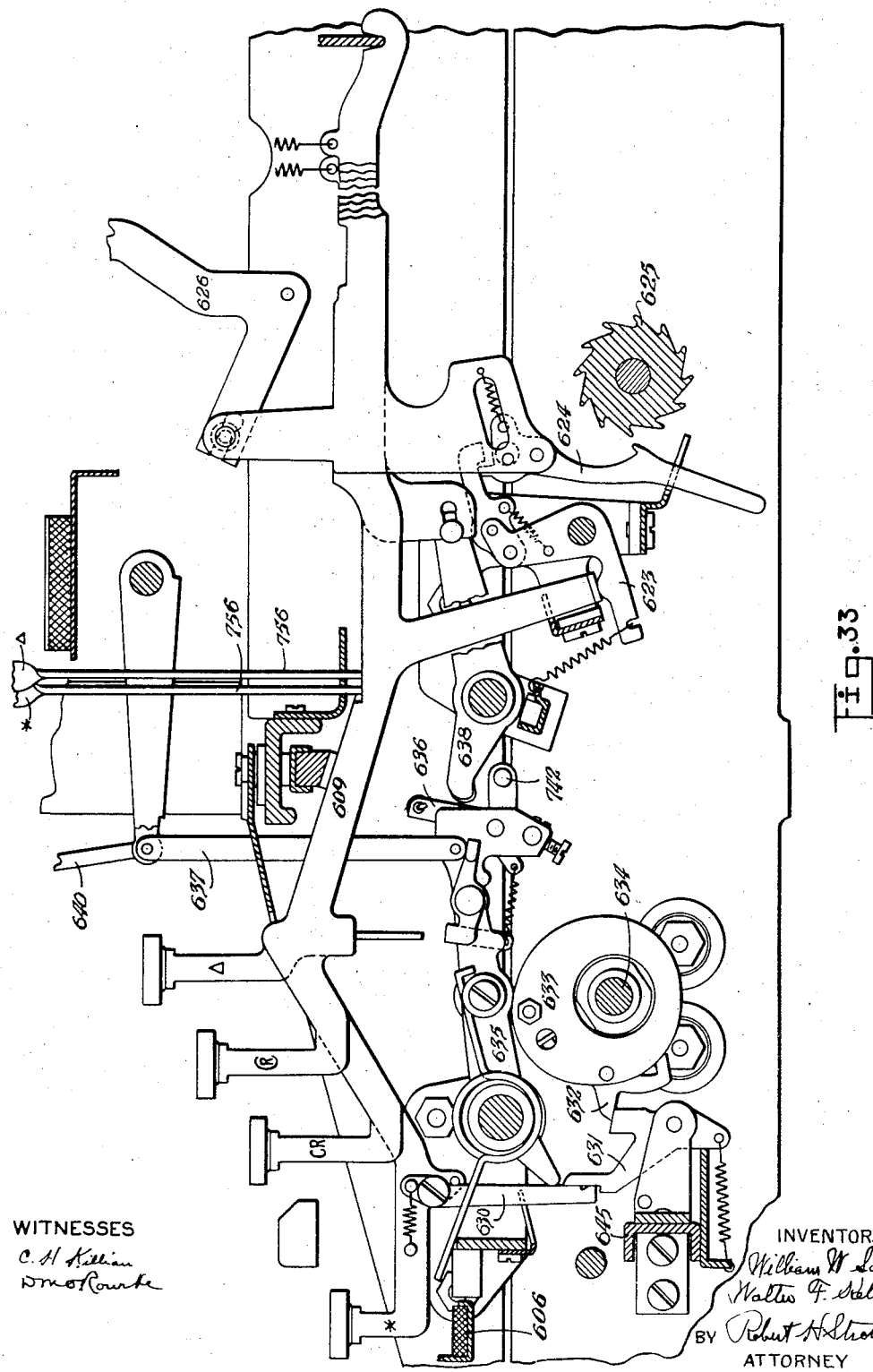

Fig. 33 is a sectional view of the forward portion of the bookkeeping machine showing the power responsive mechanism associated with the special automatic clear sign key mechanisms.

Figure 34:
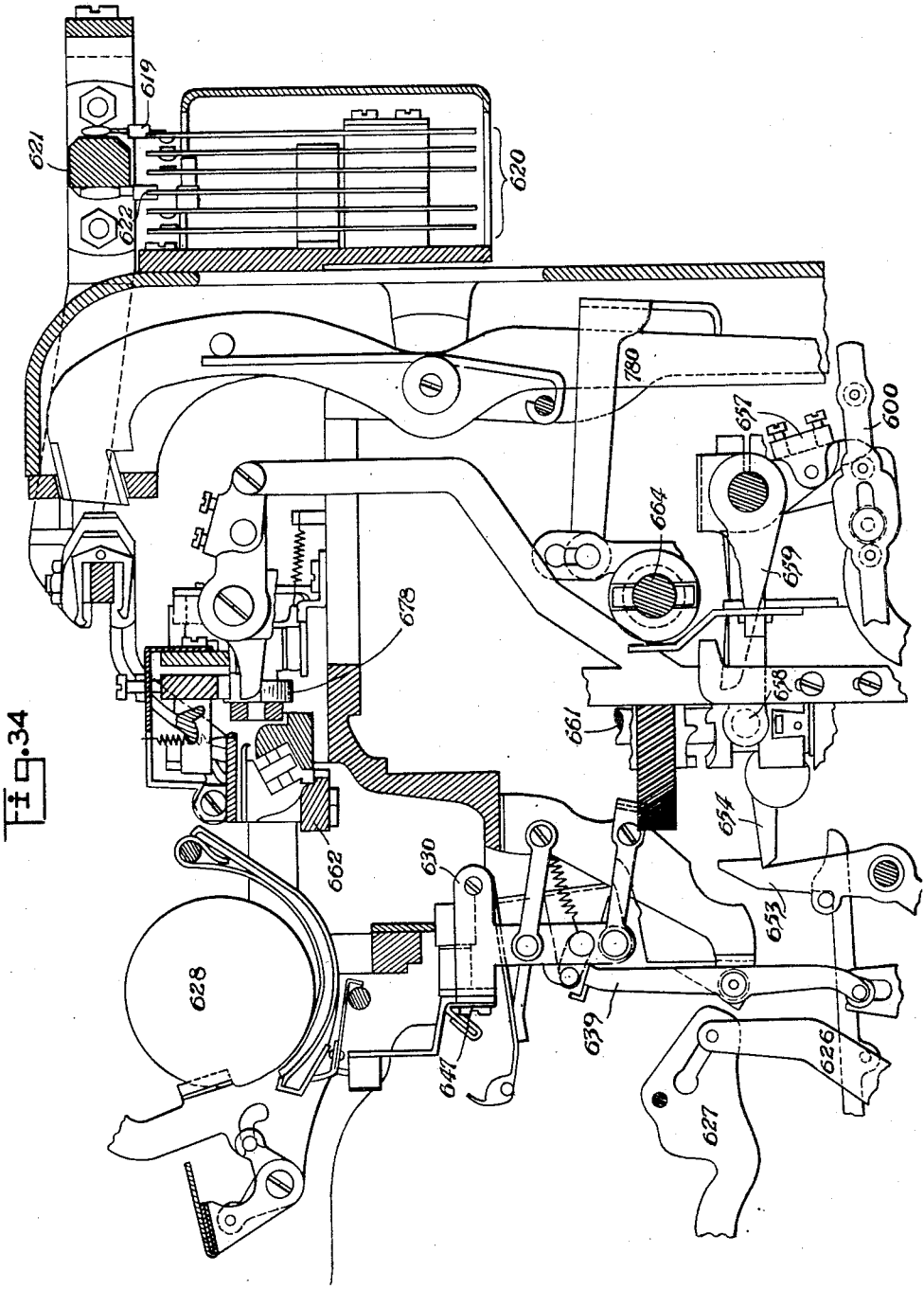

Fig. 34 is a sectional view of the upper rear portion of the bookkeeping machine, showing also a section of the control bar and the contacts associated with the control bar.

Figure 35:
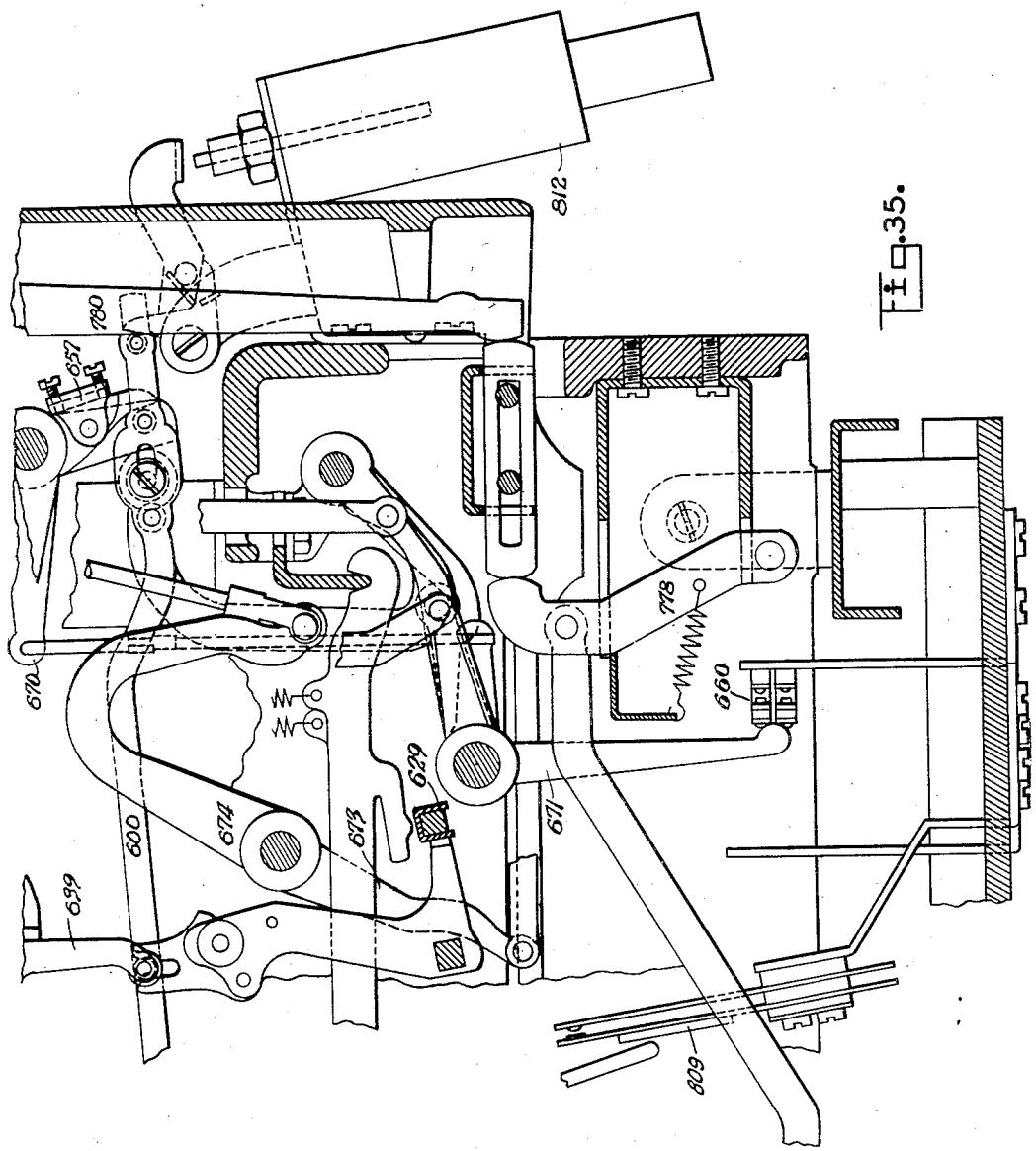

Fig. 35 is a sectional view of the lower rear portion of the bookkeeping machine. As such, it is a downward extension of the view of Fig. 34.

Figure 36:
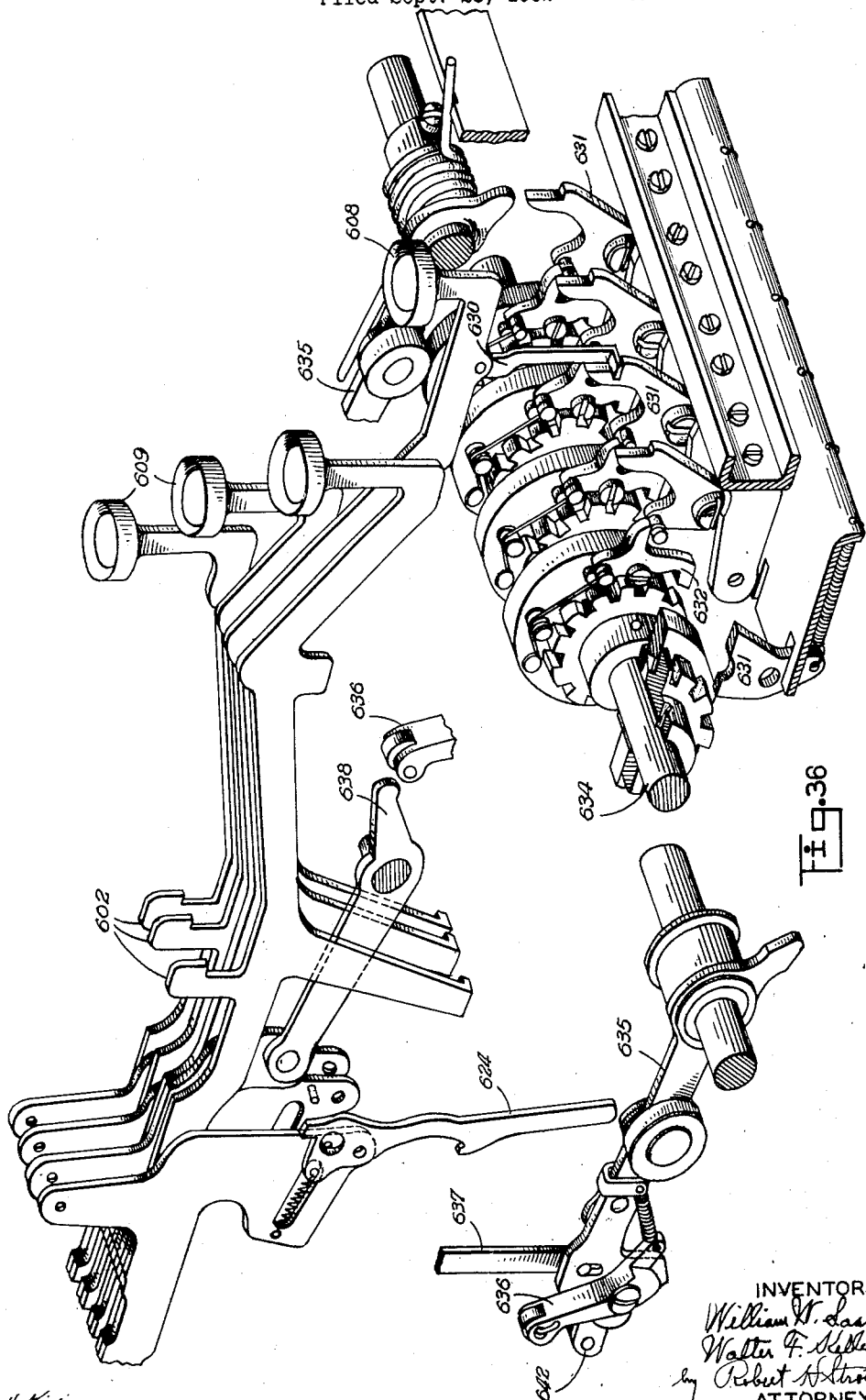

Fig. 36 is a diagrammatic isometric view of the alphabet keys of the bookkeeping machine, showing in addition one of the numeral keys of the machine and the mechanism for operating the numeral keys.

Fig. 37 is a sectional view similar to Fig. 32 showing the contact mechanism controlled by the special keys and levers of the bookkeping machine.

Fig. 38 is a diagrammatic isometric view of mechanism for returning the bookkeeping machine carriage to normal position, either manually or automatically.

Fig. 39 is a detail of the preceding figure, showing especially the vertical clutch of the carriage return mechanism.

Fig. 40 is likewise a detail of Fig. 38 showing particularly the horizontal clutch mechanism.

Fig. 41 is a cross sectional view taken of Fig. 40 showing the mode of connecting the clutch free element to the driving element.

Fig. 42 is an isometric view of a portion of the mechanism which is controlled by the backspace key.

Fig. 43 is an isometric view of the contact mechanism controlled by the backspace key.

Fig. 44 is a fragmentary isometric view of the back-space pawl showing its relation to the recessed internal ratchet of the escapement mechanism of the bookkeeping machine.

Fig. 45 is a full sized isometric view of the escapement ratchet mechanism.

Fig. 46 is a cross sectional view of the speed control device associated with the backspace mechanism.

Fig. 47 is a detail of the contact controlling mechanism of the backspace key.

Fig. 48 is a sectional view of the power responsive mechanism showing the relative arrangements and locations of the various special switches of the tabulator keys, palm tabulators, backspace and ball-lock mechanisms, etc.

Fig. 49 is a section through a totalizer, showing the differential mechanism and a portion of the universal controlling mechanism.

Fig. 50 is an elevation showing the location of the automatic clear sign mechanism with relation to the totalizers. Certain parts are omitted in this figure in order that the clear sign mechanisms may be more readily distinguished.

Fig. 51 is a top plan view of the automatic clear sign mechanism.

Fig. 52 is a rear view of the clear sign mechanism, showing its relation to the cross-footing totalizer truck.

Fig. 53 is an isometric view of the triangle key and a portion of the associated key lever.

Fig. 54 is an isometric view of the star key and a portion of the star key lever.

Fig. 55 is a view showing the detail of the master wheel gear train and operating sector.

Fig. 56 is a fragmentary isometric view of mechanism for controlling a proof-of-clearance key of the cross-footing totalizers.

Fig. 57 is an isometric view (partially exploded) of the control and correction mechanism of the vertical totalizers. For the sake of clarity the supporting framework has been omitted from this figure.

Fig. 58 is a view similar to that of the preceding figure showing the control and correction mechanism for the cross-footing totalizers, and a portion of proof-of-clearance mechanism.

Fig. 59 is a diagrammatic isometric view of the various links and levers controlled by the credit balance key.

Fig. 60 is a detail view showing a cam for controlling the condition of the cross-footing totalizers. Such cams are adjustably mounted upon any one of the vertical totalizers.

Fig. 61 is a fragmentary sectional view, showing the connections between the totalizer sector, shafts and the universal shafts of the bookkeeping machine.

Fig. 62 is a diagrammatic isometric view of the automatic clear sign mechanism, showing especially its relation to the ribbon shifting mechanism.

Fig. 63 shows the position of portions of the clear sign mechanism just after the second clear sign has been printed.

Fig. 64 is similar to the last view showing the parts in the positions which they occupy at the initiation of the printing of the clear sign.

Fig. 65 is a diagrammatic isometric view of the cross-footing totalizer pick-up beam.

Fig. 66 is a detail view showing two clear sign types impinging upon the platen adjacent each other.

Fig. 67 is a detail view of the clear sign type bars showing their location in the type segment.

Fig. 68 is a detail view of the dual sets of clear sign types.

Fig. 69 is an end elevation of the scapement control mechanism which in combination with the automatic clear sign mechanism serves to cause the printing of a double clear sign and to initiate a carriage return movement.

Fig. 70 is a sectional view of the mechanism of Fig. 69 along the line 70—70.

Fig. 71 is a sectional view of the mechanism of Fig. 69 along the line 71—71.

Fig. 72 is a top plan view of the sub-base used with the bookkeeping machine showing also the sunflower switches mounted thereon.

Fig. 73 is a plan view of the sub-base of the bookkeeping machine without sunflower switches.

Figure 74:
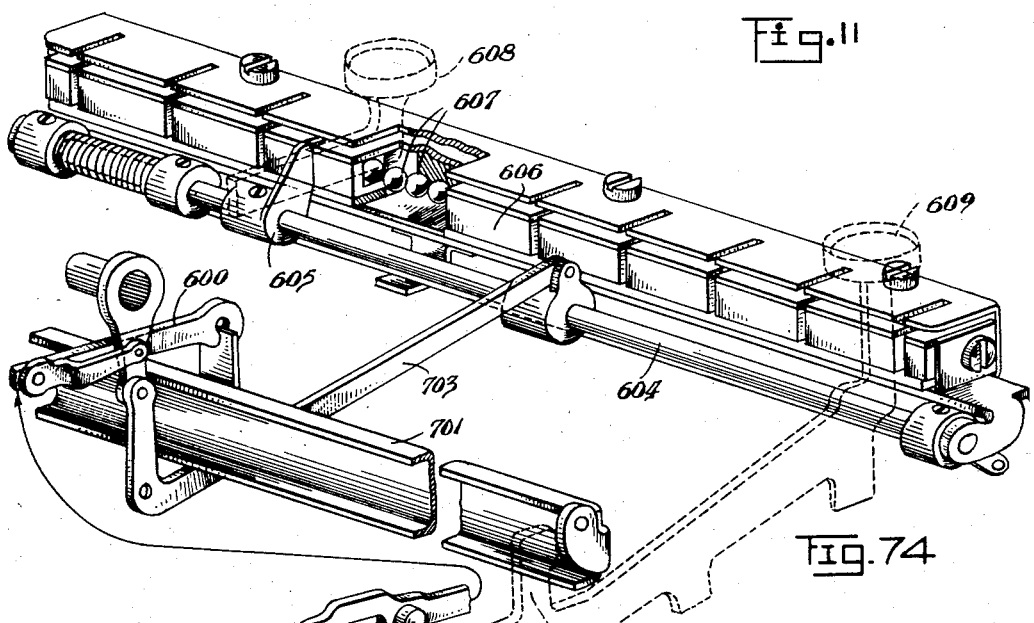

Fig. 74 is an isometric view of the key lock mechanism showing the electro-magnet which is connected to the punch skip mechanism and which operates the keylock mechanism.

Fig. 75 is a front elevation view of the sunflower switch.

Fig. 76 is a rear elevation view of the switch of Fig. 75.

Fig. 77 is an end view of Fig. 75.

Fig. 78 is a sectional view through the center of the switch of Fig. 75.

Figure 79:
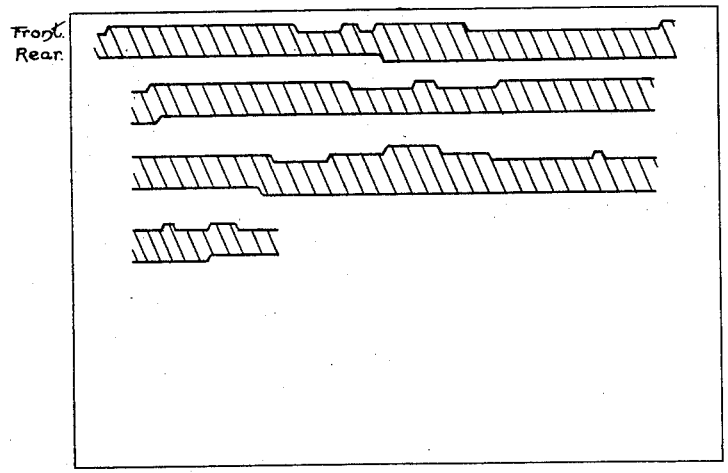

Fig. 79 is a diagrammatic representation of a control bar showing the contours of two opposite faces thereof.

Figure 80:
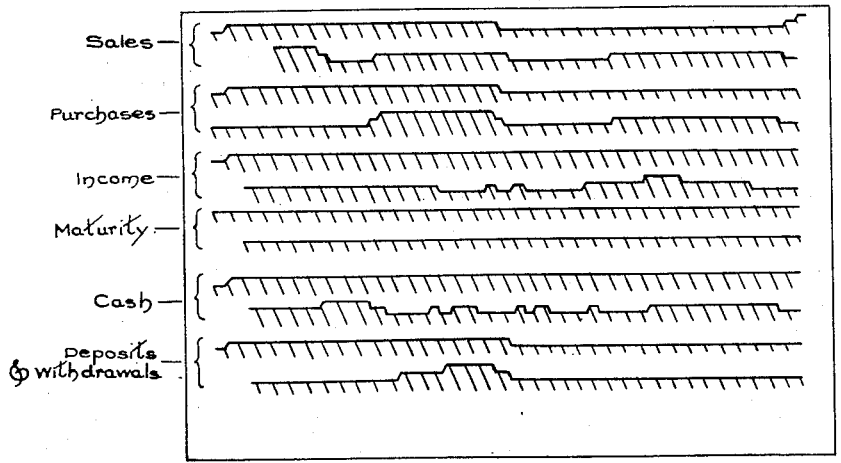

Fig. 80 shows diagrammatically the sides of a hexagonal control bar which may be utilized for producing cards according to various items such as sales, purchasing, etc.

Fig. 81 is a circuit diagram for use when a plurality of control bars are associated with the bookkeeping machine.

Figure 82:
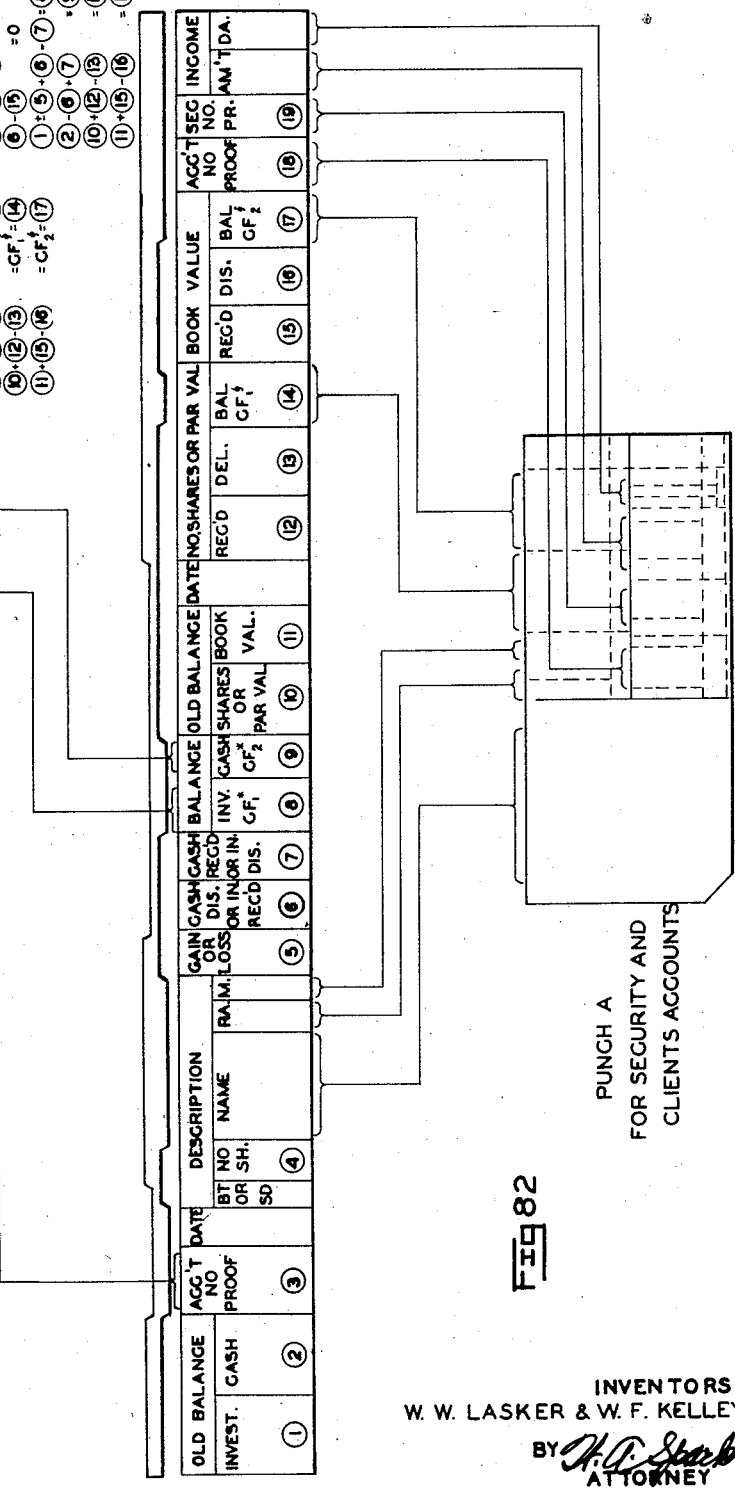

Fig. 82 is a diagrammatic view indicating which of the items on the journal sheet are to be perforated in the cards, and by which preforator the work is to be done. This figure also shows the cutting of the control bar to accomplish transmission at the time desired and in addition sets forth formulae by which the bookkeeping machine totalizers are set and formulae which may be used to check the results of the computations.

Figure 83:
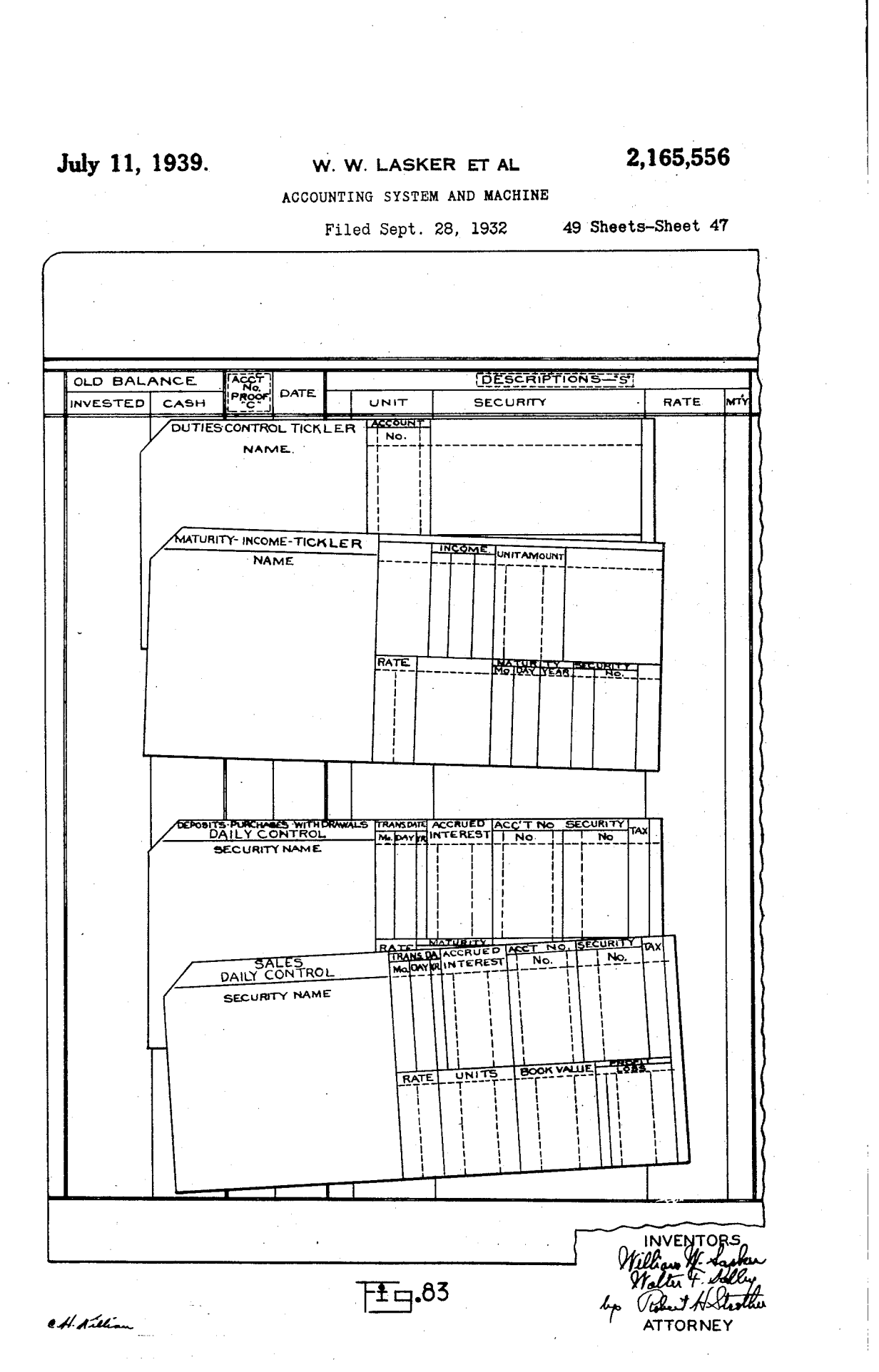
Figure 84:
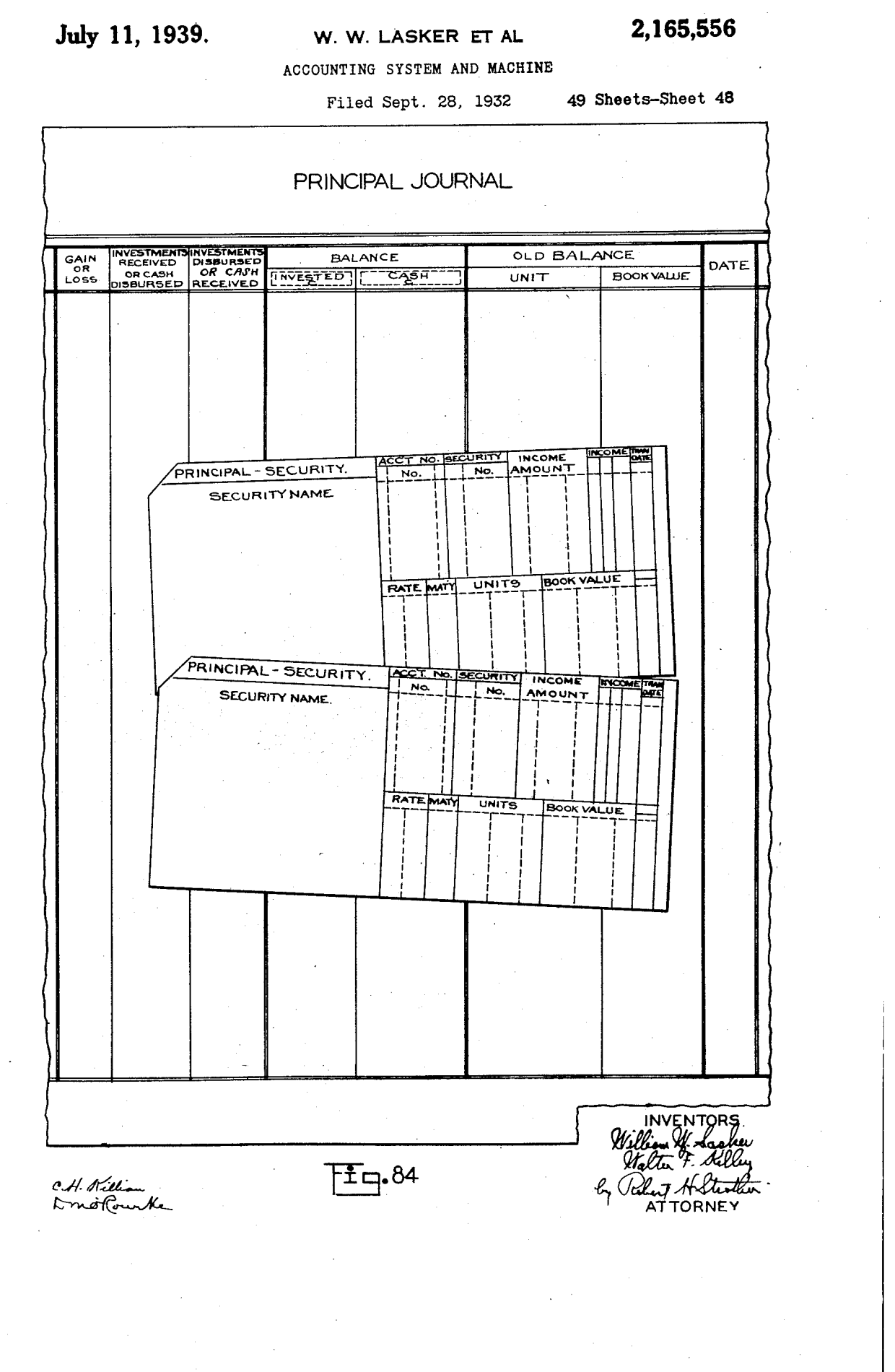
Figure 85:
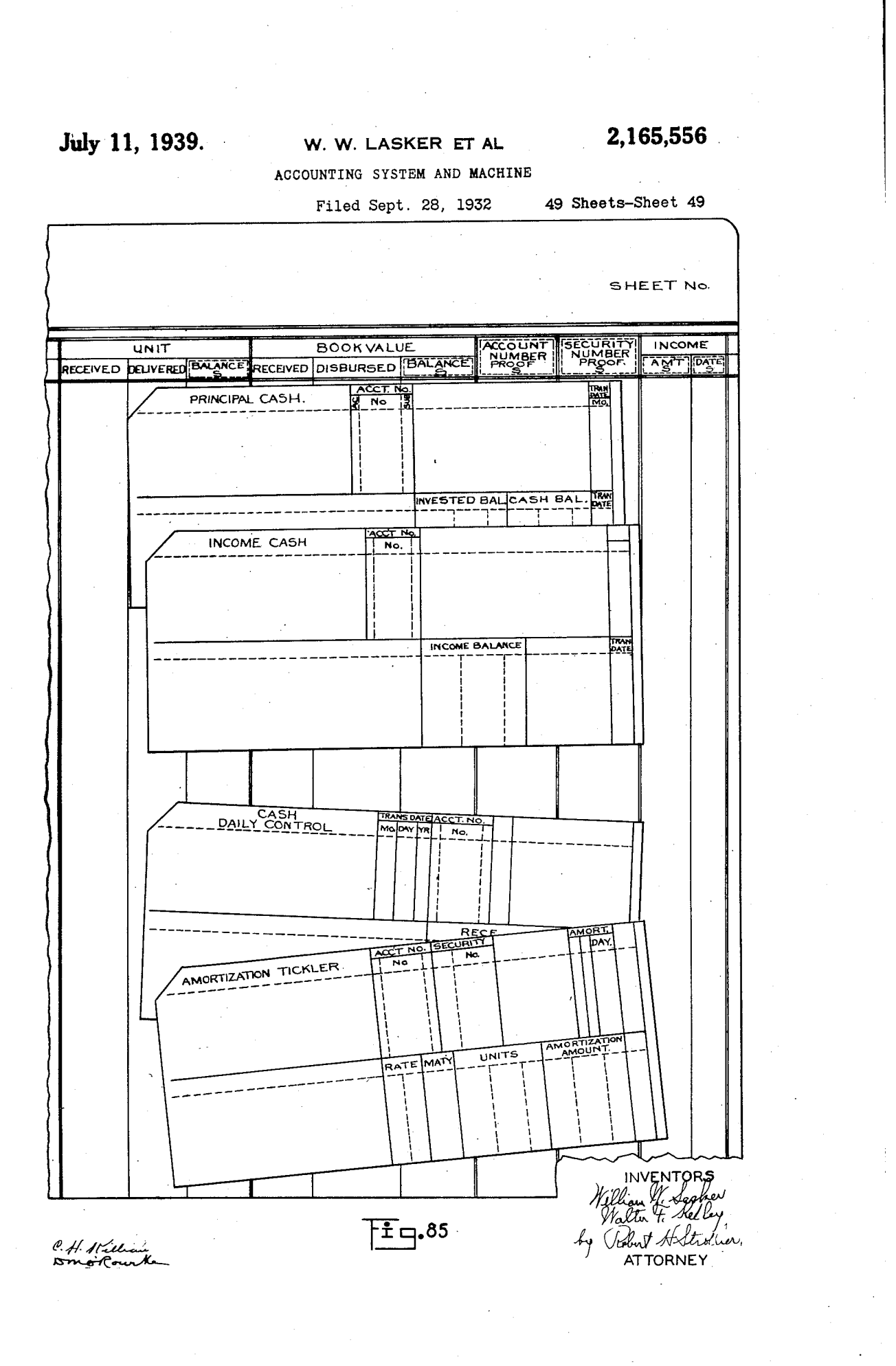

Figs. 83, 84 and 85, taken together, form a journal sheet, which may be used with a combined bookkeeping machine punch combination. These figures also show samples of blank cards, which may be perforated by the punches.

Figure 86:
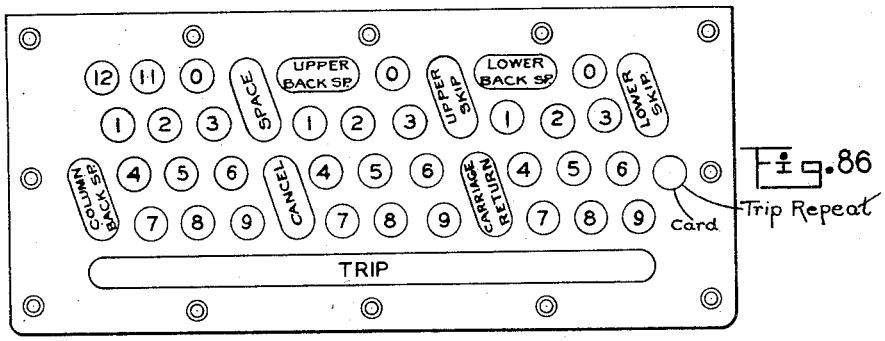

Fig. 86 is a view of a triple keyboard which may be substituted for the punch keyboard of Fig. 16, and which permits the elimination of the transfer switch.

Fig. 87 is a diagram showing the manner in which Figs. 27–31 are to be combined to form the complete wiring diagram.

As was indicated hereinbefore, the present invention comprises a new combination of machines, one of which is a bookkeeping machine, and others are improved punches of the Powers type. In addition to these, certain novel devices for electrically connecting the machines, and for electrically connecting elements of the same machine, are presented. In describing the invention, the punch itself, together with its various elements, will first be covered. Thereafter, the bookkeeping machine will be described, together with modifications necessary in order to provide interlocks, etc. Thereafter, the connections between the machines will be considered, and, finally, a typical example of the mode of operation of the combination, in the solving of a particular accounting problem, will be given.

PUNCH

In order that our improvements to the punch may be more readily set forth, a brief description of the known form of Powers key punch will first be given.

*General description*

The Powers key punch is a gang punch in which all perforations to be made in a record card are made simultaneously after punches have been set up column by column through the medium of a setting mechanism. There are a plurality of punches in the punch machine, these punches being arranged in rows and columns, occupying a space approximately equal to the area of a record card. Mounted above each punch is a setting member, commonly called a "set bar", adapted to be depressed and held depressed, and to prevent movement of the associated punch during the elevation of a die plate. Above the set bars, and adapted to move across the columns thereof, is a carriage, which bears a number of setting elements equal to the number of rows of punches. It will be seen that any set bar in a column may be depressed by the corresponding setting member of the carriage. The carriage then is moved forward; the setting members again operated to select and depress a set bar or bars of another column. Thus, the desired set bars throughout the carriage are depressed and selected. At this time, a die plate and a punch stripper plate, which together form a card chamber, into which a blank card has previously been inserted, are elevated and those punches which have been depressed by the locked set bars penetrate the card. Thereafter, the card chamber descends to its normal position and the punched card is then ejected, the carriage returned to its normal position and the punch made ready for another operation. Examples of early punches of the Powers type are those shown in Lasker Patent Nos. 1,305,559, issued June 13, 1919; 1,307,682, issued June 29, 1919; 1,311,565, issued June 29, 1919 and 1,311,566, issued July 29, 1919.

These early punches were fundamentally manually operated, although the card feed and card punching were power operations. The setting members, as well as the means for coupling the punching means to the power sources, were key actuated, the keys being connected to the setting members, or the connecting members, as the case might be, through the medium of Bowden wires.

In order to speed up the operation of the punch, and in order to provide for operation of more than one setting member from a single key, the manual operation was discarded and control through electrical means substituted therefor. The electrical connections for actuating the setting members under control of the keyboard contacts is disclosed in Patent No. 1,682,451, issued to Weiland et al. on August 28, 1928, and in Patent No. 1,684,001, issued to Weiland et al. on Sept. 28, 1928.

Electrified punches of the type mentioned differ from the manual type in that the Bowden wires no longer lead directly to the keys, but are operated by the armatures of solenoids, the windings of which are included in the circuits which are open at the contacts of the keyboard, and are closed whenever a key is depressed. Thus, whenever a key is depressed, a circuit or a plurality of circuits is or are completed to operate the corresponding solenoid or the corresponding solenoids.

These machines were much easier to operate than the directly actuated ones discussed above, but the carriage return operation, backspace, etc., remained manual, and, consequently, the machine was subsequently improved in the manner shown in Patent Nos. 1,684,546, issued to Lasker on Sept. 18, 1928, and 1,798,610, issued to Lasker on March 3, 1931.

Carriage return and backspace mechanisms similar to those in the above mentioned patents are described hereinafter. These mechanisms, however, have been somewhat improved.

All of the punches mentioned hereinabove were 45-column punches, that is, there were but 45 columns on the record card and, consequently, but 45 items of information could be recorded.

It was soon found that this was not sufficient capacity, and, consequently, a new punching mechanism was designed in which each column was divided into two zones, each zone of the card thus being 45 columns wide and six rows deep. In order to record all possible digits, some of the digits are represented by two holes in a column of a zone of the card.

In the two-hole card commonly used in Powers accounting systems, each odd digit character is represented by a single hole and each even digit character is represented by two holes; thus, since each zone provides for 45 items, the entire card provides for a total of 90 items. It has become customary to describe such extended capacity cards as 90 column cards, and to designate punch machines, which are capable of operating on such cards, as 90-column punches.

90-column punches are disclosed in the patents to W. W. Lasker 2,044,707 and 2,044,708, issued June 16, 1936. In these patents there is disclosed a method of punching 90-column cards which comprises setting the set bars in the upper zone, punching the card, returning the carriage, setting the set bars in the lower zone, again punching the card, and then ejecting the card and returning the carriage. These punching machines were also adapted to punch 45-column code, so that a card might be punched partially in the 45-column code and partially in the 90-column code, or, in other words, partially in single hole code, and partially in two-hole code. When a card is punched partially in one code and partially in another, the normal procedure is to first set up the 45-column code portion, then one of the 90-column zones, then punch the card, return the carriage to the end of the 45-column portion, set up the other 90-column zone and again punch the card. It will be obvious that a card, punched partially in 45-column code and partially in 90-column code, may have any number of items recorded therein between the limits of 45 and 90. For example, a card having 20 columns punched in single hole code can then have but 25 in the upper 90-column zone and 25 in the lower 90-column zone, or a total of 70 items of information.

The device of the present invention requires but one punching for each card rather than the two described above and is thus more efficient and rapid.

When punching partially in one code and partially in another, as has been described above, it has been necessary to return the carriage to the end of the 45-column portion by hand. In the present invention, means are supplied whereby the carriage may be automatically returned either to the margin stop or to an adjustable intermediate stop.

Having briefly described the development of the type of punch involved, the punch of the present invention will now be described in detail:

The various portions of the punch machine are supported in castings, bearings, etc., all of which are mounted on a sub-base, which is supported by legs 21 (Fig. 1) located at the corners.

Main drive

As was indicated hereinabove, the punching mechanism is power actuated. Therefore, it is best before proceeding to a description of the punching mechanism itself to first briefly describe the main driving mechanism.

Mounted at the left-hand rear corner of the sub-base 20 (Fig. 4) is a motor generator set 22 (Figs. 1 and 2), the motor of which is adapted to be connected to any convenient power outlet in the usual manner, the shaft of the motor generator set extends forwardly and is coupled to a short shaft 24, which is supported by bearings in a gear box 25 (Fig. 2) which is rigidly mounted on the sub-base 20. Mounted on the shaft 24 within the gear box 25 is a worm 26 which meshes with a worm wheel 27, which worm wheel is fixed to a sleeve 28 free to rotate on the main drive shaft 29.

The main drive shaft 29 is supported at its left end in a bearing in the gear box 25, and at intermediate points, as well as its right end by bushings in the upwardly extending portions 30 of the casting 31 (Fig. 4). Fixed to the sleeve 28 is the driving member 32 of a single revolution clutch, the free element 33 of which is fixed to the shaft 29. This clutch is adapted, when operated, to cause a single revolution of the main shaft and is of the type shown in Patent No. 1,810,317, issued to W. W. Lasker on June 16, 1931. The free element 33 of the clutch has a projection which normally abuts the tripping lever 35, which is adapted to be moved to the right and out of the path of the projection whenever the trip magnet is operated. Normally the magnet is energized only momentarily. Consequently, the trip lever 35 immediately restores and when the main drive shaft has gone through a complete rotation, the projection again strikes the tripping lever. The mode of operating the magnet will be discussed hereinafter.

Punching mechanism

The mechanism which does the actual punching of the card will now be described. A rectangular frame 40, having downwardly extending walls, forms the structure of the moving portion of the punch mechanism. As shown in Fig. 4, the sides of the frame 40 are formed with vertical ribs 41 on the exterior thereof, which ribs cooperate with slots in the casting 31 (Fig. 4). It will be seen that the ribs and slots or guides will thus serve to cause the frame 40 to move vertically. Fastened to the upper side of the frame 40 is a die plate 42 having a plurality of holes therein, the number of holes ordinarily being 540. Spaced from the die plate 42 by means of spacing dowels, located at the ends of the plate, is a stripper plate 43 having therein a plurality of holes equal in number to and corresponding in position to those in the die plate 42. Above the stripper plate 43 and spaced therefrom by a pair of spacing bars 44, one of which is at the front and one at the rear of the plate, is a locking bar supporting plate 45. As will be seen by reference to Fig. 4, a punch retaining plate 46 is fastened at its ends to the tops of the side members of casting 31. The holes in this plate are in vertical alignment with those in the die and in the stripper plate. Punches 47 are inserted in these holes, the punches are limited to their downward movement due to the fact that the heads of the punches come to contact with the plate.

The punches 47 have substantially rectangular heads; if the punches were free to rotate the heads might interfere and permit mis-operation. In order to prevent rotation of the punches and in order to facilitate the assembling of sets of die, stripper and retaining plates and associated punches, each punch has a slot in one side of its shank. The slots in all the punches in one column face in the same direction, and those in an adjacent column all face in the opposite direction. Locking bars 48 are then inserted between adjacent columns of punches and, therefore, extend into the slots and prevent rotation of the punches. All the locking bars 48 are fastened to the plate 45 by means of angle pieces 49, one of which is secured to the front and one to the rear of plate 45.

It is obvious from the above that the frame 40, die plate 42, locking bars 48 and angle pieces 49 constitute a unitary structure; for convenience, this structure will hereinafter be termed the "punching unit", and the space between the die plate 42 and the stripper plate 43 will be termed the "card chamber".

The punching unit is arranged to be reciprocated vertically each time the main shaft revolves. Fixed to the main shaft 29 near the center thereof is a disc 50 having a cam race 51 cut therein. Lying in this cam race is a roller 52, which is carried by a forwardly extending arm of a rocking bar 53. The rocking bar 53 is provided at each end with a trunnion 54, and these trunnions are adapted to rotate in holes in the upstanding side portions of the casting 31. At each end of the rocking bar 53 is a rearwardly extending forked arm 55, each adapted to cooperate with the adjacent one of two squared portions of shaft 56, which extends between the downward projections of the frame 40.

The mode of punching a card will now readily be understood. Let it be assumed that a card is properly positioned in the card chamber and that those punches which are to be effective are in some manner held with their heads against, or nearly against, the retaining plate 46.

As the main shaft 29 rotates, the rocking bar 53 will be rocked first in one direction and then in the other under the control of cam 51 and roller 52, thus raising and lowering the punching unit. As the unit rises, the card in the punching chamber will carry upward with it all free punches, while those punches which are held down will penetrate the card, due to cooperation of the punches 47 and the die plate 42. As the punching unit descends, the stripper plate 43 removes the card from the punches, which have penetrated it and permits it to lie on the die plate in a position to be removed from the card chamber in a manner hereinafter described.

Card handling mechanism

The above description has shown how a card, which has been properly positioned in the card chamber, is punched. The following is a description of the means for feeding the cards to position to be punched and for removing punched cards from the card chamber. The card handling mechanism comprises a magazine for storing blank cards, a picker knife for withdrawing cards one by one from the stack in the magazine, feed rolls for feeding the withdrawn cards to the card chamber, stops for assuring proper positioning of the card in the chamber, feed and skid rolls in the card chamber for feeding the card against the stops and for starting the punched card from the chamber, eject rolls for completing the removal of the cards from the chamber, and magazines, or receptacles, for receiving punched cards. As will be later explained, there are at times a plurality of receiving magazines, since at times duplicate cards are prepared.

The card magazine, generally designated 60, is formed by two channel members 61 (Figs. 2 and 5) of a width approximately equal to the width of a card, and spaced apart the length of a card, and a picker knife carry bar 65, which forms the bottom of the magazine. (See Fig. 5.) Both the channel members 61 and the picker knife 62 are supported by a casting 63, which is, in turn, carried by the base casting 31 as can be seen by referring to Fig. 4.

The casting 63 is somewhat wider than the card chamber and is so constructed as to make the top thereof approximately level with the card chamber when the punching unit is in its lowest position. The casting is formed with a rectangular frame-like top, each side of which is provided with a groove 64 (Fig. 2) extending from front to rear. The channel members 61 of the card magazine are formed with a base and an upright portion. The base of each member 61 is positioned above the groove 64, thus forming guideways, which are used in guiding a carry bar 65 for the picker knife 62. The carry bar 65 extends across the opening in the frame-like top of casting 63 and has lugs (not shown) which lie in the grooves 64, being retained therein by the bases of the channel members 61. The carry bar 65 is thus adapted to reciprocate in a horizontal plane, being operated in a manner shortly to be described.

The upper surface of the bar 65 has a slight slope rearwardly (to the left in Fig. 5) and its forward edge is substantially perpendicular to the slope. Adjustably fastened to the forward edge is the picker knife 62, which, in its adjusted position, projects above the carry bar for a distance somewhat less than the thickness of a standard record card. Fastened to the forward edge of the knife carrying bar, and beneath the level of the upper edge of the picker knife, is a metal strip 67, which serves to support the forward edge of the card; the upper surface of the carry bar 65 and the strip 67, together, form the bottom of the card magazines 60.

Although the picker knife is, as has been explained, so adjusted as to remove but one card from the stack at a time, it will be seen that, if two cards adhere to each other, both would be urged rearwardly. In order to insure that but one card will be withdrawn from the stack at a time, the two magazine channel members 61 are jointed by a throat bar 68 (Fig. 4), which has an adjustable card throat provided therein. This throat mechanism is described in detail in Patent No. 1,514,110, granted to H. P. Still on November 4, 1924, and, therefore, will not be described at this time, further than to say that it serves to prevent the removal of more than one card from the stack at any time.

Projecting from the lower surface of the knife carrying bar 65 near the center of the bar is a lug 69, which carries a stud 70. Mounted on a shaft 71 (Fig. 5), carried in the end members of the casting 63, is a lever 72, the bifurcated upper end of which surrounds the stud 70. Pivoted to the mid point of the lever 72 is a link 73, which is provided with an adjustable turnbuckle 74 and which extends rearward to the eccentric strap 75 (Fig. 4) of an eccentric 76 mounted on the main shaft 29. It will be seen that, as the shaft 29 rotates, the eccentric 76 causes the picker knife to move first rearwardly to project the rear edge of a card through the card throat, and then forwardly in position for picking a new card from the bottom of the stack.

Rotatably mounted in the upwardly extending side members of the casting 31 are a number of shafts 77, which carry feed rolls 78 (Fig. 4). These feed rolls and shafts are arranged in pairs, each pair comprising an upper and lower set of rolls. The forward two pairs of rolls serve to take the card which has been picked from the stack and convey it to the punching chamber. The upper and lower rolls are normally held against each other, due to the pressure upon the upper shafts 77 exerted by springs 79 bearing upon blocks 80 lying above the shafts. The springs are adjustable through the medium of screws 81 which extend through members 82 fastened to the casting 31. Shafts 77 are driven from the main shaft 29 by means of a gear fastened to the shaft and pinions on the shaft 77 (the gear and the pinions are not shown).

As will be seen by reference to Fig. 4, the contact surfaces of the feed rolls 78 are in substantially horizontal alignment with the punching chamber when the punching unit is in its lowest position. The contact surfaces are always in horizontal alignment with the card throat.

Additional feed roll shafts extend between the sides of the casting 31 within the boundaries of the punching unit. However, there are no corresponding upper shafts and the downwardly extending side portions of the punching unit frame 40 are slotted to permit it to reciprocate without interfering with the shafts 77. The punching chamber feed rolls are driven through pinions mounted on them which mesh with pinions on the other feed roll shafts 77 mentioned above.

Lying above each of the punching chamber feed rolls 78 there is a skid roll 83, which is spring pressed downwardly and which projects through a slot in the stripper plate 43. These skid rolls are carried by the stripper plate 43 and, consequently, move out of contact with the cooperating feed rolls 78, while the punching chamber moves upward.

In order to insure that the cards stop in the proper position to be punched the card stops 84 are provided. These card stops, one on each side of the die plate, extend through slots in the die plate, across the rear of the card chamber, and into slots in the stripper plate. The card stops are arranged to be raised in order to stop the card in the proper position and to be lowered to release it for ejection after the punching operation.

Each card stop 84 is pivotally connected to an arm 85 which is fastened to the shaft 56, which, as has been stated before, is rotatably mounted in the downwardly extending side projections of the frame 40. The card stops are held in their lowest position by a spring 86 which extends from the rearmost end of one of the arms 85 to a stud 87 mounted in a channel portion 88 of the casting 31. Loosely mounted on the shaft 56 is the card stop actuating arm 89, which carries at its forward end a roller 90 cooperating with a cam 91, mounted on the main shaft 29. Fixed to the shaft 56, one on either side of the arm 89, are two collars 92, one of which has fastened to it one end of a spiral spring 93, the other end of which bears against the lower side of the arm 89. Extending radially from one of the collars 92 is stud 94, which cooperates with a pin 95, extending horizontally from the arm 89. As will be obvious the spiral spring 93, together with the stud 94 and pin 95, comprise a resilient connection between shaft 56 and arm 89. It should be noted that spiral spring 93 is stronger than the spring 86 which tends to hold the card stops in their lower position.

The motion of the card stops will now be seen to be the result of two movements imparted respectively to the shaft 56 and the arm 89. The movement of the shaft 56 is caused, as has been previously explained, by the action of the cam 51 on the rocking bar 53, while the movement of the arm 89 is caused by rotation of the cam 91 as the main shaft revolves.

Slightly to the rear of the punching unit and rotatably mounted in the side members of the casting 31 are additional shafts 77 carrying eject rollers 100, the upper shaft being pulled downwardly so that the roll thereon comes into contact with the lower roll by means of a pair of springs 101, one at each end of the shaft, which are connected by hooks 102 to the upper shaft 77. The lower one of these eject rollers 100 is driven through pinions from the rearward one of the punching unit feed roll shafts 77.

*Card feeding, positioning, punching and ejecting operations*

Blank cards to be punched are stacked in the magazine 60 and a weight 102 (Figs. 4 and 5) placed on top of the stack. When the clutch tripping lever is operated, the main shaft 29 is freed for one revolution, and, if it is assumed that no card has previously been in the punching chamber, the sequence of operation described below occurs:

The picker knife, which normally lies in its foremost position, starts to move rearwardly, picking a card from the bottom of the stack and moving it rearwardly. When the shaft 29 has rotated through approximately 180°, the rearward edge of the card reaches the first set of feed rolls 78 and thence is fed into the card chamber where the feed is continued by the rolls 78 and cooperating skid rolls 83. When approximately 300° of rotation of the main shaft has been completed, the card stops are lifted, and shortly thereafter the card reaches the stops and comes to position against them. At the completion of the rotation, the clutch disconnects and the card remains positioned in the punching chamber. Although the punching unit will rise and return during this feeding, it will be ineffective since no card is in the punching chamber.

This card and each succeeding card, so long as the supply in the magazine does not fail, is fed and punched in the following sequence. During the first 180° of rotation of the shaft 29, the card is fed to the first of the feed rolls 78. During the first 15° of the same rotation, cam 51 causes the punching unit to rise and, at the same time, shaft 56 rises and causes the card stops 84 to rise at about the same rate. During the next 15° of rotation, the card stops and the punching unit rise together and at about the 30° point the cam 91 has rotated enough so that the card stops are lowered with respect to the punching chamber, but without effect, since the card is no longer positioned on the punching chamber feed rolls 78. At about the 90° point, the punching unit is at its highest position, and the first card is completely punched. Continued rotation of the shaft 29 then lowers the punching unit and strips the first card from the punches. The card stops move downward with the punching unit and, since the roller 90 remains on the low surface of cam 91 this movement is under control of shaft 56 alone. When the main shaft has rotated through 180°, this being the same 180° mentioned above, the punching unit is again in its lowest position and the first card again in contact with the punching chamber feed rolls 78 and pressed against these rolls by the skid rolls 83. Also, at this moment, the rearward edge of the second card is just reaching the forward pair of feed rolls 78. As the main shaft continues to rotate, the first card is fed from the card chamber and transported rearwardly by the ejecting rolls 100, which convey it to the storage receptacle and meanwhile the second card is fed rearwardly to be picked up by the feed rolls 78 and skid rolls 83. When approximately 300° of rotation have occurred, the roller 90 is depressed by the cam 91 and the card stops 84 are lifted to normal position. Continued rotation of the positioning rolls drive the second card against the card stops and shortly thereafter the machine comes to rest.

*Punch stops and locking means therefor*

The manner of punching a card, when preselected punches are held in a depressed position, has been discussed above. The mechanism for depressing the punches will be discussed hereinafter, and at the present the means for holding selected punches and punch stops in depressed position will be considered. This mechanism, commonly known as the stop basket, comprises a plurality of stop pins, an equal number of correspondingly arranged set-bars, and latching slides for locking depressed set-bars in that position.

The stop basket is supported by two auxiliary castings 105 (Fig. 4) which are themselves fastened to the upstanding side portions of the casting 31. Extending between the castings 105 are two bars 106, one at the front of the machine and one at the rear, the distance between them being somewhat greater than the small dimension of a record card. Mounted on top of the two bars 106 is a plate 107 containing a plurality of holes arranged in the same manner as those in the die plate 42, and mounted on the underside of the two bars 106 is a similar plate 108 supplied with holes in alignment with those in the upper plate 107. Guided by the holes in the upper and lower plates, 107 and 108, are a plurality of stop pins 109, each of which is provided with a collar 110 between which and the plate 108 a spring 111 is compressed. Fastened to the castings 105 and extending between them in the same manner as the bars 106 are two additional bars 112, which serve as supports for the upper portion of the stop basket mechanism. Each bar 112 has a lug 113 extending substantially the entire length of the bar, said lug extending toward the center of the machine. Immediately above the cutout portions left after bending the lugs 113, bars 112 are slotted to form a comb having a number of tooth spaces equal to the number of columns in a record card, in this case forty-five, in order to provide guides for latching slides 115 which ride on the upper surface of the lugs 113. Bars 112 are also bent toward the center of the machine at the top and form supports for the upper set-bar guiding plate 116. The lower set-bar guiding plate is fastened to the lower surface of the lugs 113. Between the upper plate 116 and the lower plate, and guided in rectangular holes in the two plates, are 540 set-bars 118 arranged in 45 columns of twelve each and adapted to cooperate with stop pins 109, which lie in corresponding positions. Each set-bar has a shoulder near both top and bottom, these shoulders, serving to limit the vertical movement of the set-bars. Latching slides 115 (see also Fig. 6), are arranged in pairs, each slide of a pair cooperating with half of the set-bars of the column, one slide of the pair lying on one side of the column of set-bars; the other on the other side, and all the latching slides have rearward projections which cooperate with one or the other of the spring combs 119 and 120, which are fastened to the bar 112, as is seen by referring to Fig. 4. One slide of each pair of latching slides has a long rearward projection, which cooperates with the rearmost spring comb 119 and the other slide of the pair has a shorter rearward projection which cooperates with the spring comb 120.

Each set-bar 118 has a pin inserted in it which projects on one side of it only. The latching slides 115 are flat metal plates, each having therein six cutouts 121 (see also Fig. 6), which are straight on three sides and have a projection or nose 122 on the fourth or rearward side (Fig. 4). One of the latching slides of each pair has these six cutouts located at the rear to cooperate with the pins in the rearward six of the set bars 118. The other latching bar of the pair has the six cutouts 121 arranged to cooperate with pins in the forward six set-bars 118.

It will be seen that whenever one of the rearward six set-bars is lowered, the pin thereon forces the adjacent locking slide rearward against the tensions of the cooperating tooth of the comb spring 119 and that whenever one of the forward six set-bars is depressed, the pins thereon force the other of the adjacent locking slides rearward against the tension of a cooperating tooth of the comb spring 120. As the set-bar moves downward, the pin thereon makes contact with the nose 122, forcing the bar to the rear and, when the pin has reached its lowest position, the comb spring returns the bar to its forward position and prevents the set-bar from rising as it is urged to do by the spring 111 on the stop pin 109, since, as is obvious from the drawing, the stop pins are depressed by the set bars.

*Retract levers*

Each time that a new set-up is desired, the latching slides 115 must be moved rearwardly against the tension of the comb springs 119 and 120. Retract levers 123 and 124 are provided for this purpose. They are adapted to be operated by mechanisms mounted on the carriage and described under the heading of "Selecting carriage". In some instances, it is desirable to move a particular slide rearwardly to release the set-bars of a particular half column without use of the retract levers. The manner of releasing a single bar is discussed under the headings "Cancel" and "Backspace".

The retract levers 123 and 124 are pivoted on a rod 125, which is supported by two arms, one mounted at each end of the forward one of the two supporting bars 106. Two comb bars 126 and 127 are provided to space the levers and to insure that they will contact the forward projections of the proper latching slides 115. The lower one of these comb bars 126 is fastened to the lower portion of the forward one of the two bars 112, and cooperates with the short retract levers 123, which cooperate with the latching slides 115 adapted to latch the rearward six set-bars in depressed position. These rearward six set bars and the cooperating latches are associated with the upper zone of the cards and will hereinafter be referred to as "Upper zone set bars" and "Upper zone latches", and in a similar manner the forward six will be termed "Lower zone bars" and "Lower zone latches".

The second comb bar 127 is fastened to the supporting bar 112 above the comb 126 and cooperates with the lower zone latches. Both sets of levers 123 and 124 are normally held in the position shown in Fig. 4, due to the cooperation of a locking bar 128 with the flat lower portion of the levers. This latching bar is mounted on studs 129 fastened to the forward one of the bars 106, the studs extending through diagonal slots in the locking bar. The bar is then held in its upper position by means of springs not shown, and may be lowered by pressing against the finger pieces 130 moving the bar to the left and downward, thus releasing the retract levers 123 and 124 for rotation about their pivot rod 125. The retract lever mechanism, with the exception of the locking bar, is shown in greater detail in Fig. 6.

It is apparent that any one of the levers 123 or 124 may be rotated clockwise, as viewed in Fig. 4, and, when so rotated, the lever will no longer press against the associated latching slide 115. Due to this construction, any set-up in a particular half column or zone may be retained and a corresponding hole or holes punched in all cards.

In order that the operation of the cancel or erase mechanism may be more apparent, when later described in detail, it is best to mention herewith that the depression of any two set-bars of a zone to the point where the pins thereon are just opposite the nose 122, will move the associated slide 115 rearwardly a maximum amount. If then the set-bars are immediately released, all previously depressed set-bars in that zone of the particular column considered will be released and no setting will remain. For performing this erasing operation two set-bars, which would never be depressed simultaneously to represent a particular character in the code, are selected, and, therefore, the two bars depressed will never be those associated with a character.

Selecting carriage

In order to select the proper set-bars for operation to produce the punching desired, a selecting carriage generally designated 140 is provided. This carriage comprises a rectangular framework 141 (Figs. 4, 7, 8 and 9), having sideward extensions 142 (Figs. 2 and 10) at the front thereof. Rotatably mounted at the rear of the frame 141 is a roller 143 (Fig. 4), which, as will be hereinafter explained, serves to guide the carriage. In a similar manner, rollers 144 and 145 (Figs. 4 and 10) are mounted on the sideward extensions 142 of the forward portion of the frame 141. At both the front and rear of the frame 141 there are downward extensions, which carry rollers 146. Extending between two castings 105, one at the front and one at the rear thereof, are two rails 147, which support the carriage and on which the carriage is movable in either direction above the set basket. The selecting carriage 140 carries a number of bell cranks, levers, plates, and bars, as well as an escapement mechanism, all of which will be hereinafter described in connection with their particular functions.

Selector mechanism

Near each end of the frame 141 there is a slotted upward extension 148 (see Fig. 7). Lying in the slots of the two forward extensions is a plate 149 (Fig. 4) and in slots of the rearward extensions, there is a similar plate 150. These plates are held in the extensions by rods 139 extending parallel to the side members of the frame 141. The plates 149 and 150 are joined by a number of pivot rods and spring supporting bars as well as by slotted plate 151, which is shown in section in Fig. 7. Pivoted on a rod 152 are twelve bell crank levers 153, each of which is guided in a slot in the plate 151. These bell crank levers would in their normal positions have their upper ends abutting the Bowden wire terminals 154, which are supported on studs 155, fastened to the plate 151. The horizontal arm of each bell crank 153 has pivoted thereto a selecting interponent 156, which is guided at its lower end by a slot in the plate 157, which extends across the bottom of the frame 141. Each interponent is held in its upper position by a spring 158, which extends from a horizontal projection on the interponent to a bar 159, which is fastened to the two side plates 149 and 150. It will be seen that the spring not only holds the interponent in its upper position, but likewise keeps it against the bottom of the slot in the plate 157.

Whenever a Bowden wire is extended, it will thus operate one of the bell cranks 153 and lower the associated interponent 156 to depress that set-bar 118, which is at the time immediately under it.

Escapement mechanism

As was stated hereinabove, the carriage 140 is so mounted as to be movable along the rails 147 in order that the interponents 156 may lie above any column of set-bars 118. The movement of the carriage in a direction from left to right is produced by a spring, and is caused to be a step-by-step movement due to the operation of an escapement mechanism mounted on the carriage. This escapement mechanism (see Figs. 2, 4 and 10) comprises an escapement wheel 160, an escapement pawl 161, and a pinion 162 (Fig. 4). The escapement wheel 160 is rotatably mounted on a stud 163 in the carriage frame 141, as is pinion 162, wheel and pinion being fastened to each other. Pinion 162 meshes with the rack bar 164 mounted on the forward one of the rails 147. The escapement pawl 161 comprises two pieces, the right-hand one of which has an extension underlying a pin on the left-hand extension. The left-hand extension or, in other words, the left-hand one of the two pawls, forming the complete escapement pawl, is held in its lower position against a tooth of the escapement wheel by a spring 165 stretched between a stud on the pawl and a lever 242 as hereinafter mentioned. Both extensions, or both pawls, of the complete escapement pawl are mounted on a short shaft 166 (Fig. 2) which is supported by the carriage frame. Fastened to the rearward end of this short shaft is an arm 167, having therein a cam slot 168. Pivoted on the rod 152 is a spacing bail 169 (Fig. 10) which lies in front of the bell cranks 153, and which has a lower extension carrying a pin which lies in the cam slot 168. It will be obvious from this description that whenever any bell crank 153 is rocked the arm 167 is rotated in a clockwise direction to release the escapement wheel for rotation through one tooth space, thus permitting the carriage to move from one column of set-bars to the next. The carriage is constantly urged toward the right through the medium of a flat spiral spring 170 connected to the carriage frame.

*Skip mechanism*

The step-by-step forward movement of the carriage described above is one only of the two necessary forward movements. The other of these is the skip or tabulating movement means for accomplishing which will now be described. The skip mechanism comprises a skip stop bar 175 (Figs. 2, 4, 10 and 11) movably mounted on the frame of the punch, and having therein slots to receive stops 176, together with skip levers carried by the carriage, and adapted to be moved into position to strike the stops. The skip mechanism is in duplicate, one train of mechanism being associated with the upper zone and one with the lower zone. As will be seen by reference to Fig. 10, a second set of Bowden wire terminals 177 is mounted upon and spaced from a set 154 already mentioned. Mounted on top of this terminal 177 is a slotted plate 178, the slots in which form guides for the bell crank associated with the skip mechanism as well as for other bell cranks. Each of the skip bell cranks 180 and 181 (Fig. 10) is pivoted to the rod 152 and has a horizontal arm overlying one of the skip levers 182 and 183. These levers 182 and 183 are pivoted at 184 (Fig. 4) to the carriage frame 143, and have forward extensions which lie against a block 185 fastened to the carriage frame (see Fig. 10). Skip bar 175 has in it 90 slots arranged in two rows of 45 each, each of these slots being arranged to accommodate one skip stop 176. (The skip stops are shown in detail in Fig. 12 from which it will be seen that each one has a slot in the side thereof.) These slots are adapted to cooperate with a toothed bar which extends the length of the skip bar, and which toothed bar is movable to permit insertion and removal of the skip stops from the bar and to lock inserted stops in position. Supported upon upwardly extending portions 185 (Fig. 2) of the frame castings 105, is an indicator plate 186, which carries numerals and cooperates with the pointer 187 to show the position of the punch carriage with respect to the columns of set-bars. Fastened to plate 186, at each end thereof, are studs 188 (Figs. 2 and 10) which extend into diagonal slots in U-shaped members 189, one of which is fastened to each end of the skip stop bar 175. A spring 190 extends from the left-hand one of the studs 188 to a stud 191 fixed to the skip bar 175 and thus holds the skip bar in its left-hand position.

Each of the skip levers 182 and 183 has a projection at right angles to the main portion thereof, and both of these projections underlie a rearwardly extending pin on the left-hand escapement pawl 161.

It will be seen from the above that, whenever a Bowden wire associated with a skip bell crank has its core extended, it rocks the bell crank and the associated skip lever 182 or 183 as the case may be, and raises the left one of the escapement pawls to free the carriage and permit it to travel toward the right under the tension of the carriage spring 170. Likewise, the upper portion of the skip lever is moved upward into position to strike one of the stops in the skip bar. When the lever strikes a stop the momentum of the carriage, as well as the tension of the carriage spring, causes the skip bar 175 to move to the right against the tension of the spring 190.

Mounted on the frame of the punch are two sets of contacts designated respectively as 192 and 193, (see Fig. 11), which are normally held closed by a member 195 fastened to the skip bar and extending rearwardly therefrom, as shown in Fig. 11. It will be seen that, when the skip bar moves to the right, as described, these contacts are momentarily opened for a purpose which will be described hereinafter, when the punch circuits are considered.

*Carriage return mechanism*

The carriage, in addition to the two forward movements just described, has two retrograde movements, one of which is known as the carriage return, and the other as the backspace.

The carriage return movement is initiated by depressing a key and closing a circuit, which will hereinafter be described and results in energizing a relay 200 (Fig. 2), the armature 201 (Fig. 13) of which presses against a turned-over lug on the rear end of a lever 202, thus raising the forward end of the lever against the tension of a spring 203 stretched between the lever and a stud 204 on the plate 205 (Fig. 13). It is to be noted that the plate 205 is supported on another plate 206 which is, in turn, supported on the generator housing and on the casting 105 (Fig. 2).

Pivoted at the same point, as is the lever 202 (Fig. 13), is arm 207 which, together with the lever 202, forms a latch for retaining the bell crank 208 in the position shown. The bell crank 208 is supported in a horizontal position on a stud 209 mounted on the base plate 206. The forwardly extending arm of the bell crank 208 fits in a slot in the left-hand end of the carriage return bar 210. The bar 210 is mounted on the frame members 105 through the medium of studs in the castings and slots in the bar. The bar is normally held in its right-hand position by means of a spring 211 (Figs. 2 and 14) stretched between the right-hand one of the supporting studs and a pin in the bar itself. The lower edge of the bar 210 is toothed and cooperates with spring pressed toothed members on the stops 212 and 213, to hold the stops in any position at which they are set. It will be seen that, when the relay 200 is energized, bell crank 208 is released and, under tension of the spring 211, the carriage return bar is moved to the right, thus rotating the bell crank 208 and causing a set of contacts 214 to be closed and a set of contacts 215 to be opened. The contacts 214 are in a circuit which will be described hereafter in detail, but which, briefly, includes the solenoidal clutch 216 (Fig. 2). A tape 217 is fastened to the periphery of the clutch 216 and extends over a pulley 218, and is fastened to a hook 219 (Figs. 2 and 14). The hook 219 is mounted on a rod 220 (Fig. 14) which extends across the front of the machine. As the clutch rotates, it moves the hook to the left until it makes contact with the stud 163 on the carriage frame 141, after which it moves the carriage with it to the left until a stop on the carriage strikes one or the other of the two carriages return bar stops 212 or 213 hereinbefore described. When the carriage strikes either stop, it moves the bar 210 to the left, rotates the bell crank 208 in a clockwise direction and restores the left-hand rearwardly extending arm to its normal position opening the contacts 214 and de-energizing the solenoidal clutch 216.

Intermediate stop mechanism

In the above description of the carriage return mechanism, the statement was made that the carriage return solenoid circuit would be broken irrespective of which stop member cooperated with the carriage. However, means are provided for returning the carriage to its margin stop or its intermediate stop, as may be desired.

In the present instance, the mechanism for returning the carriage to its intermediate stop is interconnected with the retract mechanism so that, when the carriage is returned to the intermediate stop, retraction does not take place, while, when the carriage is returned to the margin stop, retract levers are operated and the latching slides released.

Fastened to the right-hand one of the extensions 142 of the carriage frame 141 is a stud 221 (Figs. 2 and 14). Pivotally mounted on the stud 221 is a sleeve 222 carrying at one end a short arm 223 (Figs. 10 and 14) and at the other end a longer arm 224. Pivoted to the left end of the longer arm 224 is a stop block 247. This block is slotted at its lower end and fits over the foremost extension of the stud 163. The short arm 223 is connected by a link 248 (Fig. 2) to the right-hand arm of the lever 242.

It will be seen that, whenever the retract bell crank is operated, the link 248 is raised and carries upward with it the block 247, which is then positioned sufficiently high so that it can pass the notch in the right-hand end of the stop 213. Consequently, whenever the retract mechanism is operated, the carriage returns to its margin stop and, if the retract mechanism is not operated, block 247 strikes the edge of the notch in stop 213 and the carriage returns only to the intermediate stop. It should be noted that Fig. 14 shows the block 247 in its raised position.

Retract mechanism

In describing the set basket, the latching slides for the set-bars and retract levers to permit restoration of the set-bars to their normal position were discussed. The mode of operating these retract levers will now be described (see Fig. 6).

Pivoted on the rod 152 is a retract bell crank 240, which is guided in the plate 151 in the same manner as are the bell cranks 153, and which is normally held against the rearward end of the slot due to the tension of spring 241 extending from the upper end of the bell crank 240 to a stud in the plate 151.

Pivoted on the stud 163 (Fig. 2) of the carriage is a lever 242, which may be rocked by rocking the upward extension thereof manually or in the manner to be described.

Joining the horizontal arm of the bell crank 240 and the lever 242 is a link 243 so that operation of the retract bell crank will rotate the lever in a counter-clockwise direction.

Pivoted to a downward extension of the carriage frame 141 is a lever 244, which carries a roller 245 at its left-hand end, which roller is adapted to cooperate with the retract levers. Joining the right-hand ends of the levers 242 and 244 is an additional link 246. It will now be seen that whenever the Bowden wire lying behind the upper end of the retract bell crank is operated the roller 245 is lowered and comes in contact with the retract levers, and, if this retract mechanism is operated and the carriage thereafter returned, the latching slides, the associated retract levers of which are in normal position, will be moved rearward, and the set-bars permitted to restore. In the present punch provision is made for causing the carriage to return without operating the retract mechanism, at one time, and at another for causing the carriage return and retract mechanism to operate jointly. The circuit connections which make this possible will be described hereinafter.

Backspace mechanism

As was stated above, in addition to the carriage return movement, it is necessary to provide for single space movement in a retrograde direction. At times, errors are made in setting up the set-bars and pins, and it is, therefore, convenient to have mechanism which will cause the carriage to move backwards a single space and at the same time release set-bars in the column in which correction is to be made. This is in reality a combined backspace and cancel operation. In point of fact, the cancel operation occurs first and the backspacing is done thereafter. Since the cancel operation will be later described, only the actual backspace movement will be considered at this time. Mounted on the castings 105 immediately to the rear of the indicator plate 186 is a backspace rack bar 225 (Figs. 2 and 4). This bar is mounted through the medium of studs on the frame, and V-shaped slots on the bar so that a bar may be moved first downwardly and then sidewise (see Fig. 2). Extending from the lefthand bar to a pivoted arm 226 is a resilient link 217. Adapted to operate the arm 226 is a toggle formed by the link 238 and the toggle plate 239. It is arranged to be pulled downwardly by a link 288 attached to a backspace solenoid clutch 229. When the backspace key is depressed, a circuit is completed to a relay 230 (Fig. 13), the armature 231 of which lies above a lever 232, which lever, together with an arm 233, forms a latch similar to that described in connection with the carriage return mechanism. Pivoted on an upright plate 234 is a bell crank 235, the upward arm of which serves as a contact maker for contacts 236. When the relay is energized, the spring 237 rotates the bell crank 235 and causes the completion of a circuit through the contacts 236, this circuit extending to the backspace solenoidal clutch 229 and energizing it. The clutch then rotates with the sleeve on the main shaft and causes the toggle 238—239 to operate, pulling the rack bar 225 to the left and downwardly to engage a fixed tooth on the carriage frame 141 and cause the carriage to move to the left or backward one step. When the movement is completed, the lower edge toggle plate 239 strikes the lower one of the contacts 236 and breaks the circuit to the clutch, at the same time restoring the horizontal extending portion of the bell crank 235 to normal position in which it is again latched by the latch lever 232. The circuits mentioned briefly above will be described in detail in connection with the circuit diagram.

*Cancel or erase mechanism*

When the set basket was discussed, the fact that simultaneous depression of two set-bars, until the pins thereon are opposite the noses of the latching bars, would release all the latching bars, was brought out. The mode of depressing two bars in the same zone will now be discussed. Pivoted on the rod 152, and with an upward arm guided in the plate 178 (Figs. 4, 7, 8, 9 and 10) and adapted to be operated by the Bowden wires held beneath that plate, are two erase bell cranks 250 and 251. The bell crank 250 lies in the rear half of the carriage and the bell crank 251 in the forward portion, 250 being adapted to release set-bars of the upper zone and 251 for releasing set-bars of the lower zone. Due to the fact that these mechanisms are similar, only one will be described in detail.

Fastened to the left-hand side of the rectangular portion of the frame 141 is a slotted support 252 which serves as a guide for the stud 254, which is mounted in the lower end of the downwardly extending portion of the bell crank 250. Pivoted on this stud is a trigger 256. Also mounted on the stud 254 is an interponent 258, which interponent is slotted and so may be moved vertically in respect to the stud. The bell crank is held in its normal position as shown in Fig. 7, by means of a spring 260, which extends from a hook on the lower extension of the bell crank to the spring supporting member 159 of the carriage frame. The interponent 258 is held upward and with its lower end toward the right by means of an associated spring 262.

Interponent 258 is provided with a pin 264 extending horizontally therefrom with which cooperate notches in the downwardly extending arm of the trigger 256. The lowermost portion of the trigger 256 is held against the pin 264 by means of the trigger spring 266, which extends from the horizontal arm of the trigger to the rod 139. In the support 252 there is a stud 268, which lies in the path of the horizontal arm of the trigger 256, and which also acts as a stop with which cooperates a horizontal extension on the interponent 258.

Referring now to Fig. 7, which shows the parts in their normal position, from Fig. 8, which shows the parts after the cancel operation has been initiated and carried partially toward completion, and from Fig. 9, which shows the parts at the completion of a cancel operation, it will be seen that, when the bell crank 250 is rotated about its pivot in a counter-clockwise direction, it forces the notch in the trigger 256 against the pin 264 in the interponent 258 and depresses the interponent until the horizontal arm of the trigger 256 strikes the stud 268 in the support 252, at which time additional movement of the bell crank causes the trigger 256 to rotate in a clockwise direction disengaging the notch from the pin and releasing the interponent which then rises under action of the spring 262.

The lower ends of the interponents 258 and 259 are U-shaped and lie over two set-bars within a column, these set-bars being, as has been explained previously, two which are not operated to indicate any digital or alphabetical character in the code employed. Since the trigger 256 disengages from the pin 264 at the same moment that the pins on the set-bar are opposite the noses on the latching slides, it will be obvious that all bars in the zone considered and in the column beneath the interponent 258 will be released. It should be noted that the cancel interponents 258 and 259 are to the left or, expressing it differently, behind the character interponents 156 a distance equal to the distance between columns of set-bars. This is so because when the backspace and erase operations are combined, as they frequently are, the erase operation occurs first and afterward the carriage moves backward one space and a new set-up in the column to be corrected can be made.

*Trip mechanism*

When the proper punches have been selected, and depressed, the clutch tripping lever 35 (Fig. 2) is operated and the main drive shaft 29 permitted to rotate once to cause punching of a card, as has been described. The tripping lever 35 is operated by a solenoid which, in turn, is energized through closure of a circuit by a proper key on the keyboard of the machine. This circuit will be described in detail hereinafter.

*"Trip 2" mechanism*

In the particular embodiment of the invention disclosed herein a mechanism for punching two cards from each set-up of the punches is provided. These two cards are separated and stacked in two receiving magazines. The "Trip 2" mechanism is best seen in Figs. 3 and 15 (Fig. 3 showing the two receiving receptacles and Fig. 15 the mechanism for determining which of the receptacles shall be open to receive the card and for causing the clutch trip lever 35 (Fig. 2) to be held out of the way of the clutch disc for more than a single cycle of the main shaft so that two rotations of that main shaft are assured). As is seen in Fig. 15, the mechanism for controlling the punching of two cards comprises a commutator 270 mounted at the right end of the main drive shaft 29 for rotation therewith. Cooperating with the commutator 270 are a number of electrical contacts 271, 272, 273 and 274, all of which are mounted in a frame 275, which is, in turn, pivoted on a stud 276 which extends from an auxiliary frame 277, which is fastened to the right-hand forward corner of the casting 31 (see also Fig. 2). Mounted on the frame 277 are two pinions 278 and 279, one of which, 278, meshes with a gear 280 fastened to the main shaft immediately to the left of the commutator 270. Also mounted on the frame 277 and meshing with the pinion 279 is a gear 281 which has integral with it a cam 282. The gears are so proportioned that the cam 282 rotates at half the speed of the main shaft 29. Pivoted to the frame 277 at the rearward lower corner thereof (the pivot does not show in the drawing) is a bar 283 which extends forwardly and connects with the armature 284 of the two trip magnet 285. Extending upwardly from the frame 275 is an arm 286 which has projecting from the rear thereof a pin, not shown, which is adapted to cooperate with a notch in the lower surface of the bar 283. A spring 287 holds the pin in the notch. Extending rearwardly from the upper end of the arm 286 is a link 288, which is connected to a goose-neck member 289 fastened to a shaft 290, on which is mounted card gate 291. As will be seen by reference to Figs. 3 and 4, the card magazine 292 is fastened to the rear of the casting 31 and is divided into a forward and a rearward portion. Mounted on a pair of arms supported by the separator extending between the forward and rearward portions is an auxiliary eject roll 293 which is driven by a chain from a gear on the shaft of the eject roll 100. Lying above the auxiliary eject roll 293 and spring-pressed into contact therewith is an upper eject roll 294. It will be seen from the above that, if the link 288 is moved to the rear or left as viewed in Fig. 3, (or to the right as viewed in Fig. 15), the shaft 290 will be rotated clockwise and the gate 291 will be positioned so that a card ejected from the set of eject rollers 100 will move between the rolls 293 and 294 and be conveyed to the rearward one of the two card receptacles. If the shaft is in its normal position, that is to say, with the link 288 in its forward positon, the card coming from eject rolls 100 will strike the lower surface of the card gate 291 and be directed to the forward one of the two receptacles.

It will be seen now that, when the magnet 285 is energized, its armature 284 is moved upward, carrying with it the forward end of the bar 283 and freeing the pin on the rear of the arm 286 from the notch in the bar. The spring 287 will then rotate the frame 275 counter-clockwise, thus lifting the contacts 272 and 274 from the surface of the commutator and rotating the shaft 290 to cause cards to go into the forward receptacle. Contact 271 is arranged to bear against another contact 295 fixedly mounted on the forward portion of the stud supporting the gear 281, whenever the magnet is operated as described. Frame 275 will remain in its rotated position during approximately one and one-half rotations of the main shaft and will then be restored through action of cam 282 on the side of the upstanding arm 286. The various circuits, opened and closed through movement of the frame 275, will be discussed hereinafter, but it will be stated at this time that these circuits cause clutch tripping lever 35 to be held in operation sufficiently long to insure two rotations of the main shaft. In addition, the frame, through the linkage described, permits the card punched on the first rotation of the main shaft to be directed to the forward one of the two receptacles, while the card punched on the second rotation is directed to the rearward receptacle.

Operating solenoids

The various bell cranks, whether digital or functional, which are pivoted in the carriage of the punch, are operated through the medium of Bowden wires, which extend from the terminals on the carriage to terminals in the plate 299 (Fig. 2) fastened to the right of the punch frame. Each Bowen wire is connected to the core of one of the solenoids 300 (one shown in Fig. 9, see also circuit diagram, Fig. 28) and operated whenever that solenoid is energized. The solenoids are generally designated 300 but each solenoid is given a particular reference character, since these reference characters will be needed when the detailed circuit description is given.

Keyboard

As has been stated hereinbefore, the various operations of the punch are controlled by closure of electrical circuits through the medium of certain keys. These keys are mounted in a keyboard frame 320, which is attached to the forward portion of the casting 63, as will be seen by reference to Fig. 5. Details of the keyboard are shown in Fig. 16, which is a section taken along the line 16—16 of Fig. 2.

Referring to Fig. 16, it will be seen that a casting 321, generally rectangular in shape, carries at each end an upright plate 322 between which plates extend bars to support the contact banks 323. Details of contact arrangement for these and the bookkeeping machine keys are seen in Figs. 17 and 18. The contacts of each bank are normally open and are adapted to be closed upon depression of the cooperating plunger 324. Plungers 324 extend from the keys 330 mounted in the plate 325 fastened to the top of the frame 320. The plungers 324 are guided at their lower ends by slots in the curved members 326 supported by the contact supporting bars.

Likewise supported by the keyboard frame 320 is a switch 328, which closes a circuit, hereinafter described, to cause the machine to repeatedly duplicate cards. As will be seen by reference to Fig. 2, the keyboard includes a key 330 for each alphabetical character and for each digital character, as well as keys for trip or two-trip, lower and upper skip, lower and upper backspace and carriage return functions.

Transfer switch

From the above description, it will be recalled that there are but twelve bell cranks 153 and twelve interponents 156, while the keyboard includes twenty-six alphabetic characters and twelve numeric characters. The code representations utilized are such that the same holes in the card may represent either figures or letters, and, consequently, the circuit diagrams will show how the keyboard controls all solenoids to produce the proper punchings. However, as has been stated, the numeric characters may occur in either the 45-column zone or upper or lower 90-column zone. Since there is but one set of numeric keys, it is necessary that they control the proper solenoids to punch in either of the three zones mentioned. In order to alter the connections of the keys to put them in circuit with the proper solenoids for punching in either of the three zones, the transfer switch is provided. The construction of this transfer switch is covered in the present section, the electrical connections thereto being, in general, left for the circuit description.

Mounted beneath the keyboard frame 320 is the transfer switch frame 380, which carries the various parts of the transfer switch (see Fig. 16 which shows a section of the transfer switch in its position in relation to the keyboard). Extending from one side of the transfer switch to the other is a bar 381 which supports a large number of contact stacks, generally designated 384, the contacts of which extend forwardly and the central contacts of which are bent upwardly to cooperate with the insulated rod 382, mounted on arms 383, fastened to a shaft 385, which likewise extends from one side of the switch to the other. Mounted on another shaft 386, extending from side to side of the transfer switch, and lying near the bottom thereof is a bar 387 which serves as the armature for a number of magnets 388 and 389, which operate the switch mechanism. Also fastened to the shaft 386 is an arm 390 from the upper end of which link 391 extends to an arm 392 mounted on the shaft 385. The magnets 388 and 389 are located on opposite sides of the armature, and, consequently, will serve to rock the armature in one direction or the other, thus rocking the shaft 385 and causing the insulated rod 382 to force the upper or the lower set of contacts to make or break as the case may be.

Since the machine normally works in either upper or lower 90-column zones of the card, and is in its 45-column punching position only infrequently, the switch is arranged to be locked in its upper or lower position, unlocked and shifted at the proper time, and again locked in either of these two positions. It is arranged to be restored to the position shown in Fig. 16 or position for 45-column punching, only through the use of the auxiliary key 393 (Fig. 5) which is fastened to the left of the keyboard and joined by a rod to an arm 394 on the shaft 385. Means for locking the switch shaft 385 in either its upper or lower position are shown in detail in Fig. 19 and comprise a lock-releasing magnet 395 fastened to the side of the switch frame and having two armatures 396 and 397 pivoted at a point 398. Each armature has an extension which bears a tooth adapted to cooperate with edges on a cam-like disc 399 on the shaft 385. The rearward ends of the two armatures 396 and 397 are joined by a spring. It will be seen that, when the magnet is de-energized, the spring pulls the two armatures together, causing the teeth thereon to grip the disc to prevent rotation in either direction and that when the magnet is energized the teeth are removed from the disc and the shaft is free to rotate. The circuit connections, as will be shown hereinafter, are such that the locking magnet 395 will be energized just prior to energization of the set of magnets 388 or the set 389 and will be de-energized after the energized ones of the magnets 388 or 389 have shifted the shaft 385 to its other position. Certain relays which are involved in the circuit for controlling the transfer switch are mounted in the switch casing, but are not shown in Fig. 16, nor mentioned at this time, since they are adequately shown in the various circuit diagrams.

*Modified transfer switch*

Although the switch discussed above has proven effective and sufficient in practice, a modified form has been devised, the main reason for modifying the transfer switch being to relocate it so that it will not project beneath the keyboard and be inconvenient for the punch operator, whose knees are naturally under the keyboard itself. The modified form of transfer switch is shown in Figs. 20, 21, 22 and 23.

Referring to either Fig. 20 or 21, it will be seen that the mechanism of the transfer switch is supported in the basket-like frame 400, which is hung on studs 401 fastened to the sub base of the punch. Arms 402 (Figs. 20 and 22) one at each end of the frame 400, extend outwardly to support a bar to which are fastened various contact stacks. Near each end of the frame 400, and supported thereby, are supports 404 on which a switch shaft 405, as well as two magnet-supporting bars 406 and 407, are mounted. As is indicated in Fig. 22, two magnets 409 are supported by the left-hand bar 406. Two other magnets 410 are supported by the right-hand bar 407. The two magnets 409 are connected in series and form together a horse-shoe shaped magnetic circuit and, in a similar manner, the two magnets 410 are connected in series to form another horse-shoe magnetic circuit. Mounted on the shaft 405 (Fig. 22) are three arms 411, connected at each end by the bars 412 and 413, which form the armatures of the magnets 409 and 410, respectively. The arms 411 (Figs. 20 and 22) have an upward extension, which is slotted to receive a strip of insulation 414, which serves to make and break the contacts of the stacks. At the far right-hand end of the shaft 405 is an arm 415 (Figs. 22 and 23) which carries a pin 416 at its upper end; this pin cooperates with two contact-makers 417 and 418, which are carried on a disc 419, fastened to the shaft 405.

Disc 419 has a downwardly extending projection 420, which cooperates with the detent spring 421 to hold the disc and the members 417 and 418, in either one or two positions. It will be seen from the above description that when the shaft 405 is rotated the pin 416 moves freely between the contact makers 417 and 418 for an interval, after which it presses against one of the contact-makers and causes a circuit to be closed thereby at the same time causing a circuit to be opened by the other of the two contact-makers. Since the detent spring 421 cooperates with the projection 420 on disc 419, which disc is mounted freely on the shaft, the action of the contact-makers will be very rapid when it occurs, but will be delayed in respect to shaft 405. The reason for this action will be explained in connection with the circuit diagram.

As in the first transfer switch described, means are provided for locking the switch shaft in either of two positions, one of which permits the various punch circuits to control punching in the upper zone and the other of which permits control in the lower zone. The locking mechanism used with the modified form of transfer switch is also different from that described and will now be considered.

Fastened to the left-hand one of the supports 404 is a bar which supports the locking magnet 423 (see Fig. 22). Pivoted to the bar 422 are two levers 424, which are connected at their upper ends by a spring 425, which tends to hold the armatures away from the magnet core. Each lever 424 is fastened to a magnet armature 426 which is slotted at both its upper and lower ends, the upper end fitting over the bar 422 and being pivoted thereto, and the lower end having fastened therein a stop 427, which cooperates with an arm 428 on the shaft 405 in a manner which will be described shortly.

The magnet armatures 426 are quite wide and cover the cores of the magnet 423 as may be seen by reference to Fig. 22. Each stop member 427 has pivoted to it a contact maker 429. These contact-makers are resiliently connected to the arm through the medium of a spring extending from the stop member to an upward extension of the contact maker and a pin in the stop member lying behind a vertical surface of the contact-maker.

The contact-makers 429 cooperate with contacts 430 which are mounted on the support 407 and extend to the left (Fig. 22), being normally disengaged due to their own spring action. Mounted on the switch shaft 405 to the right of the stop members 427 is the arm 428, which has extending from each end thereof toward the left as viewed in Fig. 22 a lug 431, each of which cooperates with the nose on the corresponding stop 427.

As will be seen from the foregoing when the lock-releasing magnet is energized, the armatures thereof are attached and move inwardly, removing the nose on the stop members 427 from both of the lugs 431 and permitting the switch shaft 405 to be rotated upon energization of the main magnets 409 or 410. At the same time, the contact maker 429 move together and close the contacts 430. When the lock-releasing magnet is de-energized, the armatures, contact makers and stop members will move apart due to the tension of spring 425, and one of the noses on the stop member 427 will lie inside the corresponding lug 431, while the other nose will lie above its cooperating lug 431. Consequently, tension of the spring 425 will be transmitted through one of the armatures to cause the nose on the stop member to press against the lug 431, and hold the shaft in the particular position to which it has been caused to move. Likewise, the nose on the other stop member will lie above the lug cooperating therewith, and will also tend to prevent movement of the switch shaft 405.

As in the first form of transfer switch, means are provided for setting the switch shaft in its middle position, and for locking it in this position in order that 45-column punching may occur. This means is manually operated and comprises a plate 432 arranged to slide vertically on studs 433 in one of the supports 404 (Fig. 21). A lever 434 is pivoted to the rear of the support bar 404 and is pivotally connected to the plate 432. Attached to the forward end of this lever is a rod 435, which extends upwardly and has a handle at the upper end so that it may be manually raised and retained in the raised position (the retaining means is not shown). When the rod 435 is elevated, it carries the plate 432 upwardly and causes the pins 436 thereon to engage notches in the contact makers 429, closing the contacts 430 and carrying the stop members 427 toward each other until they occupy a central position, thus permitting the arm 428 to take a horizontal position and cause only the center contacts of the various contact stacks to be closed.

Mounted in the bottom of frame 400 are two bushings 437 and 438, which are receptacles for multiple plugs. These bushings or receptacles have a plurality of contacts arranged in pyramidal form adapted to be contacted by a similar pyramidal plug. They are wired to the various contacts of the bank of the transfer switch. It is intended that a cable shall run from one of these plug sockets to the keyboard of the punch and the other shall be used as a spare, and, in many instances, connected to various contacts mounted beneath a Remington bookkeeping machine or the like, as will be hereinafter described.

CARDS

Before describing the punch circuits, the cards produced by this machine will be considered in order that the code representations of the various alphabetic and numeric characters may be understood.

The 45-column code represents each character of the first half of the alphabet, that is, characters from A to L, inclusive, by a single perforation and the remaining alphabetic characters by two perforations each. Referring to the cards of Figs. 24 and 25, it will be seen that A is represented by a single perforation in the position next the top of the card, B by a single perforation in the position second from the top of the card, K being represented by a perforation in the lowest position of the card; L by a perforation in the top position of the card. Each character from M thru Z is represented by two perforations, one of which in every instance is in the top position of the card. Thus, M is represented by two perforations, one in the position next the top, and one in the top position of the card. It is to be noted that certain letters, which are generally similar, are represented by the same perforation or perforations, for example, O and Q; U and V; X and Z.

The numeric characters are presented in the 45-column code system by single perforations each of which is designated on the card, Fig. 24.

In the present instance, the alphabetic characters are not represented in the 90-column code. The card of Fig. 25 shows the coding in the 90-column system for the numeric characters. In each instance, whether upper or lower 90-column code is considered, each odd digit is represented by a single perforation, while each even digit is represented by two perforations, one of which is the same as that for the next lower odd digit, and the other of which is that perforation which alone would represent "9". As can be seen by reference to Fig. 25, the card is divided into two zones, each having six perforation positions. The uppermost perforations in each zone represent zero, and the next one "1", if alone; "2" if combined with "9", and so down to the sixth lowest perforation position which alone represents "9", and which is used as has been stated to combine with other perforations for representing even digits.

Fig. 25 shows likewise certain fractions in both upper and lower zones. The representations for the fraction are combinations with the code representation of their numerators, and a hole in zero position to indicate that they are fractions expressed in eighths. Thus, one-half is represented by three holes, one of which is in the zero position and the other two of which together form the representation for the numeral "4", thus indicating "⅘" or "½".

MODIFIED KEYBOARD

Fig. 86 shows a form of keyboard which has three sections, each of which includes a full complement of numeral keys. This keyboard includes separate keys for functional operations in the various zones. It will be seen that by the use of such a keyboard, a punch may be constructed which needs no transfer switch. However, such a punch would not be adapted to use with the bookkeeping machine.

MODIFIED PUNCH

The material above has described the mechanical elements of one form of punch. In Fig. 26 there is shown a slightly modified form in which the punch mechanism is mounted upon a standard typewriter table rather than upon the usual punch base. It is to be understood that the description of the mechanical elements of the punch, as well as the following description of the punch circuits apply equally to the punch mounted as shown in Fig. 26.

PUNCH CIRCUITS

As was stated in the early part of the specification the invention herein comprises a bookkeeping machine combined with a plurality of punches. In the drawings, Fig. 1, two punches are shown. These two punches are mechanically identical and their circuits are similar in many respects, but differ very slightly, as will be pointed out hereinafter. One punch (punch A, Fig. 1) is adapted to operate first to set up for alphabetic punching in the 45-column zone, then to set up for punching in the 90-column code lower 90- column zone, and, last, to set up for punching in the 90-column code in the upper 90-column zone, while the other punch (punch B, Fig. 1) is adapted to work first in the 45-column code for alphabetic work, then in the 90-column code in the upper 90-column zone and finally in the 90-column code in the lower 90-column zone.

Punch A

The circuits for punch A will be described in detail and the difference between this punch and the punch B set forth hereinafter.

In the wiring diagram (Figs. 27 and 28), which shows circuits for punch A; various mechanical elements previously described have been schematically represented in order that the circuits may be followed without constant reference to the other drawings for the mechanical elements.

Alphabet keys

As was indicated when the cards were discussed, the alphabet key circuits may be divided into two groups of which one group contains the keys from A through L (that is, keys associated with letters represented by a single perforation) and the other group contains keys from M through Z (letters represented by two perforations). Also, each alphabet key is associated with two circuits, one for use when the transfer switch is in its 45-column position, and the other for use when the switch is in its lower 90-column position.

When the transfer switch is in its 45-column position, and the A key is depressed (A being taken as an example of the group A through L), the following circuit is completed:

From the positive side of the motor generator 22 (Fig. 28) to conductor 450 and thence through one set of contacts of the trip repeat switch 328 to the common lead 451; thence through the conductor 452 to the inner right-hand contact of the stack 352; thence to the inner left-hand contact of that stack; thence through conductors 453 and 454 to the set of contacts closed by the A key; thence through the conductors 455 and 456 to the winding of the solenoid 311, and thence through the conductors 457 and 458 to the left-hand contacts 214 of the carriage return switch; thence through conductors 459, 460, 509 and 499 to the negative side of the generator.

When the transfer switch is in its lower 90-column position, and the A key is depressed, a circuit is completed from the position side of the motor generator 22 to conductor 450 and one set of contacts of the trip repeat switch 328 to the common positive lead 451; thence through the conductor 452; thence through the center and inner left-hand contacts of the stack 352; thence through conductors 453 and 454 to the set of contacts closed by the A key; thence through those contacts and the conductors 455 and 456; thence through solenoid 311; through conductors 457 and 458, and the left-hand contacts 214 of the carriage return switch; thence through conductors 459, 460, 509 and 499 to the negative side of the generator. It will be seen from the above that the depression of the A key will energize the proper solenoid to set a punch stop which will ultimately cause the punching of the card in the proper position. All keys from A through L are similarly connected.

It is to be noted that the alphabet keys are not connected when the switch is in its upper 90-column position.

It is to be noted that the transfer switch is in position for lower 90-column punching at this time and that the circuits are traced through contacts closed when in this position.

All of the keys M through Z are connected in similar circuits, one of which will now be described:

When the T key is depressed and the transfer switch is in its 45-column position, the following circuit will be completed:

From the common positive lead 451 which receives battery through the switch 328, as has already been described; thence through the winding of the relay 296 (Fig. 28); thence through the conductor 461; thence through the right and left-hand inner contacts of the stack 353; thence through the conductors 462 and 463; thence through the T key; thence through conductors 464, 465 and 466 to the winding of the solenoid 305; thence through the conductors 483 and 458, and through the carriage return switch to the negative side of the generator in the manner already described. Solenoid 305 will operate and likewise relay 296 will operate, relay 296 completing a circuit from one side of its winding through its armature and contact, and thence through conductors 467 and 468 to the winding of solenoid 312; thence through the winding and conductors 469 and 457 to the common negative conductor 458; thence through the carriage return switch 214 to the negative side of the generator 22.

When the T key is depressed while the transfer switch is in its lower 90-column position, the following circuit is completed:

From the common lead 451 which receives current through the switch 328, as has already been described, thence through the winding of the relay 296; thence through the conductor 461; thence through the center and inner left-hand contacts of the stack 353; thence through the conductors 462 and 463; thence through the T key; thence through conductors 464, 465 and 466 to the winding of solenoid 305; thence through the conductors 483 and 458 and through the carriage return switch 214 to the negative side of the generator in the manner already described. Solenoid 305 will operate and likewise relay 296 will operate, relay 296 completing the circuit from one side of its winding through its armature and contact, and thence through conductor 467 and 468 to the winding of solenoid 312; thence through the winding and conductors 469 and 457 to the common negative conductor 458; thence through the carriage return switch 214 to the negative side of the generator.

From the above it will be seen that, when the T key is depressed, solenoids 305 and 312 are energized, causing a set-up of the two punch stops necessary to represent the letter T.

Again, it is to be noted that the alphabet keys of the A punch are not in circuit when the transfer switch is in upper 90-column position.

Numeral keys

The numeral keys are adapted to operate different solenoids depending upon the position of the transfer switch. In connection with these numeral keys, therefore, illustrative examples will be described, first, considering the switch in its 45-column position, second, in its lower 90-column position, and, third, in its upper 90-column position.

When the transfer switch is in its 45-column position (that is, with all the inner left-hand contacts making with all the inner right-hand contacts) and the 1 key is depressed, the following circuit will be completed:

From the common positive conductor 451; thence through the conductors 487 (Fig. 27), 470 and 471 to the 1 key; thence through that key and through conductors 472 and 473 (Fig. 27) to the inner left-hand contact of the contact stack 348; thence to the inner right-hand contact of that stack; thence over conductor 537 to the winding of solenoid 301; thence through that winding and over conductors 486 and 457 to the common negative conductor 458, thus operating solenoid 301; which causes a stop to be set in the proper position to represent the digit 1 in the 45-column numeric code. The other numerals are likewise represented by a single hole in the 45-column code and it is, therefore, unnecessary to give more than a single example of the 45-column numeric circuits.

When the transfer switch is in its lower 90-column position, as shown in Fig. 28, and the 1 key is depressed, the following circuit will be completed:

From the common positive conductor 451 through conductors 487, 470 and 471 to the 1 key, through the contacts of that key, and thence through conductors 472 and 473 to the inner left-hand contact of contact stack 348; thence to the center left-hand contact of that stack and through conductors 474 and 466 to the winding of solenoid 305; thence through that solenoid and conductor 483 to the common negative conductor 458 already discussed. This will cause operation of the solenoid 305, which serves to set a punch stop in the uppermost row of the lower 90-column zone, thus representing the digit 1 in the 90-column code in the lower zone position.

When the 1 key is depressed, while the transfer switch is in its upper 90-column position (the mode of shifting the transfer switch will be described later), the following circuit is completed:

From the common positive conductor 451 through conductors 487, 470 and 471 to the 1 key, through that key to conductor 472; thence through conductor 472 to the right-hand center contact of switch stack 350; thence to the right-hand inner contact of that stack; thence through conductor 456 to the winding of solenoid 311; thence through conductor 457 to the common negative lead 458; thus completing the circuit and operating solenoid 311, which sets a stop in proper position for punching the card with the code representative of the digit 1 in the upper 90-column zone.

As was stated hereinabove, any even digit in either the upper or lower 90-column zone is represented by two perforations.

The circuit which is completed when the 2 key is depressed, while the transfer switch is in its lower 90-column position, will now be traced. The 2 key completes the following circuit:

From the common positive conductor 451, thence through the winding of relay 297 (Fig. 28); thence through conductor 475; thence to the center left-hand contact of the stack 351; thence through the inner left-hand contact of the stack 351 and conductors 476 and 477 to the 2 key; through that key and conductors 478 and 479 to the inner left-hand contact of contact stack 347; thence to the center left-hand contact of the stack and over conductors 474 and 466 to the winding of solenoid 305 and thence over conductor 483 to the common negative conductor 458.

Closure of this circuit energizes the solenoid 305 and the relay 297. Energization of relay 297 completes a circuit from one side of its winding (to which positive battery has already been applied, as described above) through its armature and contact and conductors 481 and 482 to the winding of solenoid 309 and thence over conductor 483 to the common negative conductor 458, thus energizing solenoid 309. Simultaneous energization of the solenoids 305 and 309 causes proper stops to be set for causing punching of the code representation of the digit "2" in the lower zone position.

When the 2 key is depressed, while the switch is in the upper 90-column position, the following circuit is completed:

From the common positive conductor 451 through the winding of the relay 298; thence through conductors 484 and 485; thence through the center and outer right-hand contacts of the stack 351; thence through conductors 476 and 477 to the 2 key; through the contacts of that key to conductor 478; thence through the outer, center and inner right-hand contacts of the stack 350; thence through conductor 456 and the winding of solenoid 311 to conductor 457 and thence to the common negative conductor 458, completing the circuit, and causing the energization of solenoid 311 and of relay 298. Energization of relay 298 closes a circuit over its contact and armature from the common positive lead 451 to the winding of solenoid 303, and thence through the winding and the conductors 486 and 457 to the common negative conductor 458, thus energizing the solenoid 303. Energization of solenoids 303 and 311, simultaneously, causes punch stops in the next to the top and in the lowermost positions of the upper 90-column zone to be set for punching to represent the digit 2.

*Space bar*

When the mechanical elements of the punch were described, it was shown that operation of any character bell crank 153 would cause the punch carriage to move a step toward the right, due to the action of the space bail 169 overlying the bell cranks. It is at times desirable to space the carriage without setting stops to punch any characters and for that reason the space bar is provided. The solenoid which is in the space bar circuit operates a Bowden wire, which lies behind an upstanding extension on the space bail 169 (see Fig. 2).

The space bar circuit does not pass through the transfer switch and the spacing movement of the carriage is, therefore, not affected by operation of the transfer switch.

The space bar circuit extends from common positive conductor 451 (Fig. 27) through conductor 487 to the space bar contacts; thence through one or both of the sets of contacts to conductor 488 and thence to the winding of the space solenoid 313; thence over the conductor 457 to the common negative conductor 458. Such completion of the circuit to the solenoid 313 will cause operation of the space bail 169 and a step of movement of the punch carriage.

*Skip key*

As was indicated when the skip mechanism was described a single skip key is adapted to control the carriage for movement to position in accordance with the setting of skip stops in either the upper or lower zone position of the skip bar 175 of the punch.

Assuming that the punch is working in the lower zone, and the transfer switch set accordingly, that is, in the position shown in Fig. 28, the circuit completed by the skip key will be as follows:

From the common positive conductor 451; thence through the conductors 489 (Fig. 28) and 490 to the lower skip solenoid 314; thence through its winding and conductor 491 to the inner left-hand contact of the stack 356; thence to the center left-hand contact of that stack and through the conductors 492 and 493 to the skip key; through the contacts of that key and through conductors 494 and 495 to the center left-hand contact of the stack 355; thence through the inner left-hand contact of that stack to conductor 496; thence to one of the two windings of the lower skip relay 360; thence to conductor 497; thence through conductor 457 to the common negative conductor 458; thus causing energization of the relay 360 and of the solenoid 314.

When the relay 360 operates, it immediately locks through a locking circuit which extends from the common positive conductor 451 through conductors 489 and 490 (Fig. 28) and to the winding of the solenoid 314; thence through conductors 491 and 498 to contacts 193; thence through contacts 193 and the contact and armature of relay 360 to the second winding of that relay; thence through conductor 499 to the negative side of the generator 22.

This locking circuit keeps the solenoid 314 energized and thus continues to hold the carriage escapement pawl in its released position until the carriage strikes a skip stop 176 (see Fig. 11). As has been explained, when the carriage strikes a stop, the skip bar 175 moves to the right and contacts 193 are opened, thus breaking the locking circuit and restoring the relay 360 and solenoid 314 to normal.

If the skip key is depressed while the transfer switch is in position for upper 90-column operation, the skip key circuit is as follows:

From the common positive conductor 451; thence over conductors 489, 490 (Fig. 28) through the winding of solenoid 315; thence through conductor 501 to the center right-hand contact of contact stack 356; thence to the inner right-hand contact of that stack; thence over conductors 492 and 493 to the skip key; through that key to conductor 494; thence over conductor 495 to the inner right-hand contact of the stack 355; thence to the center right-hand contact of that stack; thence over conductor 502 to one of the windings of the doubly wound relay 361; thence through conductors 497 and 457 to the common negative conductor 458. Solenoid 315 and relay 361 will then operate in series, the operation of relay 361 completing a locking circuit, which extends from common positive lead 451 over conductors 489 and 490 (Fig. 28) to the winding of the solenoids 315; thence through conductors 501 and 503 to the contacts 192; through these contacts and through the contact and armature of relay 361, and the second winding of that relay; thence over conductor 499 to the negative side of generator 22. This locking circuit will continue closed until the skip bar 175 is moved by the carriage to open the contacts 192 at which time the circuits just described will be restored to normal.

*Carriage return key*

The carriage return key initiates a carriage return to the intermediate stop only, since it is necessary after returning the carriage to set up the punch in the other 90-column zone before the card is actually punched and ejected from the machine. In punch A, the completion of the carriage return key circuit serves also to operate the transfer switch to condition the circuits for operation in the upper 90-column zone.

When the carriage return key is depressed, the following circuit is completed from the common positive conductor 451, thence over conductors 487 and 470 to the carriage return key; thence to conductor 504, where it divides into three separate branch circuits, which will now be described (Fig. 28):

From conductor 504, through conductor 505 to the center left-hand contact of the stack 357; thence through the outer left-hand contact of the stack 357; thence through the conductor 506 and through both of the windings of the upper transfer switch relay 362; thence through conductors 507, 508, 460 and 509 to conductor 499 and to the negative side of the generator.

The second branch circuit completed by depression of the key leads from the conductor 504 through conductors 505 and 510 to the center left-hand contact of contact stack 358; and thence through the inner left-hand contact of that stack to a conductor 511, and through the winding of the lock-releasing magnet 395 to the conductor 507 and thence over conductors previously mentioned to the negative side of the generator.

The third branch circuit leads from the conductor 504 over conductor 512 and through contacts 273 and 272 of the two trip mechanism to conductor 513; thence to the carriage return relay 200 and thence over conductor 514 to conductor 509, which, as was described just above, leads to the negative side of the generator. Thus, the carriage return relay 200, lock-releasing magnet 395 and transfer switch relay 362 are simultaneously energized.

Energization of the carriage return relay 200 frees the carriage return bar 210 and permits it to move upward under spring-tension to open the left-hand contacts 214 and close the right-hand contacts 215; thus breaking the connection from the negative side of the generator to the common negative conductor 458 at the left-hand contacts 214, and closing a circuit which leads from the positive side of the generator 22 through conductor 515 to the winding of the carriage return solenoidal clutch 216, thence through conductor 516 and the right-hand contacts 215 of the carriage return switch to conductor 459 and thence over the conductors 460, 509 and 499 to the negative side of the generator. The solenoidal clutch 216 now rotates with the main shaft 29 and pulls the tape 217 downwardly, carrying the hook 219 downwarly, guided by the bar 220. At some time during its travel, the hook 219 picks up the carriage 140 and move it along its rails 147 toward intermediate position. When the carriage reaches intermediate position, it strikes a projection on the bar 210 and carries it downwardly until latched by the member 201.

Meanwhile, energization of the lock-releasing magnet 395 has freed the bar or shaft 405 for movement, and energization of the relay 362 has caused it to operate and close a circuit from the conductor 506 through one winding of the relay 362; thence through the armature and contact of that relay and the winding of the solenoids 389 to contacts 417 of the contact stack 359 thence to conductor 517; thence to conductor 450 and the positive side of the generator.

As was mentioned when the transfer switch was described, the contacts 417 and 418 are arranged to have a delayed break and quick transit to their other positions. Consequently, this circuit 389 will be maintained for a considerable period through the transfer switch operating magnets until magnets 389 move the bar 405 to the right at which time contacts 417 open and break the circuit through the magnets 389.

Prior to the opening of the contacts 417, the inner and center left-hand contacts of the stack 358 are opened due to the movement of the switch shaft 405, and, consequently, the circuit through the lock-releasing magnet 395 is broken, thus de-energizing that magnet and preparing it for locking the shaft when the latter reaches its extreme of movement.

The movement of the shaft 405 will immediately, after breaking the circuit to the lock-releasing magnet 395, restore that circuit, but, since the carriage return key is now open, the lock-releasing magnet will remain de-energized. At the time that the inner and center left-hand contacts of contact stack 358 open, the outer and center contacts of stack 357 likewise open and break the circuit through the locking winding of the relay 362, which restores to normal and prevents continued energization of the magnets 389.

In connection with the above circuits, it is to be noted there is no energization of the retract solenoid and, consequently, the block 247 of the stop mechanism is not elevated and the carriage returns to its intermediate stop only. It will thus be seen that depression of the carriage return key causes the transfer switch to operate and to be locked in its new position and the carriage to return to its intermediate stop, thus conditioning the machine for operation to set up punches in the upper 90-column zone.

*Back space key*

As was indicated when the backspace and erase mechanisms were discussed, depression of the backspace key closes a circuit which not only causes a backward step of movement of the punch carriage but also causes release of the latching slides in the column immediately behind that in which the punch setting interponents are positioned.

Assuming now that the transfer switch is in lower 90-column position, the circuit through the backspace key is as follows:

From the common positive conductor 451; thence over the conductors 487 and 470 to the backspace key; through that key and over the conductor 519; thence to the inner left-hand contact of the stack 354; thence through the center left-hand contact of that stack and over conductor 520 to the lower erase solenoid 316; thence through conductor 457 to the common negative conductor 458. Energization of lower erase solenoid 316 will close contacts 521 (these contacts are closed by the movement of the solenoid 316 since the contacts are mounted on the Bowden wire terminal plate 299 above the solenoids and adapted to be closed by movement of the solenoids as may be readily seen by reference to Fig. 9. Closure of the contacts 521 completes a circuit from the common positive conductor 451 through conductor 489 to the contacts 521; thence through the contacts to conductor 523 and to the backspace relay 230; thence through the winding of the relay to conductor 524 and thence over conductor 457 to the common negative conductor 458.

Energization of relay 230 operates the latch 232, releasing the contact maker 235 (see also Figs. 2 and 13), which under spring tension rotates and closes the contacts 236. Closure of the contacts 236 completes a circuit from the positive side of the generator through the winding of the backspace solenoidal clutch 229; thence over conductor 525, contacts 236 and conductor 526 to conductor 499 and the negative side of the generator 22. Flow of current through this circuit energizes the solenoidal clutch 229 which rotates with the main shaft 29, and upon completion of the backspace movement (which was described under the heading "Backspace mechanism"), the tape 228 having rocked the toggle plate 239 downwardly, brings it against the contact maker 235 and restores the latter to normal latched position, opening the contacts 236 and de-energizing the backspace clutch 229.

Although the circuits completed by the backspace key when the punch is operating in the upper 90-column position are similar to those described above, nevertheless they will be traced in detail.

When the punch transfer switch is in position for upper 90-column operation and the backspace key is depressed, the following circuit is completed:

From the common positive conductor 451 over conductors 487 and 470 to the backspace key; thence through that key and over conductor 519 and conductor 527 to the upper erase solenoid 317; thence through the winding of that solenoid to conductor 457 and to the common negative conductor 458.

Energization of the upper erase solenoid causes closure of contacts 522, which are in parallel connection to contacts 521 and which, therefore, complete the circuit through the backspace relay 230 described in connection with the lower backspace function. Therefore, the backspace mechanism operates in the same manner, the only difference in the two operations being that different erase solenoids are energized and, consequently, release stops in the proper zone of the punch set-basket.

*Trip circuit*

The A punch is arranged to punch two duplicate cards and for that reason the trip circuit is somewhat different from that of the B punch, which will be hereinafter described. The special mechanism for causing punching of the two duplicate cards and for separating the two cards and for directing them to separate receptacles has already been discussed. This mechanism is shown in schematic form on the wiring diagram of Fig. 28, the corresponding parts being given the same reference characters as in Fig. 15.

The trip key is arranged to function only when the punch is in its upper 90-column operating position. When the punch is operating in the upper 90-column zone and the trip key is depressed, the following circuits are completed:

From the common positive conductor 451; thence over conductors 487 and 470 to the trip key (designated T—2 on Figs. 2 and 27); thence over conductor 528 to a point at which the three branches occur, the branches being as follows:

(1) Over conductor 529 to the winding of a special trip or two-trip solenoid 285; thence over conductors 530, 459, 460, 509 and 499, to the negative side of the generator.

(2) Over conductor 531 to the center right-hand contact of the stack 357; thence through the outer right-hand contact of that stack to the lower transfer switch relay 363 through both windings of that relay to conductor 500; thence over conductors 459, 460, 509 and 499 to the negative side of the generator.

(3) Over conductors 531 and 532 to the center right-hand contact of the stack 358; thence to the inner right-hand contact of that stack; thence over conductor 511 to the winding of the lock-releasing magnet 395, and thence over conductors 507, 508, 460, 509 and 499 to the negative side of the generator.

The completion of the three branch circuits described above causes energization of the two-trip magnet 285, the lower transfer switch relay 363 and the lock-releasing magnet 395. Operation of the two-trip magnet 285 causes its armature 284 to move upward and be latched in its upper position by the latch member 283, thus rotating the frame 275 and causing contact 271 to close with contact 295, at the same time continuing the circuit between contacts 272 and 273 and raising contacts 273 and 274 from the surface of the commutator 270. Closure of the contacts 271 and 295 completes a circuit from the positive side of the generator over conductor 515 through the contacts mentioned to conductor 533 and thence through the winding of the trip magnet 36; thence over conductor 459 and through conductors 460, 509 and 499 to the negative side of the generator. This energizes trip magnet 36, withdrawing the armature or tripping lever 35 from the path of the free element 33 of the clutch and permitting rotation of the main shaft 29. As the main shaft rotates it drives the cam 282 counter-clockwise and after that cam has rotated for approximately three-quarters of a revolution (or the main shaft has rotated for approximately one and one-half revolutions) the projection on the cam strikes the arm 286 and removes the latch 283 from the path of the armaure 284, permitting frame 275 to restore to normal position. This action opens the circuit previously described which leads to the trip magnet 36; thence releasing the trip lever 35, which returns to its normal position preparatory to stopping the shaft 29 at the end of its second revolution.

Shortly before the completion of the second revolution, the elevated metallic portion of the commutator 270 strikes the contact 272 and separates it from the contact 273 for a reason shortly to be set forth.

Following the break described above, the commutator in its continued rotation makes contact with the contact 274 and thus completes a circuit from the common positive lead 451 over conductors 489 and 490 to the winding of the retract relay 318; thence through the winding of that relay and over conductor 534 to contact 274; thence through the metallic portion of the commutator 270 to the contact 272; thence over conductor 513 to the carriage return relay 200 and through its winding to conductor 514 and through conductors 509 and 499 to the negative side of the generator.

This causes energization of the retract relay 318 as well as of the carriage return relay 200. The operations which follow energization of the carriage return relay have already been described in connection with the carriage return key. The operation of the retract relay 318 completes a circuit from the common positive conductor 451 over the conductors 489 and 490 through the winding of the relay 318, the armature and contact of that relay; thence over the conductor 535 to the winding of the retract solenoid 319 and thence over conductor 536 and through the right-hand contacts 215 of the carriage return switch to conductor 459 and thence over conductors 460, 509, and 499 to the negative side of the generator.

It is to be noted that the right-hand contacts 215 of the switch close immediately upon energization of the carriage return relay 200 so that the circuit from the retract solenoid 319 is completed at this point prior to its completion at the contact and armature of the retract relay 318. The function of the retract solenoid 319 has been described in connection with the retract mechanism. It is, briefly, to lower the roller into the path of the retract levers so that the latching slides will be moved rearwardly to release all set stop pins as the carriage returns to its initial position. It is to be noted that at this time, due to the operation of the retract solenoid, the block 247 is elevated and the carriage, consequently, permitted to return to its marginal position.

At the end of the fourth preceding paragraph the statement was made that the reason for breaking contacts 272 and 273 prior to closing contacts 272 and 274 would shortly be disclosed.

If contacts 272, 273 and 274 were all connected together, the following circuit would be completed:

From the common positive conductor 451 through conductors 489 and 490 to the winding of retract relay 318; thence through that winding and over conductors 534 to contact 274; thence through the metallic portion of the commutator 270 to contact 272 and thence to contact 273, thence over conductor 512 to the center left-hand contact of the stack 357 and thence (since the transfer switch will by now have operated) to the outer left-hand contacts of that stack and over conductor 506 to the upper switch relay 362, through both of its windings to conductor 507 and thence over previously described conductor to the negative side of the generator. This would cause the transfer switch, just moved to its lower position to again operate and move to upper position. Therefore, the shift of the transfer switch to lower position could never occur effectively.

At the same time that the special strip magnet 285 is energized, the transfer switch 363 is energized, as has been described, and, consequently, the circuits now to be considered are in reality completed prior to the carriage return and retract actions discussed above. Operation of the lower transfer switch relay 363 follows the operation of the locking magnet 395, so that the switch shaft 405 is free to move. The operation of the relay 363 completes a circuit from the positive side of the generator over the conductors 450 and 517 through the outer and center right-hand contacts of the stack 359 and thence through the winding of the lower transfer switch solenoids 388 and through the contact and armature of the relay 363 and one of the windings of that relay to conductor 500 and thence through conductors 459, 460, 509 and 499 to the negative side of the generator.

The outer and center contacts of the stack 359 are delayed action snap contacts and are designated as contacts 418 in both Figs. 23 and 28. The energization of the magnets 388 causes the switch to operate, moving the bar to the left as viewed in Fig. 28 and closing contacts associated with the lower zone. It is again to be noted that the contacts 418 are held closed for a considerable period and that during that interval the switch bar or shaft 405 moves to the left and opens the inner and center right-hand contacts of the stack 358, thus de-energizing the lock-releasing magnet 395 so that it may again lock the shaft 405 in position. It will be seen that the contacts 417, which are the outer and center left-hand contacts of the stack 359, will be closed not long after the trip key is depressed. These contacts are in the carriage return circuit and would normally, if the special trip magnet 285 were not energized, as described, close the circuit to the carriage return relay and cause immediate action of the carriage return mechanism, which is undesirable.

Trip repeat circuit

At times it is desirable to produce a large number of cards from a single set-up of the punch stops. This may be accomplished by rotating the switch arm of the trip repeat switch 328 clockwise, thus connecting the conductor 450 leading from the positive side of the generator, to the conductor 528, thereby short circuiting the "trip 2" key, and applying positive circuit directly to the special trip magnet 285, which will then continue energized until the trip repeat switch is restored to normal. Following this restoration, the action just described, in connection with the trip key, will be performed, thus causing the transfer switch to move to its lower position, the carriage to return, the latching slides to be operated and the punch stops restored to normal.

Punch B

The circuits of the second punch are identical with those of the first with few exceptions. These exceptions are the transfer switch operating circuits, trip circuit, and the carriage return circuit.

The transfer switch operating circuits are different in two respects, one, because they are designed to cause the punch to operate first in the 45-column zone, then in the upper 90-column zone, and finally in the lower 90-column zone, and, another, because the modified form of transfer switch described hereinabove and shown in Fig. 30 is used in place of the first form of transfer switch. The trip circuit differs because punch B is not arranged for ejecting duplicate cards, and, consequently, certain portions of the trip mechanism are not used.

Also, the second punch is so arranged that depression of the carriage return key causes the transfer switch to shift from its upper 90-column position to its lower 90-column position and depression of the trip key causes the transfer switch to shift from its lower 90-column position to its upper 90-column position.

In order that the operation of the transfer switch or the trip mechanism as modified for punch B may be clear, these circuits will be described in detail, but no other circuits will be considered since all other circuits are identical to those described in connection with punch A.

Carriage return key

When the carriage return key is depressed, while the punch is in its upper 90-column position, as shown in Fig. 30, the following circuit will be completed:

From the positive side of the generator 22 through conductor 540 to the trip repeat switch 328, through the arm of that switch to the conductor 541, thence over conductors 542 and 543 to the carriage return key contacts; thence through those contacts and through conductors 544 and 545 to contact 273 of the trip mechanism, thence to contact 272 of that mechanism, then over conductor 546 to the carriage return relay 200, and through the winding of that relay and over conductors 547, 548 and 549 to the negative side of the generator 22.

At the same time, a branch circuit is completed from the conductor 544 through the conductor 550 to the center left-hand contact of the contact stack 358; thence through the inner left-hand contact of this stack to lock-releasing magnet 423 and through the winding of that magnet to conductor 551 and thence through the conductors 552, 547, 548 and 549 to the negative side of the generator. It will be seen by tracing the above circuits that lock-releasing magnet 423 and carriage return relay 200 operate at approximately the same moment. The train of actions following operation of the carriage return relay 200 is identical to that described in connection with punch A.

Operation of the lock-releasing magnet 423 closes contacts 430 and completes the following circuit:

From the positive side of the generator through the conductors 540, 553 and 554 to outer left-hand contact of the stack 359, thence to the center left-hand contact of that stack and through the conductor 555 to the lower transfer switch magnets 409 and thence over the conductor 556 to the contacts 430, through those contacts and conductors 551, 552, 547, 548 and 549 to the negative side of the generator. Closure of this circuit energizes the lower transfer switch magnets 409 and causes movement of the switch bar or shaft 405 to the right as viewed in Fig. 30. Since the contacts of the stack 359 are of the delayed action snap type described hereinabove, the outer and center left-hand contacts of the stack continue to make with each other after the inner and center contacts of the stack 358 have broken. Thus, the breaking of the circuit to the magnets 409 is under control of the contacts of the stack 358 and there is assurance that the switch will always move to its new position due to the delayed action of the contacts in the stack 359.

Trip circuit

Since single cards are to be ejected, the trip mechanism has been modified and the special trip solenoid, together with its armature and the gear and cam mechanism associated therewith, eliminated. The commutator 270 on the main shaft 29 is, however, retained in order that the carriage return movement following the depression of the trip key may be combined with the retract action.

When the trip key is depressed, the following circuit is completed:

From the common positive conductor 541, which is connected to the generator, as has already been described, through the conductors 542 and 543 to contacts of the trip key, thence through that key and over conductors 557 to the trip magnet 36; thence through the winding of that magnet and over conductor 558 and 552, 547, 548 and 549, to the negative side of the generator.

A second circuit is completed at this time, which is a branch of the first and which leads from the conductor 557 through conductor 559 to the center right-hand contact of the stack 358. Since the transfer switch is at this time in its lower position, this circuit continues through the inner right-hand contact of the stack 358 to the winding of the lock-release magnet 423 and thence over conductors 551, 552, 547, 548 and 549 to the negative side of the generator. Thus, two circuits are completed simultaneously, causing simultaneous energization of trip magnet 36 and the lock-releasing magnet 423. Energization of the trip magnet 36 releases the main shaft 29 to rotate once. Near the end of that rotation the circuit between the contacts 272 and 273 is broken in order to prevent closure of an undesirable circuit which was described in connection with trip circuit operation of punch A.

Shortly after the opening of this circuit, contacts 272 and 274 are connected by the metallic portion of the commutator 270, and a circuit thereby completed to the retract relay 318 and to the carriage return relay 200. This circuit may be traced as follows:

From the common positive conductor 541 over conductors 560 and 561 to the winding of the retract relay 318; thence through the winding of that relay to conductor 562 to the contact 274 and through the raised metallic portion of the commutator 270 to the contact 272; thence over conductor 546 to the relay 200 and through the winding of that relay and conductors 547, 548 and 549 to the negative side of the generator. Completion of this circuit initiates the carriage return movement, as has been previously described and likewise operates the retract relay 318, which, in turn, completes the circuit through the winding of the retract solenoid 319 to cause the latching slides to release set stops in the punch in a manner already described.

Completion of the circuit through the contacts of the stack 358, as was described above, energizes the locking magnet 423, as described, and causes closure of the contacts 430, thus completing a circuit from the positive side of the generator through conductors 540, 553 and 563 to the outer right-hand contacts of the stack 359 of the transfer switch. Since the transfer switch now lies in its lower 90-column position, these upper contacts make with the center right-hand contacts of the stack and continue the circuit over conductor 564 through those windings and conductor 556 to the contacts 430 and through those contacts and conductors 551, 552, 547, 548 and 549 to the negative side of the generator, thus causing the transfer switch to be operated to throw all contacts in their upper 90-column position.

TYPEWRITER-BOOKKEEPING MACHINE

The typewriter bookkeeping machine which forms an important part of the present invention is fundamentally the well known Remington accounting machine. A number of patents disclose this machine and improvements thereto among these patents being Wahl 1,270,471, granted June 25, 1918 and Wahl 1,349,024, granted August 10, 1910. Improvements to this machine were made by Frederick Hart and patents therefor have been issued to the said Hart, these patents including 2,063,737, issued December 8, 1936, 2,083,994, issued June 15, 1937. Disclosed in the instant case are certain improvements of the bookkeeping machine which are disclosed and claimed in the said Hart Patent 2,083,994 assigned to our assignee. We make no claim to these improvements for they were solely due to Hart; our contribution to the bookkeeping machine art is the mechanisms whereby it is connected to and interlocked with punch mechanisms.

Only so much description of the bookkeeping machine as is necessary to show its cooperation with the punch mechanism is given herein.

Typewriter framework

The frame of the electric typewriter and of the accounting machine is substantially that of the familiar electric accounting machine. These frames carry a plurality of rods, pivots, projections, etc., which are not shown in detail in the accompanying drawings. Many parts are carried by or pivoted thereon. Ordinarily the description omits specific reference to such construction, except where clarity demands specific mention of a particular mounting. Care has been exercised in specifying all floating elements and elements connected by rigid shafts, bails, etc. Usually such members are given a single reference character so as to facilitate reading of the drawings. It is to be understood that all elements whose support is not specifically mentioned, are carried in an obvious fashion by the main framework, unless the context indicates the contrary.

Alphabet keys

The key-action is merely initiated by the operator and the key lever is then automatically connected to a power shaft which completes the initiated motion. Such an action is well described by the phrase "key-responsive." Each alphabet key 609, (Figs. 32 and 33) is pivoted in the usual manner near the rear of the machine and is held upwardly by a suitably located spring. Depending from each of the alphabet keys is a projection with a turned over end for rocking a spring-pressed bell crank 623 which supports a wipe-pawl at its upper end. A slight depression of an alphabet key rocks said bell crank against the tension of its spring and the wipe pawl pivoted thereon rocks the lower end of the snatch pawl 624 into position to be engaged by a tooth of the constantly rotating snatch roll 625. Hence initiation of a key depression causes a power response to complete the motion. The snatch pawl 624 is pivoted on a downwardly extending projection integral with the arm of a horizontal actuating lever lying parallel with the alphabet key lever so that the snatch roll 625 will carry the lever downwardly and rock the bell crank 626, (see also Figure 34), to actuate the type bar 627 to cause a printing impression on the paper surrounding the platen 628. At about the time the type bar reaches printing position the snatch roll 625 has carried the pawl 624 downwardly and slightly rearwardly into the path of an adjustable pawl disengaging stud, thus automatically disconnnecting said pawl from the snatch roll and permitting the spring of the actuating lever to return it to normal. Each pawl 624 has a limited amount of movement under the action of its spring so that when it returns to normal the extreme upper end of the pawl will be in position to again be actuated by the wipe-pawl of bell crank 623 when the alphabet key is again depressed.

If a key is held depressed the upper end of pawl 624 contacts with the extreme rear lower surface of the wipe-pawl on bell crank 623 and hence the pawl 624 can be re-engaged with the snatch roll 625 only after the key has returned to normal. All the type-bar actuating levers overlie a universal bar 629 (Fig. 35) which controls a ribbon vibrator 647 through a link 639 (Fig. 33), as is well known in the art.

Numeral keys

The operation of the numeral keys is slightly different from that of the alphabet keys. Referring to Figures 32, 33 and 36 it will be seen that when the operator touches a numeral key 608 the arm thereof enters the ball lock 607 to lock all other numeral keys against operation. Loosely pivoted on each numeral key is a spring-urged pawl 630 whose lower turned over edge lies slightly above a shoulder on a tripping bell crank 631. The bell crank 631 is rocked against the tension of its spring as soon as the key enters the ball lock and releases a spring-pressed pawl 632 (Figs. 33 and 36) pivoted upon a cam disc 633 to connect the latter to the constantly rotating shaft 634 through a toothed clutch element rigid with said shaft. Riding on the periphery of each cam 633 is a roller on an arm 635 which is pressed downwardly by a powerful spring which causes the roller to follow the contour of the rotating cam 633. Each cam 633 is provided with a slight depression in which the roller of arm 635 lies when said cam is disconnected from its clutch element. This construction avoids erratic clutching and restoring action of the cams 633. The rearward end of the arm 635 carries an adjustable spring-pressed wipe pawl 636 (Figs. 32, 33 and 36) and a link 637 connected to the arm by a pin-in-slot and spring pressed lever connection (including the spring of the wipe-pawl). When the strong spring has forced the arm 635 downwardly as far as the rotating cam 633 will permit, the wipe-pawl 636 snaps under the forward end of a rocker 638 which is connected by a pin and slot at its rearward end to a number key printing arm for actuating a bell crank 626 and a numeral type bar 627 for printing on the paper surrounding the platen 628. The link 637 is pivoted to an arm of an offset rocker for actuating a link 640 which in turn is pivoted to the corresponding actuating goose-neck of the accounting mechanism to be described later.

Each cam 633 carries a pin which in normal position holds a hook 641 supported by a spring-urged rocker in ineffective position, but as soon as the cam 633 passes beyond normal the spring attached to the lower end of the rocker which supports the hook 641 causes said hook to move rearwardly and to rock a universal bail carried by the shaft 604 to rock the arm 605 into the ball lock 607 and thus prevent depression of any key as long as a cam 633 is out of normal position. The shaft 604 has fixed thereto an arm to which is pivoted a link 603 for rocking a channel bar 601 and thus locking all keys other than the numeral key intended against operation as long as a cam 633 is in an abnormal position.

Soon after spring-urged pawl 630 rocks the bell crank 631 it is forced off the ledge of said bell crank 631 by the ascent of the extreme forward end of arm 635 and thus prevents more than one rotation of the cam 633 if the operator should hold the key 608 depressed. As soon as pawl 630 is forced off the ledge of bell crank 631 the latter snaps to its normal position in readiness to disengage pawl 632 from the element fast to rotating shaft 634. If the numeral key 608 is still held down all other keys remain locked and all elements set into motion in response to the key are at normal, except pawl 630 due to the positive rocking thereof by arm 635. The pawl 630 can ride on the shoulder of bell crank 631 only after the numeral key 608 has risen to normal position. The operation of a key responsive machine, therefore, simulates the operation of the familiar manual machine.

The bell cranks 643, (described hereinafter) as well as bell cranks 631 and the rocker supports for hooks 641 are carried by an intermediate frame 645. The said frame is slotted at its rearward end to form guides for the bell cranks 643 and it is additionally slotted longitudinally to receive a universal shaft on which all of said bell cranks 643 are pivoted. The said supporting shaft is held at the bottom of the slot by a series of clamps 646. The extreme lower end of each bell crank 643 is arranged with a finished face to determine the extent of its rocking motion by interference with the bottom of the slot which guides the bell cranks. The forward edge of the frame 645 is similarly slotted for carrying a universal shaft for supporting the bell cranks 631 and the rockers which support hooks 641. The lower ends of said members are connected by suitable springs to an anchor at the extreme lower forward corner of said frame 645. Suitable adjusting screws may be studded into the frame 645 to facilitate the adjustment of all parts cooperating with members 604, 630, and 642.

Fraction keys

The bookkeeping machine is provided with four fraction keys which cause the same action as do the alphabet keys.

Space key

The typewriter space bar (Fig. 37) bridges a pair of arms fast to the shaft 669 to which is also fast an upwardly and rearwardly extending arm connected by an adjustable pin to a spring urged rocker 681 for shifting a turned over lug on the dog-rocker bar 682 rearwardly to operate the escapement for the paper carriage. The forward end of the bar 682 is carried by an arm or a spring pressed rocking frame which supports arms of the escapement actuating arc 683, which in turn is shifted rearwardly by a heel on each character type bar 627 when the latter is actuated as has been described hereinabove.

Space-zero switch

Sometimes it is desirable to perforate a zero and sometimes it is desirable to cause the zero key to merely space the carriage. A similar arrangement was described above in connection with the auto-perforator space bar. A special switch 650 on the typewriter (Figs. 1, 27–31) is provided for this purpose.

Skip-palm tabulator

The palm tabulator is a lever 649 (Figs. 32 and 37) normally held upwardly by a spring and is conveniently located so as to be readily struck by the palm of the left hand, hence its name. The lower arm of lever 649 overlies the shank of the "white" tabulator key 777, which shank is connected, at its lower end, to a long push rod for rocking a spring pressed arm 778 at the rear of the machine (see Figs. 35 and 37). Between arm 778 and tabulator rocker 780 is a floating interponent. This construction is adapted to permit the typewriting machine to be tilted relative to its operating base as is described in the cited Hart Patent 2,063,737. Each of the tabulator rockers is arranged to interpose its extreme upper end into the path of one of certain prearranged tabulator stops. Each rocker 780 operates a universal frame to lift the feed rack-bar out of mesh with the feed pinion as is set forth in detail in the cited Hart application.

Carriage return

The carriage return mechanism is best shown in Figs. 38 through 41. Let it be assumed that the hand carriage return lever 651 is depressed thereby rocking the shaft to which it is attached and an arm with a pin underlying a rearward projection of the bell crank 652, the latter being loosely pivoted on said shaft. Pivoted to the upper end of bell crank 652 is a long slender hook engaging a pin extending outwardly from the latch 653. Said hook is urged downwardly by a suitably located spring which also extends to a projection on the latch 653, but said hook is normally held in engagement with said pin by a stud projecting from the cam link 656, and extending below the shank of said hook. As soon as latch 653 is withdrawn arm 654 snaps upward under tension of a suitably located spring and rocks its supporting shaft to:

Lock all typewriter keys against operation by causing arm 657 thereon to shift the link 600 forwardly.

Enable two clutches by means of arms 658 and 659 to connect the motor drive of the machine to the carriage return shaft.

The forward end of arm 658 has a pin extending into a groove of a clutch element (Figs. 34, 38, 39 and 40) for connecting the shaft 661 to a worm driven gear loosely mounted thereon. The upper end of said shaft 661 has a pinion fast thereto which meshes with a rack 662 on the frame of the carriage which carries the platen 628. If desired the pinion on shaft 661 may mesh with a larger gear, which in turn drives a common form of speed limiting device, as is fragmentarily shown in Fig. 39. The forward end of arm 659 extends into an opening of a frame supported bell crank (Figs. 34, 38, 40 and 41) to shift a clutch element into engagement with the worm 663 or its stub shaft to connect the power driven pulley and its stub shaft 664 to said worm 663 to drive the gear loose on shaft 661, and thence said shaft, its pinion and finally the rack 662 on the frame of the carriage. This train of mechanism remains connected as long as arm 654 is in its elevated position. Mounted on the frame of the carriage is a pair of adjustable margin stops 665, the one for automatically initiating the carriage return connections and the other for breaking them. When the carriage has reached home position the force resulting from absorption of its momentum is transmitted through a margin stop 665 to a projection on link 666; thence through a frame supported bell crank; thence to a link and a spring urged frame supported bell crank 667; thence to camming link 656, drawing the latter in a generally forward direction. A cam towards the rearward end of link 656 forces a roll on the arm 654 downwardly, and hence restores said arm 654, its shaft and all parts operated thereby to normal position. When link 656 moves, as described, the long slender hook on bell crank 652 is permitted to descend, thus preventing it from acting on latch 653. The forwardly extending arm of bell crank 652 is connected by a link to a frame supported bell crank, which in turn is joined to a bar 668. When the typewriter carriage has traveled in the writing direction a distance corresponding to the adjustment of the margin stop 665, the bar 668 is shifted to rock bell crank 652 in substantially the same manner as has been described above as the operation of lever 651.

Back space

The typewriter back space mechanism is best shown in Figs. 42 through 47. Manual depression of the back space key rocks key lever 672 to rock a shaft to which the arms 673 and 674 are fixed. Arm 673 is connected by the link to the piston of an air dash-pot, having an adjustable bleed valve, (Figs. 42–46) attached in a suitable manner to the rear frame of the typewriter for controlling the speed of return of the lever 672. A suitable full stroke device (not shown) may be associated with the lever 672. Pivoted to the end of arm 674 is a link 680 extending to the back space pawl 677. The pawl 677 (Fig. 46) is pivoted on a motion limiting plate, which in its turn is pivoted to a fixed bracket partially surrounding the escapement shaft and sleeve 678. When arm 674 is rocked the tine of pawl 677 enters between a pair of the external teeth of the countersunk back space ratchet to rotate the sleeve to which it is rigidy attached backwardly one tooth space and thus effects a back space movement of the typewriter carriage. Any suitable form of full stroke mechanism may be associated with the back space key to insure that a complete operation of the key occurs. Such mechanism is diagrammatically shown in Fig. 48. The ordinary construction of the back space mechanism (Fig. 45) comprises an integral element including said back space ratchet, its sleeve surrounding the escape wheel ratchet shaft and the thumb toothed gear meshing with the carriage rack, a second integral element comprising the escape wheel and its shaft, and a spring pressed pawl (not shown in Fig. 44) carried by the escape wheel which engages the internal teeth of the back space ratchet. The mechanism just described is the usual Remington back space mechanism which permits backward stepwise relative movement between the escape wheel and the said element 678.

Computing mechanism

The computing mechanism associated with the typewriter is essentially that disclosed in the patents, Wahl, 1,270,471, granted June 25, 1918, and Wahl, 1,349,024, granted August 10, 1920. Certain modifications have been introduced into this mechanism such as those disclosed in the patents of Hart cited hereinabove. The essential elements of this mechanism and their relative arrangements will now be described. Reference to Figs. 1, 49, and 50 shows that the typewriter is arranged to carrying a plurality of columnar totalizers at any desired location on a truck 713 and two cross-footing totalizers on a reciprocatory cross truck (see Figs. 50, 51 and 52). All of the columnar totalizers are operated by a single master wheel and each cross-footer is provided with an individual master wheel. The condition of the columnar totalizers (i. e. their master wheel) is manually controlled and the condition of the cross-footing totalizers is automatically controlled by cams 740 (Figs. 49 and 60) carried by each of the columnar totalizers and is set when each columnar totalizer arrives at the computing zone. The numeral keys are locked against operation when a columnar totalizer or cross-footing totalizer is in computing position. Special interlocking mechanisms are also provided which are controlled by the cross-footing totalizer through the medium of the clear keys. The briefly specified mechanism will now be described with the aid of Figs. 32, 49, 54–59 inclusive, in sufficient detail to enable any one skilled in the computing machine art to readily understand, construct, and use the mechanism as modified in the present instance.

The columnar truck 713 is loosely connected to the paper carriage in the usual manner and is accurately supported and guided at the computing zone by the usual adjustable roller guides and supports shown in section in Fig. 49. The truck 713 is contoured in the usual manner to accommodate said mechanism, and it is crenelated for accurately locating the columnar totalizers. The cross truck 768 (Figs. 50, 51 and 52) is provided with the usual notched blocks for locating the cross-footing totalizers, the guiding rollers for easy transverse movement, the long coil returning spring passing over a pulley, the adjustable limit stop which cooperates with the lever 728 (Fig. 58), the bracket for the pivot of the pick up beam, the aligning crenellations for engagement by the master dogs, etc. The pick up beam is shown in Fig. 65. It consists of the spring urged cam controlled hook 774 and the spring urged cam controlled latch 775 pivoted on an offset bracket 769 on the cross truck 768; said bracket 769 also serves as an anchorage for the short stout springs which urge these members upwardly to effective positions. When the pick up tail of a columnar totalizer passes over members 775 and 774 it is engaged by the triangular projection on the hook 774 and the end of latch 775 springs slightly upward and as soon as the cross truck is moved, latch 775 moves upward, due to the disengagement of its hook cam from a pin on graduated cam guide 776, to prevent rebound of the cross truck with respect to the main truck. When the cross truck 768 is ready to be released a pin on the hook 774 passes downwardly in a cam slot in the framework and is thus disengaged from the pick up tail of the columnar totalizer. The triangular projection on hook 774 permits free return of the main truck and its totalizers during a carriage return operation.

The movement of each numeral actuating arm 635 is transmitted through a link 637 extending upwardly to an idle rocker; thence upward through link 640 to a fan 700 (Fig. 49). Each fan 700 is connected by a slot-and-pin connection to a gooseneck 701 for driving the differential or sector shaft 702 having arms spirally arranged to transmit movements commensurate with the value of the numeral key mechanism; thence to the controlled swinging sector 703; thence to the master wheel 706 through its shaft 704, and a gear thereon, either directly for adding operation, indirectly through an idler on shaft 723 (Figs. 55, 57, and 58) for subtracting operations, or not at all, for non-compute operations, and thence to a totalizer carrying wheel 705. Reference to Figs. 57 and 58 shows three master wheels with the reference character 706. The master wheels of Fig. 58 drive the carrying wheels 705 of the cross-footing totalizers, and the master wheel 706 of Fig. 57 drives the carrying wheels 705 of the columnar totalizers. The sector shaft 702 is connected by crank, a link, and a similar crank (see Fig. 61) to a corresponding sector shaft for driving the master wheels of Fig. 58 by mechanism exactly like that shown in Figs. 49 and 55 as in the cited Wahl patent and in the Hart applications. Certain universal operations must be performed by a fan 700 before the master wheels can be driven. These are:

1. Set a full stroke mechanism and block all other numeral key mechanisms during the time of operation of that key mechanism of which operation was initiated by such setting
2. Unlock the sector shafts 702
3. Lock the totalizers in position to receive an entry
4. Disable the tens-carrying train at the next lower denominational order
5. Block the numeral key mechanism in a punctuation space
6. Unlock the master wheels for operation
7. Eliminate spiral in the totalizer
8. Shift the sectors 703 to engage the master wheel driving trains
9. Lock the totalizer control mechanism in adjusted position during a stroke of the numeral key mechanism
10. Block operation of the numeral key mechanism in the event that the totalizers are not properly positioned These functions will be described in the order given, and each is initiated by a lug on the operated fan 700 contacting with and rocking a bail 707 on the universal shaft 708. This shaft, like shaft 702, is connected to a corresponding shaft for the cross-footers. (See Fig. 61.)

1. This is a purely optional condition on the electrified machine inasmuch as the previously described ball lock mechanism shown in Fig. 32 replaces this function. If the full stroke and single key mechanism is retained it is precisely the same as that shown and described in the cited Wahl Patent 1,270,471, including the pincer centralizing mechanism for shaft 708. If this mechanism is not included then a special pincer centralizing mechanism (Fig. 61) must be supplied.

2. The sector shaft 702 is spring urged towards and is normally locked in the position shown in Fig. 49 by a spring pressed pawl (not shown) whose tail lies in the path of bail 707, and when shaft 708 is rocked by a fan said pawl is disabled. The "disconnect lever" 709 (Fig. 1) rocks said pawl to ineffective position and also rocks shaft 708 through bail 707 counter-clockwise, as viewed in Fig. 49 to disable the entire computing mechanism. It is to be understood that all elements controlled by this shaft have pin-in-slot connections, or an equivalent thereof, to permit the operation of the disconnect lever.

3. Said shaft 708 is provided with a forwardly and downwardly extending arm to which is connected the link 710. Said link, through a pin-in-slot connection, is connected to the rockable cam 711, whose cam slot embraces a pin mounted on an arm of the master dog 712, so that rocking of said dog in a counter-clockwise direction causes its rearwardly extending arm to enter a tooth space on a toothed rack near the forward lower corner of the columnar totalizer truck 713. Engagement of the master dog with said rack also relatively positions the master wheel and the totalizer. Usually the master wheel is loosely mounted and is embraced by a fork of the master dog so that the master wheel is shifted slightly by the master dog. (See the Poole Patent 1,314,094.) An identical mechanism is provided for each cross footer.

4. The tens-carrying or transfer mechanism is essentially a form of Geneva gear system. Each denominational Geneva carrying wheel is carried by a spring pressed arm 714, (owing to very severe space limitations, these arms are alternately arranged on parallel shafts, and the lowest order arm is a mere locking pawl) whose extreme lower end is at times in the path of the offset (with respect to the master wheel) vertical finger of master dog 712. Hence, counter-clockwise rocking of the said dog will rock the tail of that arm 714 into a notch in the framework adjacent the master wheel (see frame element partially obscuring the master wheels in Fig. 50). The arm 714 which is rocked corresponds to a transfer into the wheel 705 to be actuated by a numeral key mechanism, thus freeing it for operation. All the arms 714 are normally free to be rocked, but as soon as one of them is moved by the master dog 712, the extreme upper end of the lever 714 rocks a universal locking shutter 715 to lock all other arms 714 in normal position. Each totalizer frame is provided with an extension simulating the tail of an arm 714 to lock the master dog and thereby the computing mechanism against operation in the sub units position of the carriage (see columnar totalizer in Fig. 50). An identical mechanism is provided for each cross-footer.

5. The computing mechanism must be locked when a number punctuation space such as a comma or a decimal point is reached. The tail of each arm 714 adjacent the lower denominational side of the punctuation space is somewhat longer, as is indicated in Fig. 49, and the master dog 712 is provided with a broad, short, vertical finger, (see Figs. 57 and 58) adjacent the long finger. Therefore, when the totalizer reaches a punctuation space the short finger of the master dog will strike the long tail of the arm 714, but said arm cannot be moved for the notch in the framework which receives the shifted tail of an arm 714 can accommodate one of them only, thereby locking the numeral key mechanism against operation, and such operation can be resumed only after actuation of the space bar or other regular character key such as the comma, period, etc. An identical mechanism is provided for each of the cross-footers.

6. The master wheel 706 is normally locked against operation by a pawl 716 pivoted on shaft 717. Said pawl is provided with a cam slot (not shown) which embraces a pin on an arm fast to shaft 708, the construction and arrangement being such that clock-wise motion of shaft 708 rocks pawl 716 out of engagement with the master wheel. An identical arrangement is provided for each of the cross-footers.

7. Spiral effect in the totalizer carrying wheel 705 is eliminated by a stud guided cam pawl 718 (Figs. 57 and 58) pivoted on 717 (Fig. 49). A pin moving with cam 711 is embraced by a slot (not shown) in the plate of pawl 718, the construction and arrangement being such that the pawl 718 is given a slight movement to take up lost motion spiral as in Wahl Patent 1,148,733 granted August 31, 1915. An identical arrangement is provided for each cross-footer.

8. The sector 703 normally lies to one side of the twin gears on shaft 704, and is held in this position by a notch in frame supported slide 720 (Fig. 55), which in turn is shifted by the helical cam 721 passing through a notch in the lower side of said slide. The construction and arrangement is such that the sector 703 is engaged with a gear of the master wheel train as soon as shaft 708 is rocked by a fan 700 but before the fan actuates its corresponding gooseneck 701, and drops to about normal as soon as the fan ledge passes bail 707 near the extreme of the down stroke of link 640. An identical arrangement is provided for each cross-footer.

9. When the computing mechanism starts operating it is necessary to lock the master wheel gear train in the adjusted position. The pin of a crank fast to shaft 708 extends into a slot at the lower end of the lock plate 722 (Fig. 55) to rock the extreme upper edge of said plate into a notch (not shown) of the sliding shaft 723 of the idler of the master wheel train. An identical mechanism is provided for each cross-footer.

10. If the columnar and cross-footing totalizers are in abnormal positions the shaft 708 is locked against operation. Fixed to said shaft is an arm 724 in proximity of a floating lock lever 725 (Fig. 57) position is controlled by the positions of the cross-footer truck and the columnar totalizers. The positions of 725 are:

a. *Cross truck disengaged.*—725 is in lowermost position;

b. *Cross truck engaged.*—725 is in uppermost position;

c. *Columnar totalizer in a computing field.*—725 is in path of 724; and d. *Columnar totalizer out of computing field.*—725 is out of path 724.

Arm 724 is blocked by combined conditions *a—c* only. It is free at all other times. Floating lock lever 725 is swung sidewise by a link connected to the downwardly extending arm of bail 726 which bail carries a roll 727, which is pressed downwardly against a light spring by a cam inside the case of a columnar totalizer as is shown in Fig. 49, and when the totalizer passes out of the computing field the light spring (just below forwardly extending arm of bail 726 in Fig. 49) restores the parts to normal. Floating lever 725 is lowered when the spring urged cross truck abuts the upper end of lever 728 and draws link 729 against the tension of its spring (see also Figs. 57 and 58) to rock bell crank 730. When the cross truck is "picked up" the spring attached to link 729 elevates the floating lever 725.

The shaft 708 is normally free to rock against the action of a spring urged centralizing gripper (not shown) but is locked (after the projection of a fan passes the bail 707 and during the return of the fans) by a spring urged pawl 731, in case differential shaft 702 has not yet returned to normal position (Fig. 57). Said pawl is held disabled by an arm (not shown) fixed to the differential shaft 702 when the latter is in home or normal position.

Control of totalizers

The control of the columnar totalizers is manual and that of the cross-footers is automatic. The manual control lever 732 (Fig. 57) is connected by a twisted link to the horizontal arm of bell crank 733, the vertical arm of which is connected by a link to the upper end of the first (or columnar) of three floating control levers 734. The second and third floating control levers are identified with respective ones of the cross-footing totalizers. Two of the levers 734 are loosely pivoted near their centers to a rod 735, (Fig. 57) the third lever 734 is pivoted to a short rod 735 (see Fig. 58) which is connected through a rocker and a link 736 to the long rod 735. Several apparently dissimilar elements have been given the same reference character. This has been done purposely, because of the great similarity in function and operation. The lower end of each lever 734 is provided with an inverted V shaped cam which embraces the pin of a crank 737 fixed to a shaft carrying an arm 738, the upper end of which fits into a recess of the idler carrying shaft 723 (see also Fig. 55). The idler on shaft 723 is provided with a long grooved hub and the hub of the dual gears on shaft 704 is similarly grooved. The dual gears are provided with a long spline fitting into a deep notch of the master wheel hub so that the dual gears can move relatively to the master wheel. Fitting in these grooves is a lever 739 (Fig. 49) pivoted at a point midway between shafts 704 and 723 provided with a pointer to indicate the relative positions of gears and hubs; it being noted that said hubs always move in relatively opposite directions. The lever 732, and, therefore, the pointer of lever 740 may occupy any one of three positions — (or subtraction); 0 (or non-compute); or + (or add). A corresponding set of three positions may be assumed by 723, 738, 737, 734, and 733. Similar positions are possible for the elements connected to or controlled by the other levers 734, which, however, are automatically controlled by any prearranged combination of the sets of three-level cams 740 (Figs. 49 and 60) attached to the columnar totalizers. Each of these cams is arranged to rock a roll carrying lever 741, one of which (the outermost) is fixed to a shaft, and the other to a sleeve surrounding said shaft. The rearward end of the shaft has fixed thereto a spring urged arm 742 (Fig. 57) which is connected by a long link 743 (Figs. 57 and 58) to the upper end of the third or last floating lever 734, (Fig. 58) and the rearward end of the sleeve is fixed to similar spring urged arm 742, which in turn is connected by a short link to the upper end of the second or middle floating lever 734, (Fig. 57). The crank 737 of the middle lever is fixed to a shaft which carries an arm 744, (Fig. 57) which in turn is connected by a link 745 (Figs. 57 and 58) to a lever for shifting the middle idler shaft 723, (Fig. 58). The third or last floating lever 734 rocks a crank 737 (Fig. 57) to shift an idler shaft in exactly the same way as has been described for the first or columnar gear shift.

Each of the gear shift trains, as described, is an independent train of mechanism and is independently adjustable to any one of the three possible computing positions; nevertheless the mid points of all three of the floating levers 734 are pivoted on the connected slide rods 735. Advantage is taken of this fact for simultaneously reversing all of the gear shifts irrespective of their particular adjustments; such reversal is effected by manually shifting the rods 735 by rocking bell crank 746 (Fig. 57) against the tension of a strong spring by means of the correction key. The terms "reverse" means that any — setting is changed to a +; any + setting is changed to a —; and any 0 is retained. The construction and arrangement is such that either lower end of the inverted V slot in the levers 734 represents a —, the apex a + and the middle of the legs represents a 0. The example given is illustrative only, for the arrangement may be the exact reverse, as in the case of the last floating lever. The lever 732, or levers 741, shift the top of a lever 734 along one leg of the inverted V cam only, but the universal correction key shifts all the levers the same amount (an amount corresponding to the length of one leg of the V cam slot) and thus brings the opposite position of other leg of the inverted V cam into play on the control crank pins. The indicia marked on the first floating lever 734 shows how reversal actually occurs. The reversing mechanism is used for making corrections and for erasing negative totals. Thus, if the operator touches the wrong numeral key, correction may be effected by depressing the correction key after a back space operation, and again touching the wrong key (usually a block is inserted in front of the type to prevent a second printing of the wrong digit) and the incorrect digit inserted in the totalizers will accordingly be erased. The incorrect digit on the work sheet is erased in the usual way. Since the back space key movement is transmitted to the auto-perforators the incorrect setting of the punch gags will be erased as has been described under the heading of their back space mechanism. Totaling will be described later.

Totaling

In every case totals are taken from the totalizers (columnar and cross-footers) by subtracting the total when the totalizer is over its master wheel. Four cases arise:

1. Total on columnar totalizer is positive;
2. Total on columnar totalizer is negative;
3. Total on cross-footer is positive; and
4. Total on cross-footer is negative.

1. The great majority of amounts or items added into the columnar totalizers are positive and, therefore, the totals are ordinarily positive. The lever 732 (Fig. 57) is set for addition and remains there until columnar totals are extracted, then said lever is shifted to its lowest or negative position and the total is copied from the totalizer when it arrives in the computing field.

2. Negative amounts are entered into the columnar totalizers by shifting the lever 732 to — position, or by rocking the credit balance key 747 (Fig. 59) if it is desired to write them in red. If the total is negative (as indicated by nines in the highest denominational orders, or by the negative wheels of an algebraic totalizer, if such is used) the lever 732 is shifted to + or add position, and the total is written in the usual manner.

3. The cross-footers are automatically controlled by cams 740 on the vertical totalizers, and when they are picked up in the column where their totals are to be yielded the cam of the corresponding vertical totalizer automatically effects the necessary control to cause the cross footers to be cleared and the total is written as above described.

4. If the total is negative it is necessary to reverse the automatic setting when a total column is reached. This is done by depressing the credit balance key 747 (Fig. 59) and writing the total in the regular way as described for negative totals in the columnar totalizers. If the cross-footer is an algebraic totalizer the visible negative quantity is copied (in red).

All the above conditions, except the last, are satisfied by the mechanism already described. The setting required for the last condition will now be described. The credit balance key 747 (Figs. 51, 59 and 62) is spring pressed towards normal and is loosely mounted about the shaft 748 of the ribbon shift mechanism. Said key has a pin-in-slot connection through link 749 with the correction key so that a depression of key 747 will result in a rocking of the correction key. The key 747 is connected by a spring pressed ball and notch, or an impositive latch (Fig. 51) with the ribbon shifting mechanism so that the ribbon mechanism is shifted to "red" when said key is depressed. If the ribbon mechanism is already in "red" the described connection slips so that there is no shifting. Alongside the key 747 is a second or release key to release a spring pressed latch which is automatically operated to latch key 747 when the latter is depressed. Obviously depression key 747, since it operates the correction key mechanism, results in reversing the control setting of the totalizers and, therefore, results in a clearing of the totalizer when the complement of the negative total is written, and causes the amount written to be in red.

*Proof of clearance*

It is highly desirable to have more than ocular proof of clearance of, particularly, the cross-footing totalizers. The mechanism shown in Fig. 56 (see also Fig. 64 which is a modification later described) is the mechanism initiating the operation of the clear sign printing. Each number dial or drum is driven by the carrying wheels 705 (Fig. 49) through an idler and a mutilated gear 750 integral with said number dial. One of the teeth (usually that opposite 7) is considerably shortened so that when all the dials or drums exhibit zero at the sight opening of the totalizer all the shortened teeth are opposite the feeling tines of the rake 751 (pivoted on the side plates of the totalizer), so that the said rake can rock slightly under influence of a spring attached to the bell crank 752, therefore, the vertical arm of this bell crank, which extends upwardly through the case of the totalizer, is a clear indicator. Advantage is taken of the position of the bell crank 752 (Fig. 58) to unlock the one or the other of a pair of normally locked special character keys to permit the printing of a special sign on the record sheet in juxtaposition of the total. Each arm 752, when in clear position, is in the path of a nose of a bell crank 753 (Fig. 58) which in turn controls a spring urged locking link 754. The end of each locking link 754, remote from the bell crank 753, passes through a slot in the calculating machine framework (not shown) and lies in the path of the upper arm of a bell crank 755. Each of said bell cranks 755 is connected by a usual form of snap link to an offsetting rocker; thence by wires 687 (see Figs. 53 and 54), the one to the * key, the other to the Δ key. These keys are constructed like the numeral keys and are operated in the same way as has been described hereinabove (see Fig. 36).

When the total on one of the cross-footing totalizers is negative it is desirable to print a special character differing from the regular positive clear sign. Fixed to the ribbon shifting shaft 748 is a pair of arms 688 (Fig. 59) connected by light links to the respective selectors 685 pivoted on the key levers of the * and Δ keys. When the credit balance key 747 is at normal lugs on the selectors overlay the forward ends of the key lever bell cranks 626 which operate type bars corresponding to the positive clear signs; but when the credit balance key 747 is depressed the selectors 685 are correspondingly shifted by the arms 688 so that a projection on each selector overlies the forward end of the adjacent key lever bell crank 626 which operate type bars corresponding to negative clear signs. The clear signs may be arbitrary characters of various kinds such as is indicated in the following table:

|  | Positive | Negative |
|---|---|---|
| * key | | CR |
| Δ key | Δ or — | OD or ℞ |

It is thus seen that the clear sign indicia which will be printed depends upon the position of the credit balance key and the ribbon shifting mechanism. It is to be understood that the projections on each of the selectors are so proportioned that one and only one of them can be effective on an adjacent key lever bell crank 626.

*Automatic clear signals*

At times it may be desirable to print clear signals automatically as an incident to the printing of a total from a cross-footer or from both cross-footers. The mechanism for initiating the automatic operation of the clear sign printing is best shown in Fig. 62. Each selector of a pair of selectors 756 is pivoted to a crank arm of a shaft 757, and is connected by a light rod to an arm 684 fixed to the ribbon shifting shaft 748. The selectors and elements co-operating therewith are identified by the positive clear signs. The foot of each selector is normally above a key lever of the corresponding clear sign, that is, there is a selector 756 for the * key lever and another selector for the Δ key lever. When the ribbon shifting shaft 748 is rocked the arms 684 shift the selectors so that their feet are over the CR and ℞ key levers, thus conforming to the table of clear signs given above. If either or both the selectors 756 is or are automatically depressed sufficiently to effect a key responsive action as has been described under the headings Numeral keys and Alphabet keys, one or more clear signs will be automatically printed, and the sign or signs printed will be determined by the position of the ribbon shifting shaft and the selector or selectors automatically depressed. Each of the shafts 757 is connected by slotted arm and crank to a shaft 760 of a shiftable rocking frame 761, and each shaft 760 is carried by a rocker frame 763. The frames 761, when operated are at times shifted and at times rocked by the bell cranks 752 (see Figs. 63 and 64) which for the present purpose are bifurcated at their upper ends (Figs. 50, 62, 63 and 64). The bails of the frames 761 are considerably longer than the extent of travel of the cross-footers. The operation is best understood by assuming that the cross-footers are clear, then proceeding to accumulations and finally to clearing or totaling. When the cross-footers are clear the described elements have the positions illustrated in Fig. 63, that is the bail of frame 761 rides in the bifurcation of the bell crank 752. When a wheel of the totalizer is operated the rake 751 and the bell crank 752 rock to the dotted position shown in Fig. 64, thus drawing bail of rocking frame 761 forwardly against tension of a spring until the long arm of rocker 763 snaps under the spring pressed latch 764. The described movement is slightly more than sufficient to permit latch 764 to hold rocker 763 as is indicated by the apparent interference of the dotted lines with bail of 761 in Fig. 64. Exactly the same operation occurs for both cross-footers. As long as the cross-footers are not clear the bails of rocking frames 761 are held in the described forward positions, because of the length of said bails. When either cross-footer is cleared the bell crank 752 again occupies the position of Figs. 63 and 64, but the said bail is held forward by the latch 764. Mounted on each bail of rocking frame 761 is a cam 765 whose slanting face is in the path of the forward tine of the bifurcated bell crank 752. The cam 765 is adjusted so that it causes the said bail to be elevated as soon as the units digit of the total is printed. The parts are then in the position shown in Fig. 64, thus moving the train of elements frame 761, shaft 760, shaft 759, link 758, shaft 757, selector 756 against the action of its spring, and finally the key lever of proper indicia according to the adjustment of the credit balance key 747. The selected indicia type then strikes upon the work sheet in proximity of the correct total, and such striking occurs as has been described under the headings Numeral keys or Alphabet keys. It now remains to disengage the latches 764. Each of the latches 764 (see Fig. 62) is carried between collars on a spring urged shaft which carries an adjustable collar 766 which is struck by a projection 767 rigidly mounted on the cross truck 768, so that the said collar 766 is shifted when the cross truck is released, thus releasing the rocker 763 corresponding to the cleared cross-footer. The other bail of frame 761 is not released unless the corresponding cross-footer is clear, for it is otherwise held by bell crank 752 as above described. If desired an interlock such as shown in Fig. 58 (comprising elements 755 and 687) may be used with the clear sign mechanism just described.

So far as described the clear sign for each cross-footer prints as soon as the totalizer is cleared, and the sign is printed in juxtaposition of the correct total. At times it is desirable to use both cross-footers as an algebraic totalizer, or to arrange the cams on the columnar totalizers so that the same quantities are accumulated in both cross-footers but in differing order, or to use the cross-footers as checks for double entry accounts, or to set one of the cams 765 in advance of the other so that the bail 761 corresponding to the cross-footer which is cleared first is not elevated until the second cross-footer is cleared, etc., and to clear both simultaneously. In any of these cases both the bails of frames 761 arrive at the position shown in Fig. 64 simultaneously and, therefore, both selectors 756 are simultaneously depressed, thus securing simultaneous operation of two type bars. The construction and arrangement is such that the signs identified with one cross-footer strike the work sheet through the center guide 770 and the other at the side thereof as is best shown in Figs. 66, 67, and 68. The center guide 670 is partially cut away so as to permit printing. In any of the cited cases one or the other of the two pairs of signs * Δ or CR ⓡ will be printed instead of any one singly.

The preceding description has tacitly assumed that each type bar 627 corresponding to the special indicia is provided with a heel to operate the escapement segment 683 (see Figs. 36 and 49). As a matter of fact these type bars do not operate the segment 683. It is, however, to be understood that said type bars 627 may operate said segment if desired when the mechanism now to be described is absent. Under the heading "Space bar" it was pointed out that the dog rocker is oscillated by shifting link 682; in the present instance said bar is provided with a pin standing in the path of the extreme upper end of a frame 771 (Figs. 69, 70 and 71) which is rocked by the one or the other of two equalizers 772 when, and only when, a pair of the indicia key lever bell cranks 626 are rocked as a result of the automatic shifting of both of the selectors 756. The midpoint of each equalizer is connected by a chain comprising an eye-bolt and light spring to the lower arm of the frame 771. The said spring is of a strength such that nearly full compression thereof is required to rock the frame 771 and hence to operate the escapement mechanism. The construction just described for operating the escapement can be used to advantage to initiate the automatic return of the typewriter carriage. Manifestly the machine will refuse to initiate the carriage return if the cross-footers are not clear. It is well known that an artificial collation of the items printed upon a work sheet into columnar and cross-footing totalizers is the best check on the accuracy of the entry of items onto a work sheet, and that the correctness of the artificial collation is automatically verified by the clear sign indicia.

The operation of each of the clear sign printing mechanisms has been described as being automatically initiated, but they have been shown as connected to an ordinary form of typewriter key mechanism and (slightly modified) type action. Sometimes it is desirable to initiate a special sign printing mechanism manually for the purpose of using a special character to identify or earmark certain items, therefore, all the key levers associated with the special signs are provided with key caps. Further, two differing forms of clear sign mechanism have been described. In the case of the manually initiated clear sign mechanism it is desirable to have the * and Δ mechanism operate in a manner similar to the numeral key mechanism for the same reason that special operating mechanism is provided for the numeral keys, that is, to prevent breakage and an idle operation if the machine has positioned an automatic lock to guard against a misoperation. On the other hand in the case of the automatically initiated clear sign mechanism this is not necessary, therefore, the clear sign keys are arranged in any convenient manner. The particular arrangement shown is chosen because all the clear sign key levers are adjacent, for this construction simplifies the arrangement of the selectors, and hence most of the key levers are arranged as character keys.

Date key

It is desirable to print the date by depressing a single key. So far as this invention is concerned the date key may be viewed as an ordinary character key identified as a date key. For the purpose of printing the actual date the date type bar 627 carries a set of movable type which is changed daily. The construction and arrangement may be of any suitable form such as for example that shown, described, and claimed in either of the applications for patent Hart, Serial No. 583,285 filed December 26, 1931; Walsoe Serial No. 462,300 filed June 19, 1930.

Elements for Interconnecting Bookkeeping Machine and Punches

The bookkeeping machine is supplied with a sub-base 611 containing certain contacts which are connected in parallel, as will later be shown, with the keyboard contacts of both the punches. Sunflower or multiple contact switches are provided and located electrically between the sub-base contacts and the punch keyboard contacts in order that but one punch will be connected in parallel with the bookkeeping machine at any time. The actual connecting wires are run through cables supplied with plugs at the ends thereof so that the punches may be disconnected from the bookkeeping machine and used independently, as has been described.

Sub-base

Figs. 72 and 73 are top views of two forms of sub-base. These two forms differ so little that but one will be considered in detail, and that the one shown in Fig. 72. The sub-base has a metal framework of the same general outline as the bookkeeping machine base and is adapted to be mounted thereunder. Mounted on this base are a plurality of contact stacks designated as 613 and 614, the contacts of the stacks 613 being adapted to be closed by operation of alphabet keys and those of the stack 614 being adapted to be closed by numeral keys. In addition, the sub-base supports various special contacts such as the skip contacts 800, the palm trip contacts 801, the auto trip contacts 660, the space contacts 802, the credit balance contacts 803, and, in some instances, the special white tabulator key contacts 804 (see Fig. 73).

In order to operate the contacts mentioned, slight modifications of the bookkeeping machines are made.

Alphabet key contacts

Referring now to Fig. 32, which shows a section of the sub-base 611, it will be seen that this base supports the alphabet contacts 613, all of which extend upwardly, some forwardly and others rearwardly, to lie under arms 808, all of which are loosely mounted on the shaft 806 (Fig. 32). All of these arms are guided at their ends by a slotted bar 807, which extends across the sub-base at some distance from the bottom thereof (see Figs. 32 and 72).

The bookkeeping machine snatch pawls 624 are somewhat longer than in the usual machine, so that, when any pawl is drawn into engagement with the snatch roll 625, its lower end will strike a turned-over projection on the upper one of a pair of spring connecting levers 614. When the pawl has been drawn downwardly approximately one-fifth of its extent of travel, corresponding contacts 613 will be closed. Continued downward movement of pawl 624 will result in interference between the pair of contacts 613 and the bottom plate of the sub-base 611. In order that the pawls 624 may not be blocked by the lever 614, the yielding spring connection between levers of each pair is provided so that the pawl may continue to move even though the contacts may have been stopped by the bottom plate. This construction assures closure of the contacts during approximately three-quarters of the period, during which the alphabet key lever is moving under control of its snatch roll.

Numeral key contacts

The numeral key contacts 644, likewise supported by the bottom plate of the sub-base 611, extend upwardly and rearwardly so that their rearward ends lie beneath plungers 612, which are supported in a bar 805 spaced from and extending across the sub-base 611. Lying above each plunger 612 is a turned-over lug on the bell crank 643 so that whenever the bell crank is rotated the lug thereon depresses the plunger 612 and closes a contact cooperating therewith.

It is to be noted that the rockers 638 have been modified by adding thereto the rollers of pins 642, which cooperate with the bell cranks 643. The mode of mounting the bell cranks in an intermediate frame 645 of the bookkeeping machine has been previously discussed.

The operation of the contacts 644 by plungers 612 and bell cranks 643 is similar to the operation of the alphabet contacts 613, since after the contacts 644 have been closed, the pin 642 rides over the dwell of the cam surface of the said bell crank and holds the contacts closed during the greater part of the time that arm 635 is moving downward and returning.

Fraction key contacts

The bookkeeping machine is provided with four fraction keys designated as 1/4, 1/2, 3/4, /8. These keys are located in the alphabet key bank and are operated to close contacts 613 identical to the alphabet contacts and operated in the same manner.

Space contacts

Supported on a bracket extending from the bottom plate of the sub-base 611 is a pair of contacts 809, which lie in position to be operated by a downwardly extending arm fastened to the shaft 669 (Fig. 37). It will be seen that whenever the space key or bar is depressed in order to cause a forward step of movement of the bookkeeping machine carriage, the downward extension causes the space contacts 809 to be closed.

Palm tabulator contacts

Mounted in the forward left-hand corner of the sub-base 611 are the contacts 800, which are adapted to be closed by depression of the palm tabulator lever 649, which lever acts through a bell crank to raise a bar to permit the spring-pressed contacts to close. In some instances, it is desirable that another tabulator key, for example, the white tabulator key 777 (Fig. 37) also closes contacts and when this is true the link extending from the vertical arm of the key 777 is provided with a downwardly extending projection 810, which cooperates with the contacts 804, mounted on a bracket near the center of the left side of the sub-base 611.

Auto trip contacts

The auto trip contacts 660 are mounted on a bracket located near the rear left of the sub-base 611 (Figs. 72 and 48). The auto trip contacts lie in the path of the downwardly extending arm of the bell crank 689, which is operated as may be seen in Figs. 37 and 38 through the medium of a link connecting the horizontal arm of the bell crank 689 with an arm 670 on the shaft, which carries the clutch arms 658 and 659. As will be obvious from the description of the carriage return mechanism of the bookkeeping machine, whenever the hand carriage return lever 651 is depressed or whenever the stop 685 contacts with the bar 668 (as it does when the carriage reaches a predetermined point in its forward travel), the shaft will rotate in a counter-clockwise direction and carry the arms 670 and the bell crank 689 upward to close the auto trip contacts 660.

Palm trip contacts

The palm trip contacts 801 are supported by a bracket on the base 611 and extend upwardly into the path of bell crank 671, which is rigidly fixed to one end of the shaft on the other end of which the hand carriage return lever is mounted (see Fig. 38). Thus, whenever the hand carriage return lever is depressed, the contacts 801 are closed.

Credit balance contacts

Supported on the sub-base near the rear left, there is a bracket which carries the credit balance contacts 803 (Figs. 37 and 59), which are in the path of and adapted to be closed by bell crank 762. The horizontal arm of this bell crank is connected to an arm at one end of the bail 686 previously mentioned under the heading "Credit balance". The other end of the bail is connected to the credit balance key 747. Hence, operation of the key 747 causes closure of the credit balance contacts.

Backspace contacts

It is necessary that operation of the backspace mechanism of the bookkeeping machine causes a similar backspace operation of that punch which is then cooperating with the bookkeeping machine. For this reason a set of contacts 811 is mounted on a hinge supported by the tabulator column of the bookkeeping machine. These contacts are arranged to be normally open and to be closed by spring grippers 679, which spring grippers extend forwardly and lie in position to be operated by a grooved collar 676, which is free to move on the link 680 connecting the arm 674 and the pawl 677 described under the heading "Backspace mechanism" (see Fig. 43). The free collar 676 is limited in its movement by the two fixed collars 675. It will be seen that when the lower fixed collar 675 is forced upwardly the slidable collar 676 is forced upward between the grippers 679, thus permitting the latter to close the contacts 811, through the insulated buttons on the said grippers. The contacts 811 remain closed until the upper fixed collar 675 in its downward movement makes contact with the free collar 676 to force it between the grippers. It will thus be seen that the backspace contacts are not opened until the backspace key starts its return to normal, the duration of the closure being thus governed by the backspace dash pot 673A (see also Figs. 42 and 46).

Key lock

When the palm tabulator key of the bookkeeping machine is depressed, it causes both the bookkeeping machine and the punch then connected thereto to move a tabulator or skip stop. Whether the carriage of the bookkeeping machine, or the carriage of the punch will arrive at its stop first cannot be determined, but it is necessary to prevent operation of the bookkeeping machine while the punch carriage is still in motion. For this reason, a circuit extends from the skip mechanism of the punch to a key lock solenoid 812 located at the rear of the bookkeeping machine (Figs. 35 and 48).

Referring now to Fig. 48, it will be seen that, when the solenoid 812 is energized, its armature rocks a bell crank lever through a yieldable spring to shift the link 600 of the bookkeeping machine forwardly. This link has a hook near its forward end which connects with a projection of the alphabet key-locking channel bar 601, thus rocking the lower edge of the channel into the path of the upwardly projecting hooks 602 (one for each alphabet key), thus locking the keys against operation. The link also rocks a lever which is pivoted to the rearward end of a bar 603, the forward end of which is pivoted to a crank fast to the shaft 604. When the shaft 604 is rocked the crowding arm 605 enters the ball lock 606, thus crowding the balls 607 therein to prevent depression of a numeral key. This operation of the ball and channel locks was discussed when the operation of the numeral and alphabet keys was considered. It will be obvious from Fig. 48 that as soon as the solenoid 812 is de-energized, the torsion spring wound about the shaft 604 restores the parts to normal position.

Space zero switch

Mounted in the typewriter casing in proximity to the keyboard at the left thereof is a special switch 650, which is a common form of two-position switch and is provided in order that the operator may determine whether the punch is to punch a hole in the zero position of a card or not. The circuits controlled by this switch will be described hereinafter. The reason for so controlling the punch is that the tabulator which will ultimately be used to tabulate the cards produced on the punch may be arranged to print zeros even though no punching occurs in a column or may be arranged to print zeros only when zero perforations occur.

Sunflower switches

In order to break all electric connections between any punch and the bookkeeping machine, sunflower switches are provided. The mechanical details of these switches are shown in Figs. 75, 76, 77 and 78. Each switch comprises a pair of series-connected magnets 615 adjustably mounted in a rigid frame in such manner that they have a horseshoe shaped magnet circuit. The armature 616 is loosely pivoted on a rod carried by the magnet frame. Mounted on the armature there are two rows of short leaf-spring contacts 617 (Fig. 28) which extend radially and which serve to bridge cooperating ones of the fixed contacts 618. All the pairs of bridging contacts 617 are insulated with respect to each other and to the armature in a well known manner.

Control bars

In order to automatically connect and disconnect all punches from the bookkeeping machine at desired moments, control bars are provided. These bars (see Figs. 34, 79 and 80) are polygonal metal bars which are carried by brackets attached to the typewriter carriage. The bars are thus caused to move with the carriage irrespective of whether its motion be step-by-step or extended. Mounted on the back of the typewriter and in position to cooperate with the control bar 621 (see Fig. 34) is a contact stack 620, including additional extensions on certain of the contact springs, which lie against the surface of the control bar and are caused to move inwardly and outwardly as the bar progresses from right to left or left to right. The faces of the control bars are cut so that they have high, low and intermediate surfaces, which operate the contacts of the stack 620 and thus determine, as will be readily seen, when the circuits are discussed, whether one or another of the punches shall be connected to the bookkeeping machine through the medium of the sunflower switches. Fig. 79 shows the surface contours both front and rear of the particular control bar used for connecting the punches in a manner hereinafter discussed, when an illustrative example of the operation of the entire combination is set forth. Fig. 80 shows representative contours of the faces of control bars for solving other accounting problems, which are not discussed in detail.

Circuits interconnecting the bookkeeping machine and the punches

As was indicated hereinabove, the various contacts of the bookkeeping machine are connected in parallel to the contacts of the punch keyboard. These connections pass through contacts of the sunflower switches so that but one punch will be controlled by the bookkeeping machine at any time.

The sunflower switches are themselves under control of the contacts of the control bars as was stated above. Both the control bars and the sunflower switches are shown on Fig. 31 in schematic form, in addition to the showing of the various key contacts of the typewriter including the special contacts for functional operations. The key contacts are shown in Fig. 31 as if they were closed directly by the associated keys, but it is to be understood that this showing is schematic only and that the various keys are closed through the mechanical action of the bookkeeping machine as described above. The control bar was discussed briefly in connection with Fig. 34 under the heading "Control bars". Fig. 34 being a section through a portion of the bookkeeping machine shows two stacks of contacts 620 although there are actually four sets, the second two sets, however, lying behind the first in Fig. 34. There are two control levers for the contact stacks, designated as 619 and 622, one being operated in accordance with the contours of one face of the bar and the other in accordance with the contours of a second face.

Referring now to Fig. 31, the control member 619, through the left-hand contact stack 620 associated therewith, determines whether or not any punch shall be connected to the bookkeeping machine contacts for operation therefrom and the control member 622 which cooperates with either the left or right-hand contact stack 620 determines which of the two punches shall be connected for operation.

Control bar circuits

We will now trace the circuits through the control bar contacts showing the sequence of operation to cause connection of punch A to the bookkeeping machine. This circuit leads from the common positive wire 451 of punch A through the conductor 820 (referring to Figs. 27, 28, 29, 30 and 31, as a complete wiring diagram for the combined machine); thence over the conductor 821 (Fig. 31); thence over conductor 822 to the lower one of the contacts in the left-hand upper group of the control bar set 620; thence through the center one of the closed contacts to conductor 823; thence to the lower arm of the two-position switch 824; thence through conductor 825 to the upper contact of the left-hand group operated by the control member 622; through the lower one of this pair of contacts to conductor 826 and to the winding of the sunflower switch magnet 615; thence over conductor 508 (Fig. 27) which leads to conductor 460 and thence in the manner described in connection with punch A to the negative side of the generator. Completion of the circuit described above causes energization of the sunflower switch magnet 615 and thus by exertion of attraction on its armature 616 (Fig. 31) causes closure of all contacts 617 and 618. This operation causes the various character key contacts of the bookkeeping machine to be paralleled with corresponding contacts of the punch keyboard. Since the circuits completed by depression of keys on the punch keyboard have been described in detail, only a few representative circuits will be here considered.

Alphabet key circuits

Considering now that the A key of the bookkeeping machine has been depressed, a circuit will be completed from the junction of the conductors 452 and 454 (Fig. 27), described in connection with the punch, over a conductor 828 (Fig. 31) through the contacts closed by the A key of the bookkeeping machine, and thence over conductor 829 to the fifth pair of contacts (counting from the top of the sheet) of the sunflower switch, and thence through these contacts and over a conductor 830 to conductor 455 (Fig. 27). It will be seen that this completes the identical circuit which the key A of the punch keyboard completed, and which it will be recalled is completed only when the transfer switch of the punch is in its lower 90-column position.

Numeral key circuits

The parallel connections between the numeral keys of the punch and the numeral keys of the bookkeeping machine extend through the transfer switch of the punch and thus it may be said that the parallel circuits include both the keys and the transfer switch. In other words, taking the 1 key as an example, the 1 key of the bookkeeping machine and the contacts of the transfer switch cooperating therewith are paralleled by the 1 key of the punch and transfer switch contacts associated therewith.

Still using the 1 key as an example of all the odd numeral keys, the circuit which is completed by its depression when the transfer switch is in its lower 90-column position may be traced as follows:

From the common positive conductor 451 (Fig. 27) thence over conductors 820 and 831 (Fig. 31) to the 1 key contacts of the bookkeeping machine; thence over conductors 832 and 833 and through contacts of the sunflower switch to conductor 834 (Fig. 27); thence to conductor 472 which leads to the 1 key of the punch and to the transfer switch, thus putting common positive current on the conductor 472 in the same manner as would have been accomplished by closing the 1 key of the punch. Now, it will be seen this circuit continues from conductor 472 through conductor 473 to the inner left-hand contact of stack 348; thence over the center left-hand contact of that stack to conductor 474; thence over conductor 468 and through the winding of solenoid 305 and over conductor 483 to conductor 458 which as above described is the common negative conductor. Completion of this circuit energizes solenoid 305 which causes a punch stop to be set to punch a hole in the 1 position of the lower 90-column zone.

If, now, the 2 key of the bookkeeping machine is assumed to be closed, it will be seen that positive current is fed through its contacts to the transfer switch in a manner to cause the same operation as would be caused by depression of the 2 key of the punch.

Due to the fact that the even numeral key circuits seem involved from casual observation of the wiring diagram, the circuit of the 2 key will be traced completely, as an example of the even numeral key circuits.

From common positive conductor 451 (Fig. 28) through the winding of relay 297; thence through conductor 475 to the middle left-hand contact of stack 351; thence to the inner left-hand contact of that stack; thence over conductors 476 and 477 to contacts of the sunflower switch (Fig. 31); thence through those contacts to conductor 836; and thence to the 2 key contacts of the bookkeeping machine; thence through those contacts and over conductors 837 and 833 to another pair of contacts of the sunflower switch and through those contacts to conductor 834 and thence to conductor 472 and the circuit described in the description of the 1 key (of the bookkeeping machine), to the relay 295 and to the common negative conductor 458.

It will be seen that this will cause operation of solenoid 305 and the relay 297 simultaneously, relay 297 causing operation of the solenoid 309 over a circuit which was traced many times in connection with punch A.

It will be noted that the 2 key of the bookkeeping machine receives positive battery through the transfer switch and conductors 476 and 477 in exactly the same manner as the 2 key of the punch and that the lead from the other one of the pair of contacts of the bookkeeping machine goes through the transfer switch to the same relay as does the lead from the second side of the punch key.

If the punch transfer switch were in its upper 90-column position when the 2 key of the bookkeeping machine was depressed, the circuit would be somewhat altered and may be traced as follows:

From the common positive lead 451 (Fig. 28) through the winding of relay 298; thence over conductor 489 to the center right-hand contact of the stack 351; thence to the outer right-hand contact of that stack; thence over conductors 476 and 477 to the contact of the sunflower switch; thence over conductor 836 to the 2 key of the bookkeeping machine, through that key and the conductors 837 and 833; through contacts of the sunflower switch to conductor 834; thence through conductor 472 to the center right-hand contact of the stack 350; thence to the inner right-hand contact of that stack and over conductor 456 to the solenoid 311 and thence through conductor 457 to the common negative conductor 458; thus operating the solenoid 311 and the relay 298. As has been described in connection with the punch circuits, relay 298 causes energization of the solenoid 303 and the two solenoids 303 and 311, operating simultaneously, set stops which will cause the punching of holes in the second uppermost and the lowermost positions of the upper 90-column zone, which holes represent the numeral 2.

Fraction key circuits

The bookkeeping machine is supplied with certain fraction keys, as has been mentioned, and these keys are shown in Fig. 31 as connected in circuits leading to both punches. It will be obvious that they may lead to one punch alone. In the present system, the keys are designated /8, 1/4, 1/2 and 3/4, but their circuits are arranged so that the fractions are expressed as eighths when punched in the card, 1/4 as 2/8, etc., and the denominator is represented by the zero perforation in the card, the numerators being represented by the perforations corresponding thereto. For example, 1/4 will be represented in the card by a perforation representing zero and by two perforations which represent the digit 2. Although fraction keys are, as stated above, connected to both punches, in tracing a representative circuit, namely, the only completed by depression of the 1/4 key, only punch A will be considered.

When the 1/4 key is depressed a circuit is completed from the common positive conductor 451 (Fig. 28) through the winding of relay 297; thence over conductor 475 to the center left-hand contact of the stack 351; thence through the outer left-hand contact of that stack and over conductors 847 and 848 to contacts of the sunflower switch and thence to conductor 849, and to one of the three contacts closed by the 1/4 key. The circuit here branches and one branch leads over the right-hand contact of the 1/4 key to conductor 850; thence over conductor 851 and through another pair of contacts of the sunflower switch and thence over conductors 852, 853 and 854 (Fig. 27) to the center left-hand contacts of the stack 349; thence to the outer left-hand contacts of the stack 349 and over conductors 855 and 856 to the winding of the solenoid 304 and through that winding to the common negative conductor 458.

The second of the two circuits leads over the left-hand one of the contacts of the 1/4 key (Fig. 31) to a conductor 857; thence over conductor 833 to the contacts of the sunflower switch; thence through conductors 834 (Fig. 7) and 472 and 473 (Figs. 27 and 28) to the inner left-hand contact of the stack 348; thence to the center left-hand contact of that stack and through conductors 474 and 466 to solenoid 305 and thence over conductor 483 to the common negative conductor 458.

The circuits described above cause simultaneous energization of the solenoids 304 and 305 and of relay 297. Relay 297 when energized completes a circuit to solenoid 309 and we now have solenoids 305, 304 and 309 energized. These solenoids operate to set up punch stops in the uppermost position of the lower 90-column zone, in the next uppermost position of the lower 90-column zone and in the lowermost position; the last-mentioned two set-ups result in the punching of a combination which represents the digit 2, while the first one results in a representation of the digit "zero". Therefore, the card will be punched to indicate 1/4 in the code set forth above.

Triangle and date key circuits

No further discussions of the alphabet key or numeric key contact circuits of the bookkeeping machine will be given, since the remaining ones are similar to those already described. The circuits are arranged so that the A punch (that is, the punch represented in Figs. 27 and 28) is adapted to perform its carriage return function upon depression of the triangle key of the bookkeeping machine, while the second punch, namely, the punch B (Figs. 29 and 30) is arranged to perform its carriage return function upon depression of the date key of the bookkeeping machine.

Referring to Fig. 31, it will be noted that the triangle key of the bookkeeping machine is connected through the credit balance key. This arrangement is used in order that, when a credit balance is taken, the carriage of the punch A will not be returned to normal, but instead, a number 5 will be punched in the card to indicate, upon later tabulation, that a credit balance was taken at that point.

We will now trace the circuit completed by the triangle key of the bookkeeping machine, when the credit balance key is in its normal position (Fig. 31). It will be recalled that whenever the triangle key is depressed, the A punch is operating in its lower 90-column zone. The circuit completed by depression of the triangle key is as follows:

From the common positive lead 451 (Fig. 27) over conductors 820 and 839 to the triangle key; thence over conductor 840 to the normally closed contacts of the credit balance key; thence through those contacts and over conductor 841 to a pair of contacts of the sunflower switch; thence over conductor 842 (Fig. 27) to the conductor 504, which, as has been described in detail in connection with the punch circuits, leads through the transfer switch to complete two branch circuits and also leads through the contacts of the special trip mechanism to complete a third branch circuit, causing operation of the carriage return relay and of the transfer switch magnets in a manner previously described to cause the punch carriage to return to its intermediate stop position and the transfer switch to be shifted from lower to upper 90-column operating position.

When the date key of the bookkeeping machine is depressed, a circuit is completed, which is similar to that just described, but which leads to punch B rather than to punch A, and which causes that punch to have its carriage return to its intermediate stop position and its transfer switch to be shifted from upper to lower 90-column position. Since these circuits were described in connection with the carriage return of punch B, and, since they are so similar to those just described for punch A, no detail will be here given.

When the triangle key is depressed, following the depression of the credit balance key, a circuit will be completed which leads from common positive conductor 451 (Fig. 27) over conductors 820 and 839; through the contacts of the triangle key; thence over conductor 840; thence through the lower contact of the credit balance key (as shown in Fig. 31); thence over conductor 843 to conductor 844 and through contacts of the sunflower switch to conductor 845 (Fig. 27) and thence, if the transfer switch is in its lower 90-column position, to the inner left-hand contact of the stack, and thence over conductor 846 to the winding of solenoid 307, thence over conductor 483 to the common negative conductor 458.

Energization of the solenoid 307 sets a punch stop which will cause the punching of a hole in the position fourth from the top of the lower 90-column zone, which position represents the digit 5.

*Palm tabulator key circuits*

The palm tabulator lever or key of the bookkeeping machine causes the bookkeeping machine carriage to move in a writing direction a plurality of spaces, and at the same time may release one or the other of the punch carriages for motion in the forward direction over a plurality of columns. Due to the fact that the bookkeeping machine may complete its carriage motion before the connected punch, it is necessary that the locking mechanism for the keys of the bookkeeping machine be operated until the punch carriage has completed its movement. For this reason, a complete circuit which is closed by the operation of the palm tabulator key will be described, although portions of it were considered hereinabove in connection with the skip mechanism and skip circuits of the punch. Since the two punches are identically operated, but one will be described.

When the palm tabulator contacts are closed, while the sunflower switch to the A punch is operated and the A punch transfer switch is in its lower 90-column position, the following circuit will be completed:

From the common positive conductor 451 (Fig. 28) through conductors 489 and 490 to the winding of the lower skip solenoid 314, thence through conductor 491 to the inner left-hand contact of the stack 356; thence through the center left-hand contact of that stack to conductor 492, and then over conductor 493 (Fig. 27) and through a pair of contacts of the sunflower switch (Fig. 31) to conductor 858 and to the right-hand middle contact of the set of contacts operated by the palm tabulator key; thence to the outer right-hand contact of that set and over a conductor 859 to another pair of contacts of the sunflower switch; thence over conductors 494 and 495 (Fig. 27) to the center left-hand contact of the stack 355; thence to the inner left-hand contact of that stack and over a conductor 496 to the lower skip relay 360 and through one winding of this relay and over conductors 497 and 457 to the common negative conductor 458.

This will cause energization of the lower skip solenoid 314 and of the lower skip relay 360, and, as was explained in connection with the skip circuits of the punch a locking circuit will be completed which will continue the lower skip solenoid 314 energized until the skip bar 175 opens the contacts 193. This locking circuit is closed by energization of the relay 360. A second armature of this relay at the same time closes a circuit which leads from common positive conductor 451 (Fig. 28) over conductors 489, 490 and 860, to the lower armature of the relay 360; thence to the contact cooperating with that armature and over the conductor 861 to the winding of the key lock solenoid 812 (Fig. 31); thence through the winding of that solenoid to the conductor 861 (Fig. 27) to the negative conductor 458 (Fig. 28). As has been explained the key lock magnet 812 prevents any operation of the keys of the bookkeeping machine, and, therefore, until such time as the skip bar 175 of punch A opens the contacts 193 to unlock the relay 360 the bookkeeping machine cannot be effectively operated. The palm tabulator circuits of punch B are identical to those disclosed above.

*Space key circuits*

The space key contacts of the bookkeeping machine are in parallel connection with the space keys of both punches. The circuit completed when punch A is connected to the bookkeeping machine will now be traced.

This circuit leads from the common positive conductor 451 (Fig. 27) thence over conductors 820, 821 and 868 to the contacts 802 of the space key; thence through those contacts to conductor 869 to a pair of contacts of the sunflower switch, through those contacts to conductor 870 and thence over conductor 488 to the winding of the space solenoid 313 and through that winding and over conductor 457 to the common negative conductor 458. Thus, the spacing of the bookkeeping machine carriage causes the punch then connected to the machine to move forward a columnar space.

The circuits closed by operation of the backspace contacts 811 of the bookkeeping machine are such as to parallel the circuits associated with the backspace key of the punches.

Tracing the circuit closed by the backspace contacts 811 when the punch A is connected to the bookkeeping machine, we find that the circuit runs from the common positive conductor 451 (Fig. 27) over conductors 820 and 862 to the backspace contacts 811; thence through those contacts and over conductor 863, and through a pair of contacts of the sunflower switch to conductor 864, and thence to conductor 527, which leads to two branch circuits, one of which is through the winding of the upper erase solenoid 317 and conductor 457 to the common negative conductor 458 and the other of which leads to the inner left-hand contacts of stack 354, and thence to the center left-hand contacts of that stack and over conductor 520 to the lower erase solenoid 316. Thus, both of the erase solenoids energize simultaneously, closing the backspace contacts 521 and 522 and supplying current in a manner already described to the backspace relay 230, which releases a contact-maker 235 resulting in energization of the backspace solenoidal clutch 229 and thus causing backward movement of the carriage for one step, and also releasing all stops which have been set in the column into which the punch carriage has moved. The circuit completed when the backspace key is energized, while the punch is in its upper 90-column position, is similar to the one just traced, but does not include the lower erase magnet 316.

*Auto trip circuits*

The auto trip contacts of the bookkeeping machine are utilized to complete circuits for causing both punches to eject cards (punch A in duplicate, punch B singly) to cause the carriages of both punches to return to their margin stops; and to cause operation of the transfer switch of both punches, the transfer switch of punch A restoring to its lower 90-column position and that of punch B to its upper 90-column position. The auto trip contacts are closed, as was described when Fig. 38 was discussed, by a stop 665, preset on the carriage, striking a projection on the bar 668 and initiating a train of mechanical operations resulting in the closure of the contacts. This same train of mechanical operations operates clutches to cause connection of the bookkeeping machine carriage to a power source for returning it to its marginal position. The bookkeeping machine carriage is wide and heavy and likely to require a considerable interval to return to its home position. The auto trip contacts are held closed by the mechanism of Fig. 38 until the carriage of the bookkeeping machine does reach its home position.

Now, it will be obvious that if the circuits to the trip mechanism of the punches were closed during the entire time that the auto trip contact 660 was closed, the main shafts of the punches might rotate a large number of times and, consequently, the punches might punch a very large number of cards instead of the one or two intended.

For this reason the circuit from the auto trip contacts is led through another pair of contacts operated by the control bar. One face of the control bar, which face normally has but two levels is provided with a deep, short cut at a predetermined location, which location corresponds, at least approximately, to the setting of the margin stop on the bookkeeping machine. Thus, when the auto trip contacts are closed, and the control bar is in operation so that the other contacts mentioned are likewise closed, the circuit is completed to operate the tripping magnets of the punches, but this circuit is maintained closed only so long as the short cut takes to pass the contact making members associated therewith.

Since the auto trip circuits are completed to both punches simultaneously, irrespective of whether the sunflower switch contacts are open or closed, both these circuits will be described:

From the common conductor 451 (Fig. 27) over the conductors 820, 821 and 865 to the lowermost one of the right-hand contacts operated by the member 619; thence (since the control bar at this time will be in position so that the deepest cut of the control bar is presented to the horizontal arm of the member 619) through the middle and upper ones of the contacts mentioned, to the second and third auto trip contacts 660. Here the circuit branches, one branch leading to the A punch and the other to the B punch. We will trace the branch leading to the A punch first. Through the right-hand auto trip contact to conductor 866; thence to conductor 528 (Fig. 27) and through it to a point at which this conductor joins conductors 531 and 532. The conductor 528 continues to the winding of the special trip magnet 285; thence the circuit goes over conductors 530, 459, 460, 509 and 499, to the negative side of the generator.

The other two branch circuits just mentioned will not be described in detail for they were covered adequately when the punch circuits were considered.

It will be sufficient to say that the completion of these three circuits causes the main shaft of punch A to be released for two revolutions to punch two cards, and that thereafter the carriage of punch A is returned to its margin position, the transfer switch having in the meantime operated so that the punch is now in condition for working in the lower 90-column zone.

The circuit from the second auto trip contact leads through the first contact and thence over the conductor 867 through conductor 557 and to the winding of the trip magnet 36 of punch B; through that magnet to conductor 558, and thence over an obvious circuit to the negative side of the generator. Leading from the conductor 557 are branch circuits to cause operation of the transfer switch in a manner which has been described hereinbefore. Consequently, by completion of these circuits, punch B will trip and eject a single card. The carriage will then restore to its margin position, and the transfer switch in the meantime will operate to condition the punch for setting up in the upper 90-column zone.

The above has shown how the bookkeeping machine controls the various operations of the two punches.

Reference to Fig. 81 will show the circuit connections which may be used if it is desirable to have a single bookkeeping machine control more than two punches. In this case, additional control bars are mounted to travel with the bookkeeping machine carriage and they control circuits to additional punches (designated as C and D, Fig. 8) in the same manner as the control bar 621 (Fig. 31) controls the circuits to punches A and B.

*Illustrative example*

The invention disclosed herein has a very wide application in accounting systems requiring ledgers which can be constructed with the aid of perforated records. It is applicable to many different types of accounting problems such as those met with in factory accounting, brokerage accounting, department store accounting, trust accounting, etc. For the purpose of illustration, trust accounting will be considered:

In general, in trust accounting systems, it is customary to punch a card which identifies a client and the character, amount and time of each particular security transaction, and to also punch another card giving information for the cash ledger such as the amount spent for securities, the date, etc. The construction of a self-verified journal sheet containing the above information requires approximately 27 entries. Some of these entries are also to appear in one of the punch cards, others in another, and some in neither.

Fig. 82 shows headings for a journal sheet of the type described. This drawing also indicates which entries are to be transmitted to the one card and which to the other and shows a schematic view of the control bar for causing connection to the punches to effect such transmission. Also shown in Fig. 82 are the formulae (totalizer control formulae) whereby the cams on the vertical totalizers are set in order to properly control the cross-footing totalizers for the routine to be described and likewise certain checking formulae (checking formulae) by which the operator can check the accuracy of the work by hand if this should be required.

Figs. 83, 84 and 85 show a sample sheet of the principal journal with the headings thereon and in addition a plurality of cards which might be produced by the machine herein disclosed. However, only the principal security card and the principal cash card are produced by this machine with the particular control bar shown and by use of the particular totalizer control formulae disclosed in Fig. 82.

The inserted sheet forms a copy of a journal sheet constructed in accordance with the totalizer control formulae given in Fig. 82. For purposes of illustration, sample journal sheet contains four different types of journal. Only the one dealing with securities, that is, the first one on the sheet is constructed according to the formulae of Fig. 82 and with the control bar shown in Figs. 31 and 34. The others, that is, the amortization, cash, and deposit and withdrawal journals would utilize different control bars or, at least, different sides of the control bar.

If we assume now that stacks of blank cards are placed in the magazines of both punches and a blank journal sheet is inserted in the bookkeeping machine and that both the punch carriages and the typewriter carriage are in their home positions, the operator will first insert in the first column of the sheet the "old invested balance" and as, she inserts this amount, the control bar will be in such position that there will be no circuits completed to either punch. However, there will be a vertical totalizer identified as 1 (Fig. 82) in the computing zone. This totalizer will receive and register the "old invested balance".

The operator will next insert in the second column on the sheet the "old cash balance" which again as indicated in Fig. 82 will not be transmitted to a punch, but will be registered on the second vertical totalizer on the truck of the bookkeeping machine. A cam on the first vertical totalizer will be prepositioned to cause the first cross-footing totalizer to receive the same amount as does the first vertical totalizer and a cam on the second vertical totalizer will be positioned to cause the second cross-footing totalizer to receive the amount registered on the second vertical totalizer.

Now the operator will space the machine until writing can occur in the third column, which is headed "Account No. proof". When the machine is so spaced the control bar will have moved to the left to cause contacts to close, connecting punch B (which is utilized for cash ledger items) for operation from the bookkeeping machine. Since punch B is adapted to operate in the upper 90-column zone first, the account number now written in by the operator will be set up in the upper 90-column zone. Also the account number will be registered in the third vertical totalizer, which is now positioned in the computing zone.

The operator now spaces the bookkeeping machine carriage into the fourth column, which is headed "Date". The date key is then struck, and, since it is a logotype, prints the date with one stroke. There is no totalizer positioned in the computing zone at this time, and, consequently, no registration of this date. The date key has been described as connected to the carriage return mechanism of punch B and, consequently, when it is struck, the carriage of punch B returns to its intermediate stop and the transfer switch thereof operates so that any items subsequently transmitted to punch B will be set up in the lower 90-column zone.

The operator now spaces the bookkeeping machine carriage into the column marked "Bought or Sold" (Bt. or Sd), this spacing moving the control bar so that neither of the two punches is now connected to receive items from the bookkeeping machine. (It is to be noted that the lower side of the control bar, as represented in Fig. 82 determines whether any punches are to be connected while the upper side of the control bar determines which of the two punches is to be rendered operative.)

Having typed the designation "Bought or Sold" in the fifth column, the operator spaces the carriage into the column headed "No. of shares" and types in that column a number, which number is registered on the fourth vertical totalizer which is so located on the truck as to be in the computing zone at that time.

Next, the carriage is spaced into the column marked "Name" and upon passing into that column the control bar causes punch A to be connected for operation. The punch A is adapted to operate in alphabetic code and, as the name of the security is typed on the sheet, the punch stops are set in the left-hand portion of the set basket of punch A.

Next, the operator causes the bookkeeping machine carriage to move into the column headed "Rate" (RA), and types the rate of interest of the security. This is transmitted to punch A and sets up stops in the lower 90-column zone of the punch, since the rate is a numeral and numeric characters are always in the upper or lower 90-column zone and, since the punch is at this time operating in the lower 90-column zone.

Following this the carriage is again spaced into the column marked "Maturity" (M), and the date of maturity typed therein and transmitted to the lower zone of punch A.

At this time, the bookkeeping machine carriage will lie in position or will be spaced to position such that any item entered will appear in the "Gain or loss" column. As the carriage moves into this column, the control bar moves to such position that both punches are disconnected from the bookkeeping machine. However, the amount of gain or loss, which is typed in the "Gain or Loss" column is inserted in a vertical totalizer (5) mounted on the truck in such manner as to be in the computing zone at this time. Also the first cross-footing totalizer will be operated by a cam on the fifth vertical totalizer to add the amount to the "Old investment balance" already in that cross-footing totalizer. Since the amount entered in the "Gain or loss" column must be added or substracted to the amount already in the first cross-footing totalizer, the operator must, prior to typing the amount in this column, depress the credit balance key to reverse the master wheels of the cross-footing totalizer, if this amount be a loss. Also, if this amount be a loss and the credit balance key be operated, the operator must release that key immediately after inserting the loss so that the cross-footing totalizer master wheel will be restored to its adding position.

Next, the operator steps the machine into the column marked "Cash disbursed or Income received" (Cash Dis. or In. Recd). Again, no punch is connected for operation, but the sixth vertical totalizer is in position to receive the amount typed in this column.

Likewise, one cam on the sixth vertical totalizer is set to cause the first cross-footing totalizer designed "CF₁" to be conditioned for addition, so that the amount typed in this column is added to the amount registered in the totalizer. Also, another cam on the sixth vertical totalizer is set to condition the second cross-footing totalizer for subtraction, thus subtracting the amount written in the "Cash disbursed" column from the amount already registered in the totalizer.

Now the carriage is moved again so that typing may be done in the column headed "Cash received or Investment disbursed" (Cash Rec'd or In. Dis.). Again, no punch is connected for operation but, again, there is a vertical totalizer in the computing zone and this totalizer (7) receives the amount entered in the column and through its cams causes the same amount to be subtracted from the amount standing on the first cross-footing totalizer, and to be added to the amount standing on the second cross-footing totalizer.

Now the bookkeeping machine carriage is positioned for writing in the column headed "Balance of investment" (Balance Inv.). This balance is taken from the first cross-footing totalizer and, if the various items making up that balance have been typed in correctly, and if the total has been copied from the cross-footing totalizer correctly, the reading of the cross-footing totalizer will be reduced to zero and, as explained, it will then be possible to print a clear sign to indicate the correctness of the balance.

Due to the fact that the control bar operated the contacts at the moment when the bookkeeping machine carriage moved into position for the balance of the investment to be entered, punch B is, during the typing of this balance, connected to the bookkeeping machine and the balance is set up in the lower zone of punch B. Also the eighth vertical totalizer received this amount.

Next, the bookkeeping machine carriage is placed in position for typing in the column headed "Balance of cash" (Balance cash) and the total appearing on the second cross-footing totalizer is copied in this column, this balance being set up in the lower zone of punch B.

The copying of the balance causes insertion of the amount into vertical totalizer No. 9, which is in the computing zone at this time and, due to the setting of the cams on that vertical totalizer, likewise causes the insertion of the balance into the cross-footing totalizer in a reverse direction, which then reduces the reading of the second cross-footing totalizer to zero.

At this time, the operator again spaces the carriage and the machine is positioned for typing in the column headed "Old balance, Shares, or Par value". At the time the carriage moves into position for typing this column, the control bar presents a low level to the contact making member and disconnects both punches from the bookkeeping machine. The insertion of the "Old balance, Shares or Par value" causes registering on a vertical totalizer 10 which has cams thereon so set as to cause the amount to be registered in the first cross-footing totalizer (which has been cleared as explained).

The operator now spaces the machine into writing position in the column headed "Old balance book value" and prints the amount of the old balance in this column. The eleventh vertical totalizer receives this amount and likewise, due to the positioning of cams thereon, causes the same amount to be registered in the second cross-footing totalizer which was cleared when the "Balance of cash" was inserted.

Next, the machine is again spaced so that the next ittem inserted will be in the date column. Since no punches are connected at this time, depression of the date key simply causes a written insertion of the date. Also, since no vertical totalizer is positioned in the computing zone at this time, there is no registration of the date in any computing mechanism.

After inserting the date, the machine lies in position for insertion of the "No. shares or Par value received" (No. shares or Par Val. Rec'd). This item is typed in and is registered in the twelfth vertical totalizer and due to the positioning of cams on that totalizer is likewise registered positively in the first cross-footing totalizer.

The machine is next spaced so that the writing position is in the column headed "No. shares or Par value delivered" (No. shares or Par Val. Del.). This item is typed in and caused to register in the thirteenth vertical totalizer, and due to the position of the cams on that totalizer will be registered negatively in the first cross-footing totalizer.

Next, the machine is spaced into the column headed "No. shares or Par value balance" (No. shares or Par Val. Bal.). As the machine spaces into this column, the control bar presents a higher level to the contact making member and punch A is connected for operation by the bookkeeping machine. The amount standing on the cross-footing totalizer 1 is now typed in and registers on the vertical totalizer 14, and at the same time the cam on the vertical totalizer 14 causes the reversal of the cross-footing totalizer so that the amount copied therefrom is inserted therein in the opposite direction, and, if correctly copied, causes the reduction of the reading thereon to zero, thus giving proof of correct copy work, and likewise verifying the setting of the punch stops. If desired, one of the clearance keys may be struck at this time to indicate that the balance was correct. However, due to the fact that the triangle proof of clearance key is used to initiate carriage return and transfer switch operation of punch A, this key should not be used. In other words, the star proof of clearance key is used at all times except in the particular column hereinafter to be described, in which it is desired to cause the carriage return and transfer switch operation of punch A.

The bookkeeping machine carriage is again spaced so that the insertion of an item will occur in the column marked "Book value received" (Book value Rec'd). When the carriage was spaced to this position, the control bar caused disconnection of both punches. Consequently, the "Book value received" will not be transmitted to either punch. It will, however, be registered in the fifteenth vertical totalizer, which is now in the computing zone, and will, due to the setting of the cams on that totalizer, be added to the amount standing on the second cross-footing totalizer.

In an exactly similar manner, the "Book value disbursed" (Book value Dis.) will be inserted in the proper column and will be registered on the sixteenth vertical totalizer and subtracted from the amount standing on the second cross-footing totalizer.

The machine is now spaced and the writing position is in the column headed "Book value balance" (Book value Bal.). As the carriage moves to this position the control bar causes connection of punch A to the bookkeeping machine. "Book value balance" is now copied from the second cross-footing totalizer and is registered on the seventeenth vertical totalizer and likewise, due to the cam setting on that totalizer, is subtracted from the second cross-footing totalizer to reduce the reading thereof to zero, if all items have been correctly copied and registered in that totalizer. At this time the triangle proof of clearance key is depressed and will be effective only if the reading of the second cross-footing totalizer is reduced to zero. If effective, it closes the contacts associated therewith, which complete circuits to cause the carriage of punch A to return to its intermediate stop and to cause the transfer switch of punch A to operate to connect the circuits for uper zone operation. It is to be noted that both cross-footing totalizers are now cleared.

Now the bookkeeping machine cariage lies in such position that writing will be inserted in the column headed "Account No. proof" (Acc't. No. proof). The amount inserted in this column will be registered in vertical totalizer 18, the cams of which are so set that the cross-footing totalizers are not connected. It will be likewise transmitted to the upper zone punch stops of punch A.

The bookkeeping machine carriage now lies so that the writing position is in the column headed "Security No. proof" (Sec. No. Pr.), and the amount inserted in this column is likewise inserted in the upper zone of punch A and is likewise registered in a vertical totalizer 19, but is not effective on any cross-footing totalizer, although it is transmitted to the upper zone of punch A.

The bookkeeping machine carriage now lies in the position for insertion of items in the column headed "Income amount" (Income Am't.) and the amount inserted on the journal sheet. Since no vertical totalizer is in that column, there is no registration of this on any totalizer, but it is transmitted to the upper zone stops of punch A.

The writing position of the bookkeeping machine platen now lies in the column headed "Income date" (Income Da.). The date key is struck and the date thereby inserted in the column and also inserted in the upper zone of punch A. Spacing movement of the bookkeeping machine carriage occurring following the striking of the date key causes the bookkeeping machine carriage to space one letter space to the right which brings the margin stop against the carriage return stop bar previously described, and thus, through the previously described train of mechanism closes the auto trip contacts and causes both carriages to restore to their margin stops and both transfer switches to operate, thus conditioning punch A for operation in the lower zone and punch B for operation in the upper zone. At the same time, the bookkeeping machine carriage restores to its normal position and the complete combination is at normal ready for insertion of another row of items on the journal sheet.

It is to be understood that after all items for a definite period or all desired items divided in any manner have been inserted on a sheet, the readings of the vertical totalizers are reduced to zero by striking the credit balance key and typing the totals from all vertical totalizers as the respective totalizers arrive in the computing zone. This process will yield the totals shown in red at the bottom of the sample journal sheet already described.

The entire mechanism for accomplishing the stated objects and many other subsidiary objects has been disclosed herein. The claims in this application are limited to a combination such as that shown in Fig. 1 and described with reference to Figs. 27 to 31 and 81.

While we have described what we consider to be a highly desirable embodiment of our invention, it is obvious that many changes in form could be made without departing from the spirit of the invention, and we, therefore, do not limit outselves to the exact form herein shown and described nor to anything less than the whole of the invention as hereinbefore set forth, and as hereinafter claimed.

Having described and illustrated one form of our invention we claim:

1. In a system of the class described, in combination, a typewriting machine having a traveling carriage, a perforator having a traveling carriage initially positionable in any of a plurality of positions, character inserting means in said typewriting machine, two groups of gag setting means in said perforator, key controlled means for operating said character inserting means and a group of said gag setting means, and means for controlling a special operation of said typewriter, for governing the transfer of said key controlled means to control another group of gag setting means, and for returning said perforator carriage to a predetermined one of said initial positions.

2. In a system of the class described, in combination, a typewriting machine, a perforator having a traveling carriage initially positionable to one of a plurality of positions but normally positioned by a stop at one of the positions, key controlled means in said typewriting machine to control the printing of a special character by said typewriting machine and to initiate the return of the carriage to one of said initial positions and additional key controlled means to initiate the return of the carriage and operate said stop to permit said carriage to return to the second initial position.

3. In a system of the class described, in combination, a key controlled typewriting machine having a traveling carriage, a plurality of perforators, character inserting means in said typewriting machine, two groups of gag setting means in each perforator, key controlled means for operating said character inserting means and a group of gag setting means of any one of said perforators, switching means controlled by a special key for transferring the control of said first mentioned key controlled means to the other group of gag setting means of the perforator, a control bar under control of said typewriting machine carriage and means governed by said bar to transfer the control of all said key controlled means to another of said perforators.

4. In a typewriter computing machine, a traveling carriage, keys in said machine for entering data therein, contacts associated with said keys for closing circuits to control the entry of said data at a plurality of points removed from said machine, a plurality of multi-contact switches through which said circuits extend, a control bar carried by said carriage, said bar having cam faces cut thereon, a magnet adapted to operate each of said switches, a set of contacts associated with said bar for closing local circuits to said magnets for selectively controlling the operation of one or more of said switches, and a second set of contacts associated with said bar for controlling the supply of current to said first set of bar actuated contacts thereby controlling the entry of data at said points, both of said sets of contacts being selectively actuated by the lateral travel of said carriage.

5. In a system of the class described, in combination, a key controlled typewriter computing machine, having a traveling carriage, a plurality of perforators each having a traveling carriage returnable to one of a plurality of positions but normally returned to an intermediate stop at one of said positions; a pair of keys to cause the printing of a special character by the typewriting machine, one of said keys being adapted to initiate the return of a perforator carriage to said intermediate stop position, the other of said keys being adapted to initiate the return of the carriage of a second perforator to said intermediate stop position; a control bar on said computing machine carriage to determine the point at which said perforators shall be controlled by said keys; and an additional key in said typewriter, controlling means operable in said perforators individually to control the return of the carriage and retraction of said stop to permit the carriage to return to another position.

WILLIAM W. LASKER.
WALTER F. KELLEY.

CERTIFICATE OF CORRECTION.

Patent No. 2,165,556.            July 11, 1939.

WILLIAM W. LASKER, ET AL.

It is hereby certified that error appears in the printed specification of the above numbered patent requiring correction as follows: Page 10, second column, line 55, for the word "solenoid" read solenoidal; page 11, first column, line 23, after "these" insert erase; page 15, first column, line 52, for "position" read positive; page 18, first column, line 5, strike out "through the transfer switch operating magnets" and insert the same before the numeral "389" in line 4; page 30, first column, line 43, after "move" insert to; line 52, for "(Figs. 35 and 48)" read (Figs. 35 and 74); lines 53 and 72, for "Fig. 48" read Fig. 74; in the drawings, strike out Sheet 43, containing duplicate Fig. 74, and renumber Sheets 44 to 49 inclusive as Sheets 43 to 48 inclusive; in the heading to the drawings, line 3, for "49 Sheets" read 48 Sheets; and that the said Letters Patent should be read with this correction therein that the same may conform to the record of the case in the Patent Office.

Signed and sealed this 27th day of February, A. D. 1940.

(Seal)                                         Henry Van Arsdale,
Acting Commissioner of Patents.